July 5, 1927.

H. A. BOWERS

CALCULATING MACHINE

Original Filed Aug. 26, 1921     26 Sheets-Sheet 1

Inventor.
H. A. Bowers
by A. P. Greeley
Attorney.

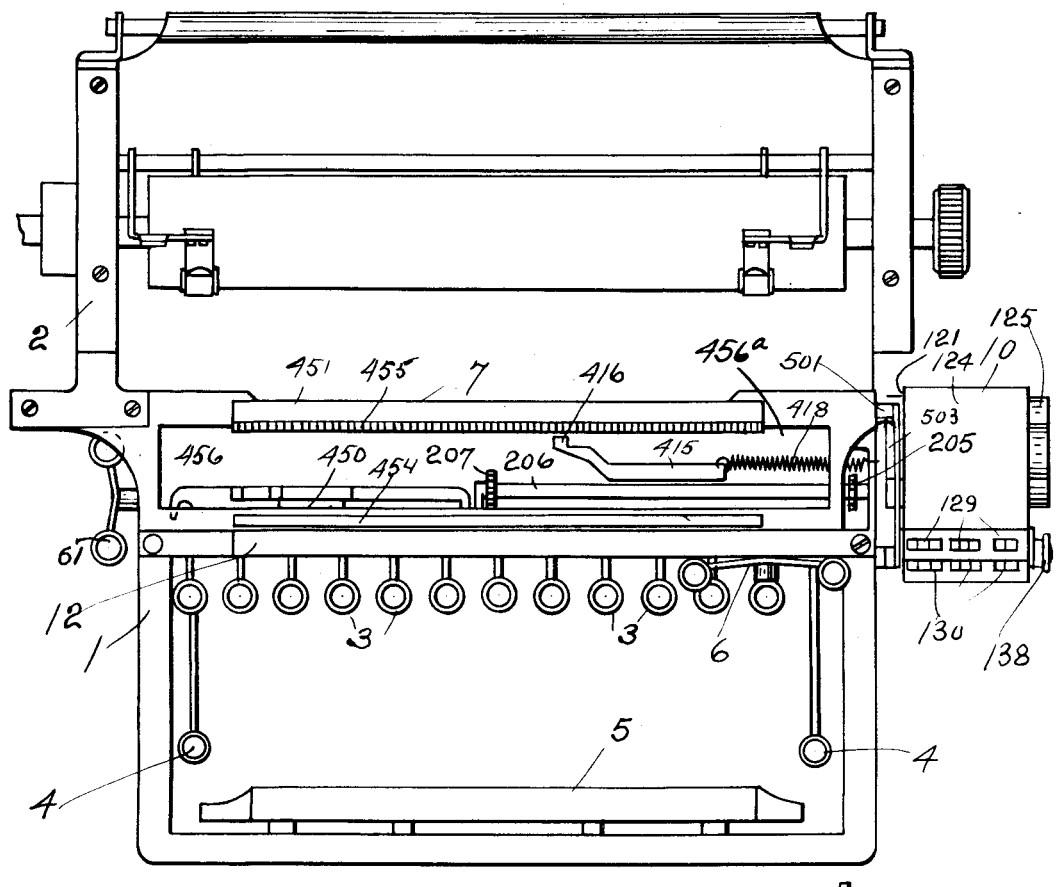
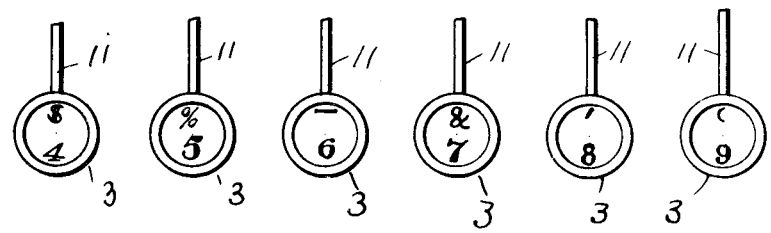

July 5, 1927.

H. A. BOWERS

CALCULATING MACHINE

Original Filed Aug. 26, 1921    26 Sheets-Sheet 3

1,634,485

Inventor.
H A Bowers
by A.S. Greeley
Attorney.

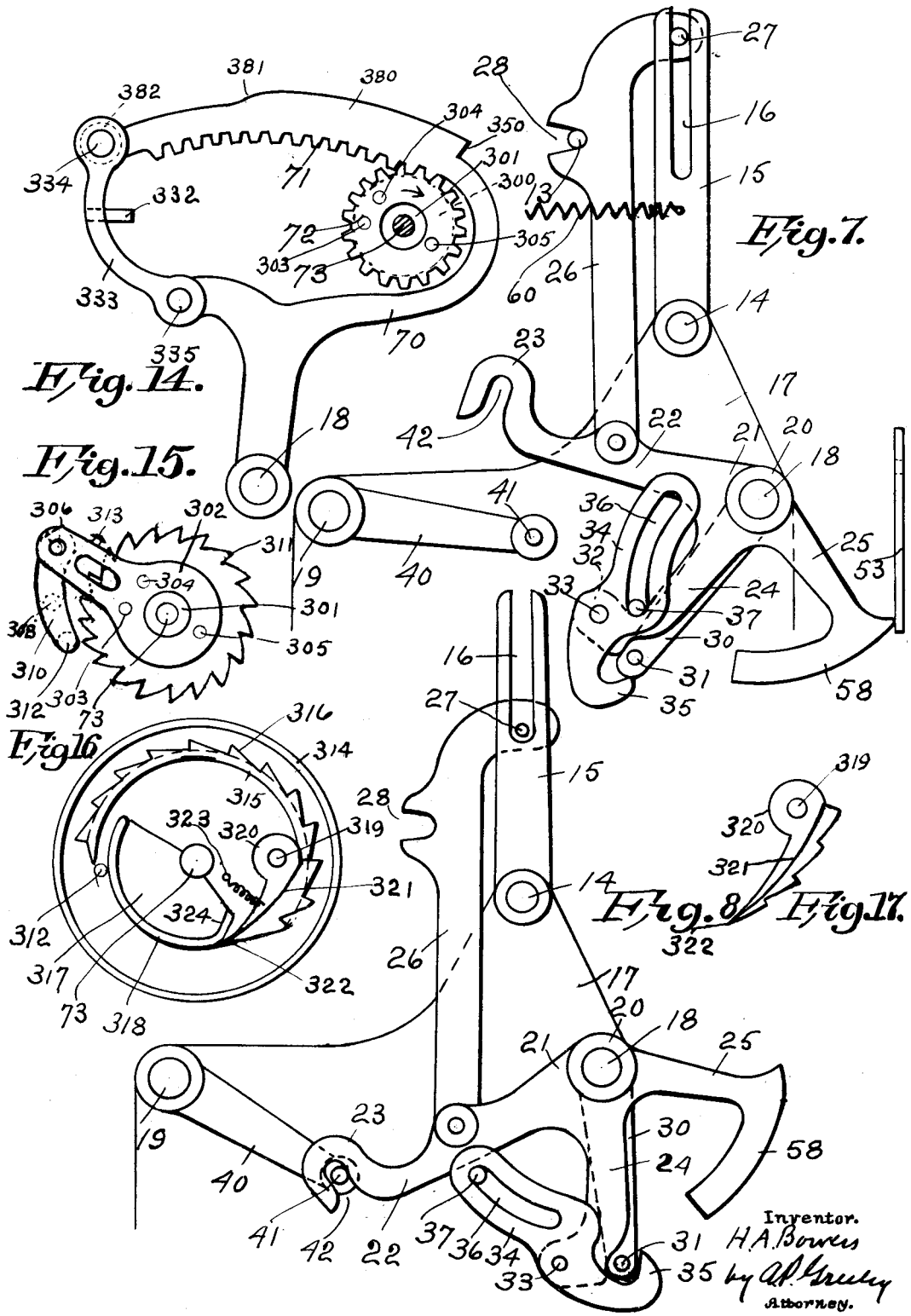

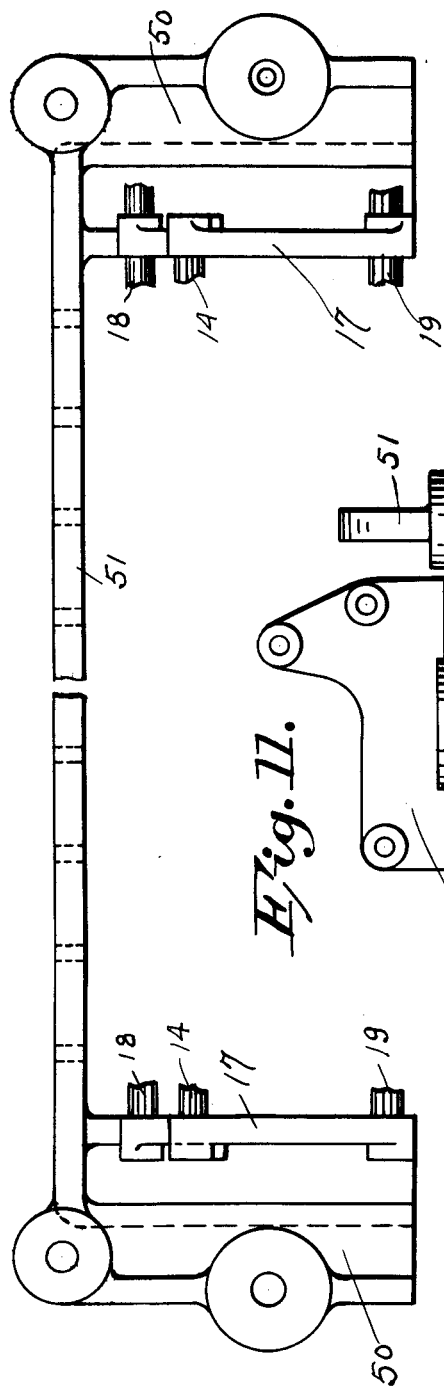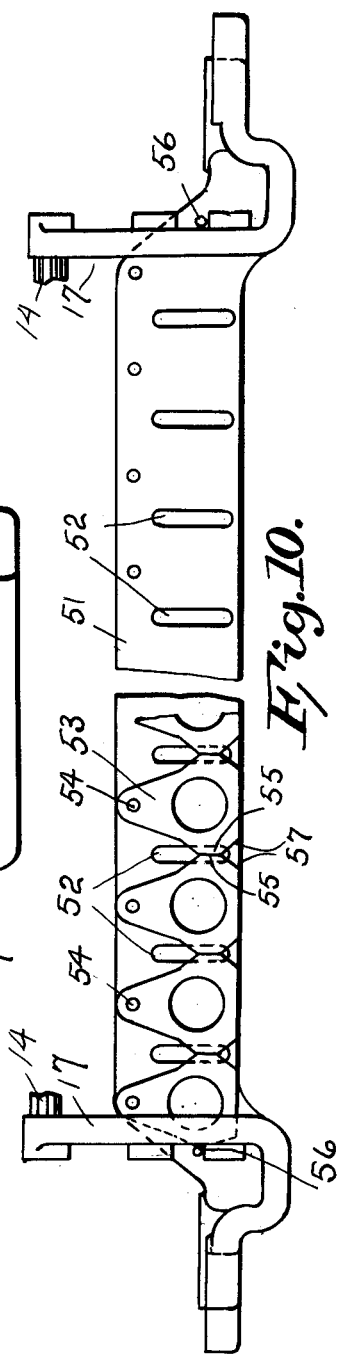

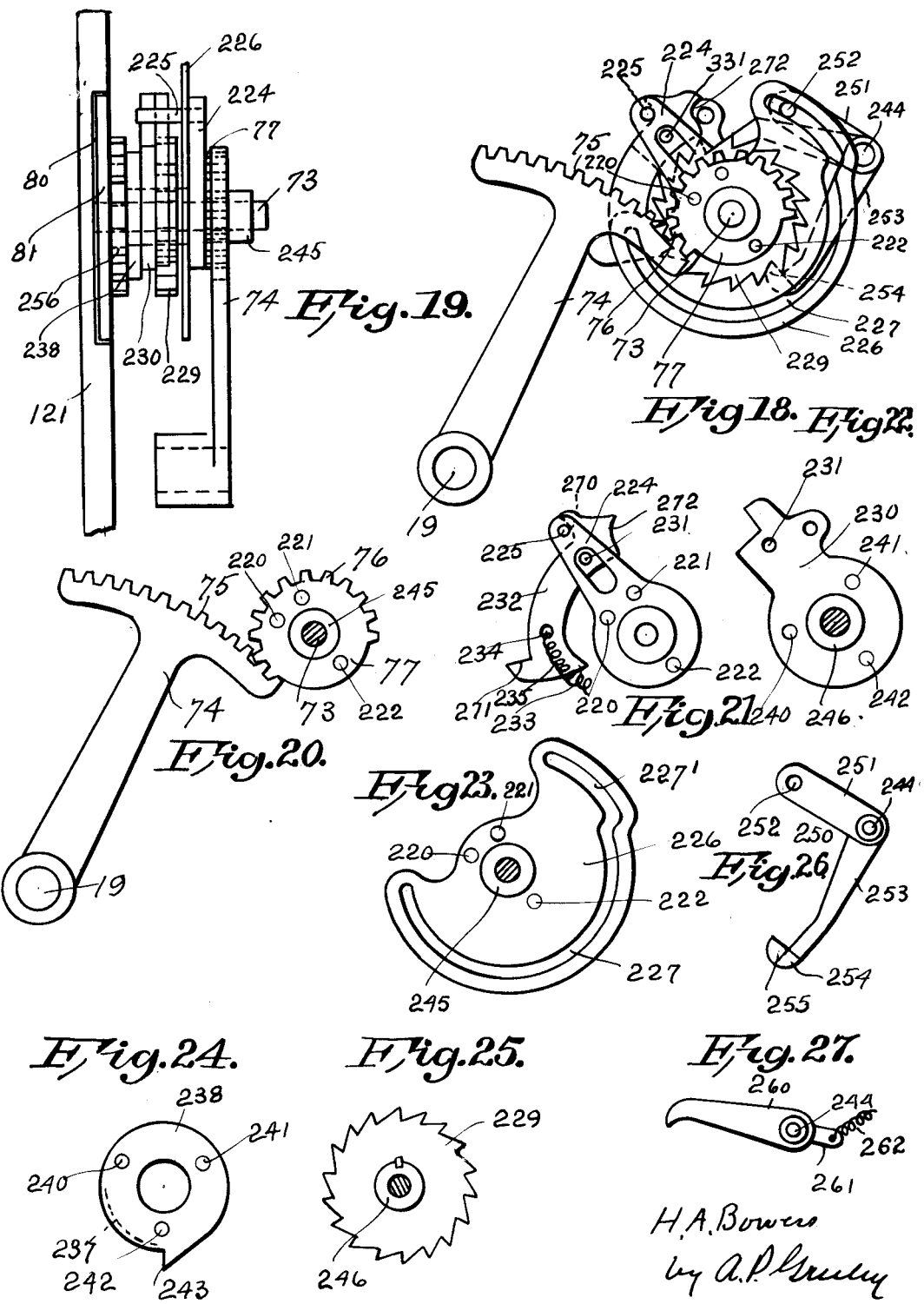

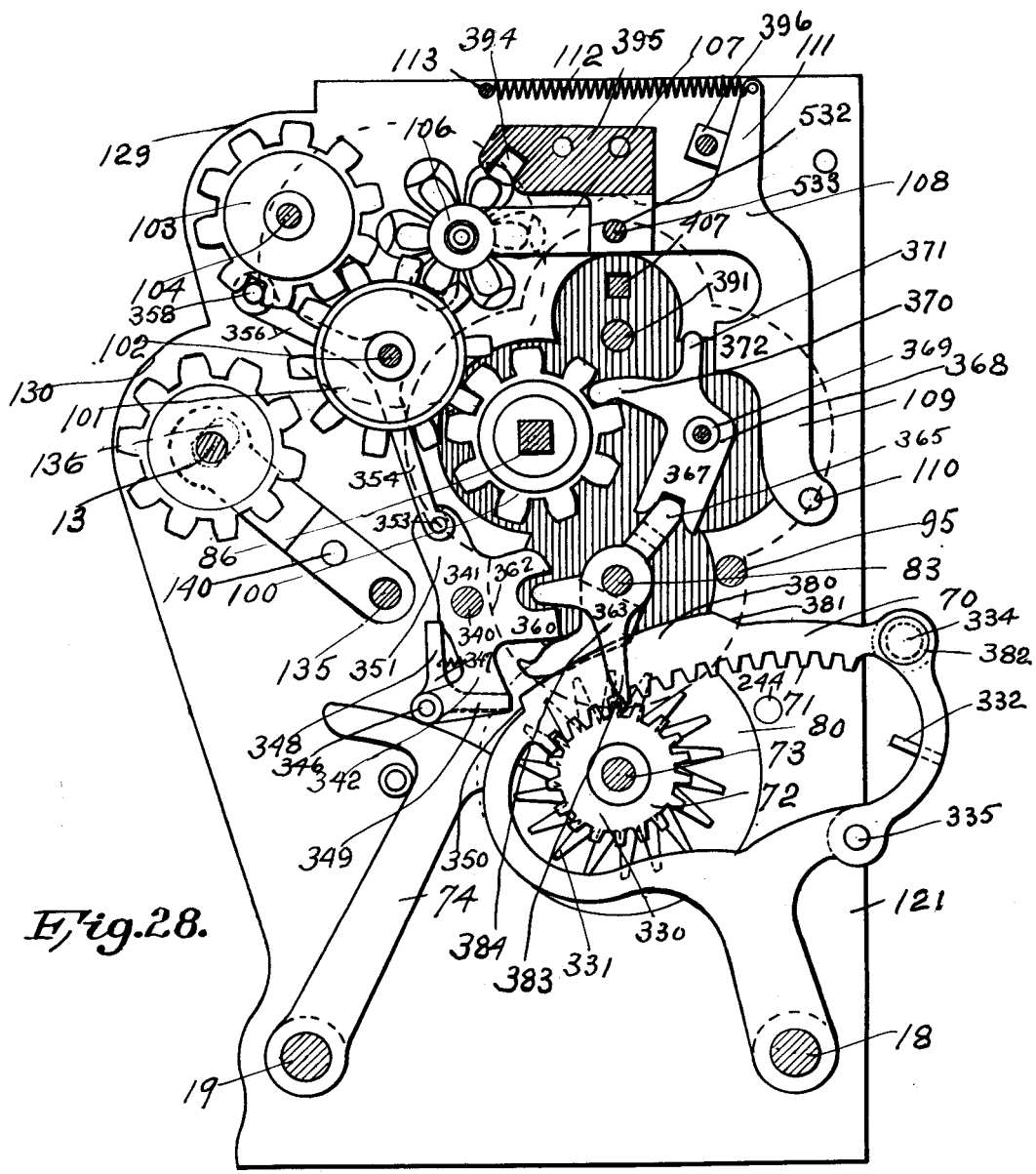

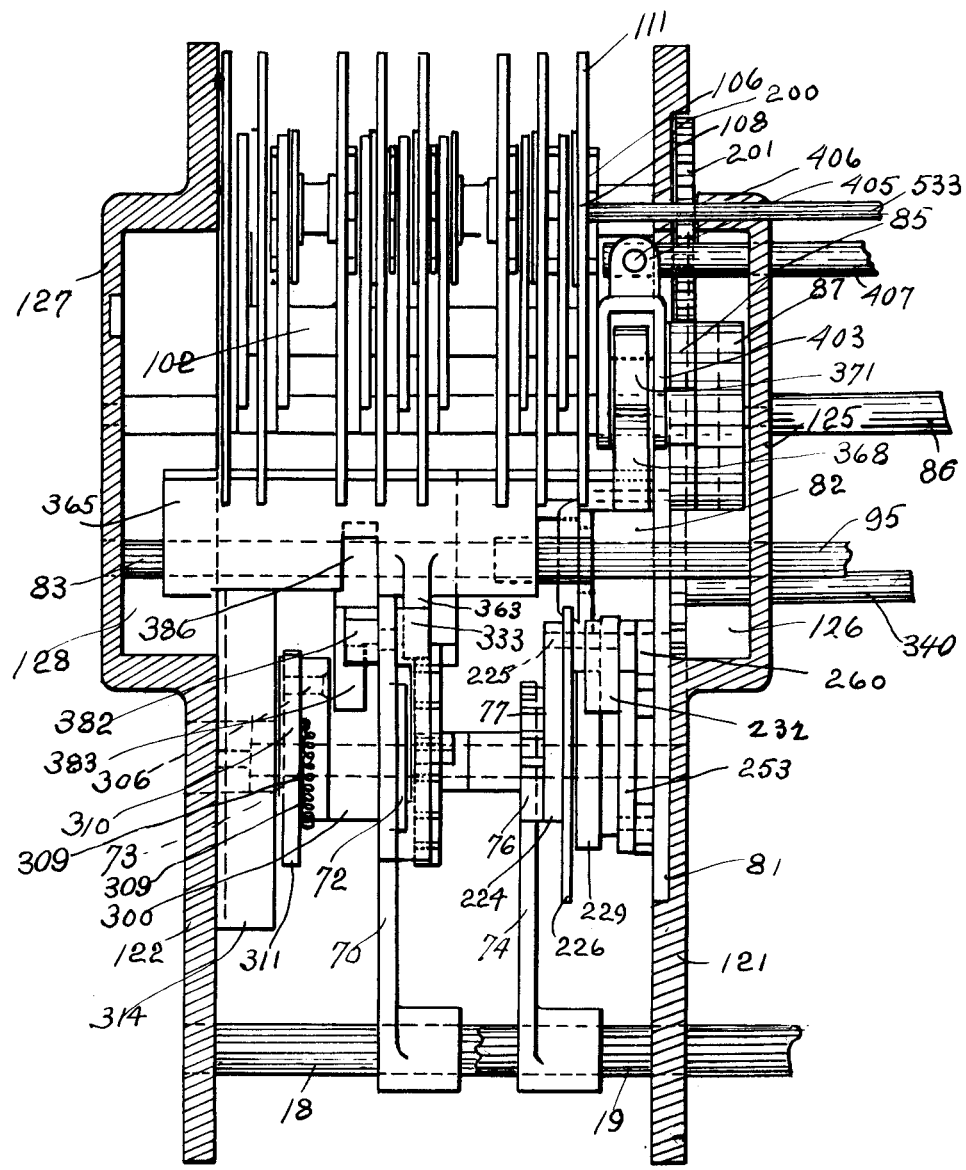

July 5, 1927.

H. A. BOWERS 1,634,485

CALCULATING MACHINE

Original Filed Aug. 26, 1921    26 Sheets-Sheet 9

Fig.30ª.

Inventor
H A Bowers
By A P Greeley
Attorney

July 5, 1927.  H. A. BOWERS  1,634,485
CALCULATING MACHINE
Original Filed Aug. 26, 1921   26 Sheets-Sheet 10
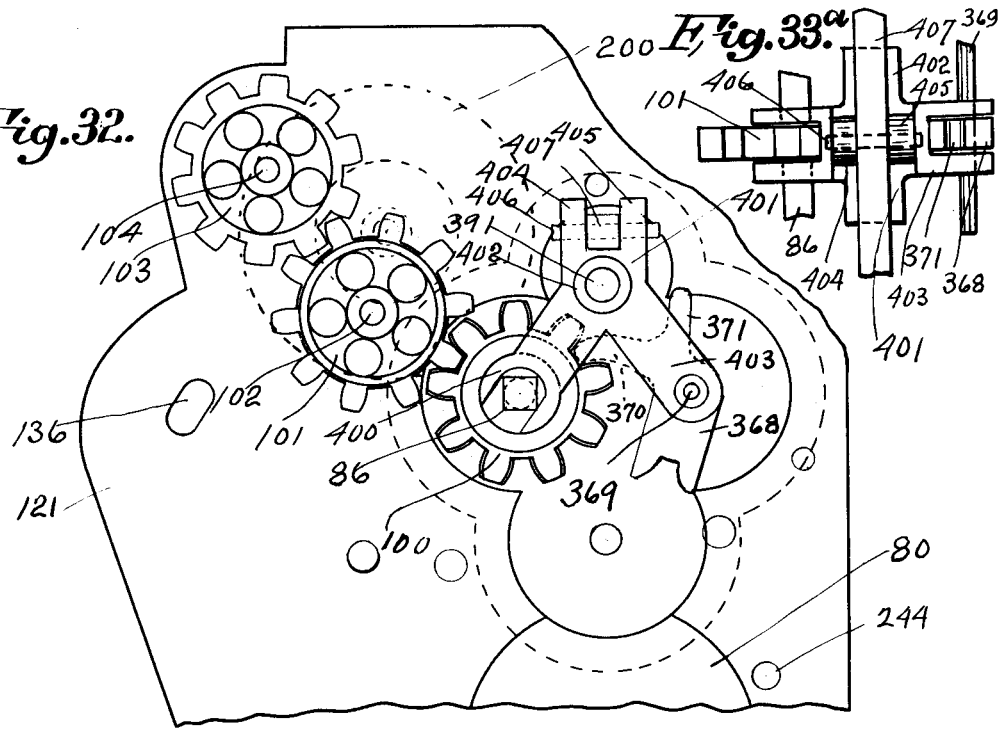
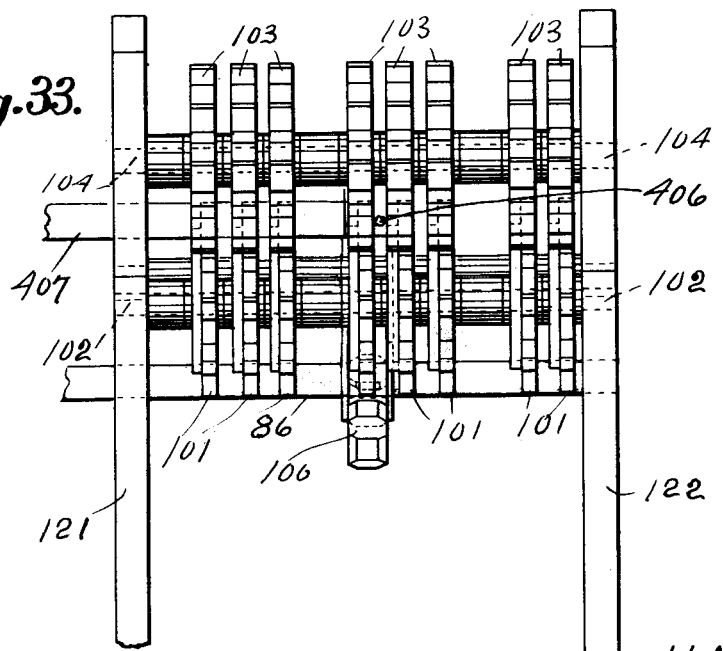
Inventor
H. A. Bowers
by A. P. Greeley
Attorney

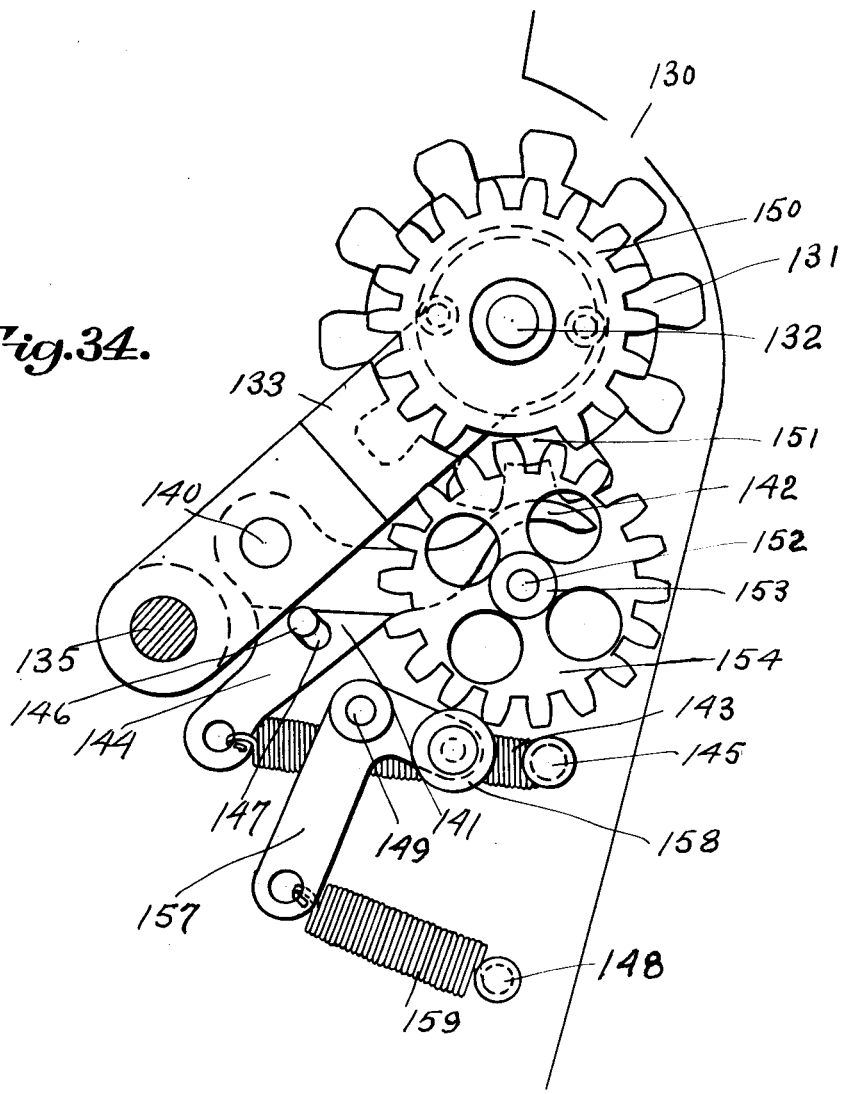

July 5, 1927.

H. A. BOWERS 1,634,485

CALCULATING MACHINE

Original Filed Aug. 26. 1921    26 Sheets-Sheet 12

Inventor
H.A. Bowers
by A.P. Greely
Attorney.

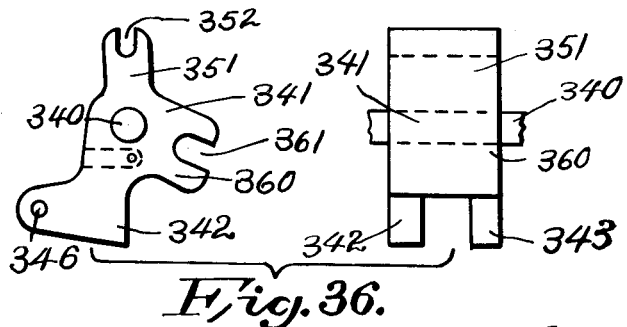
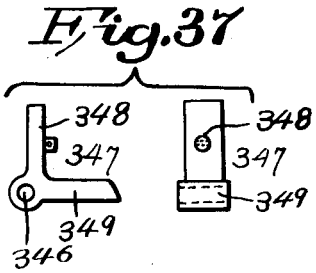
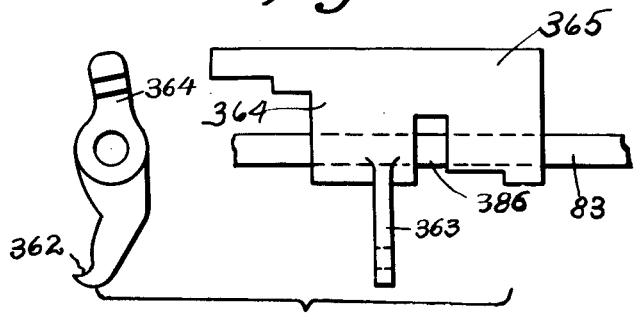
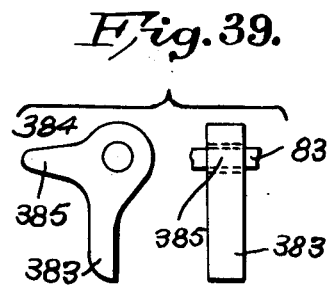
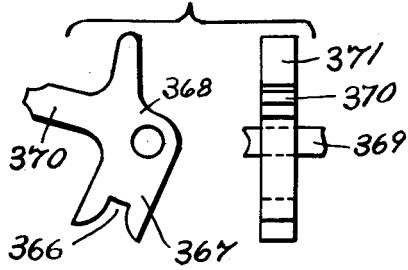
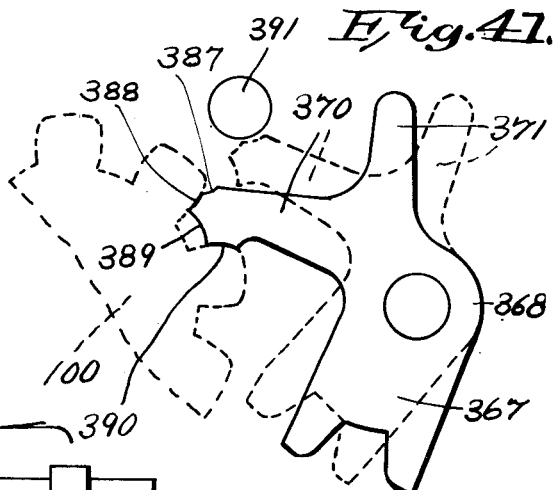
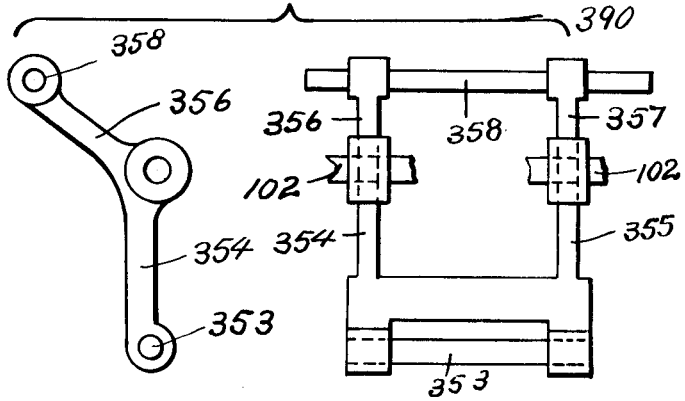

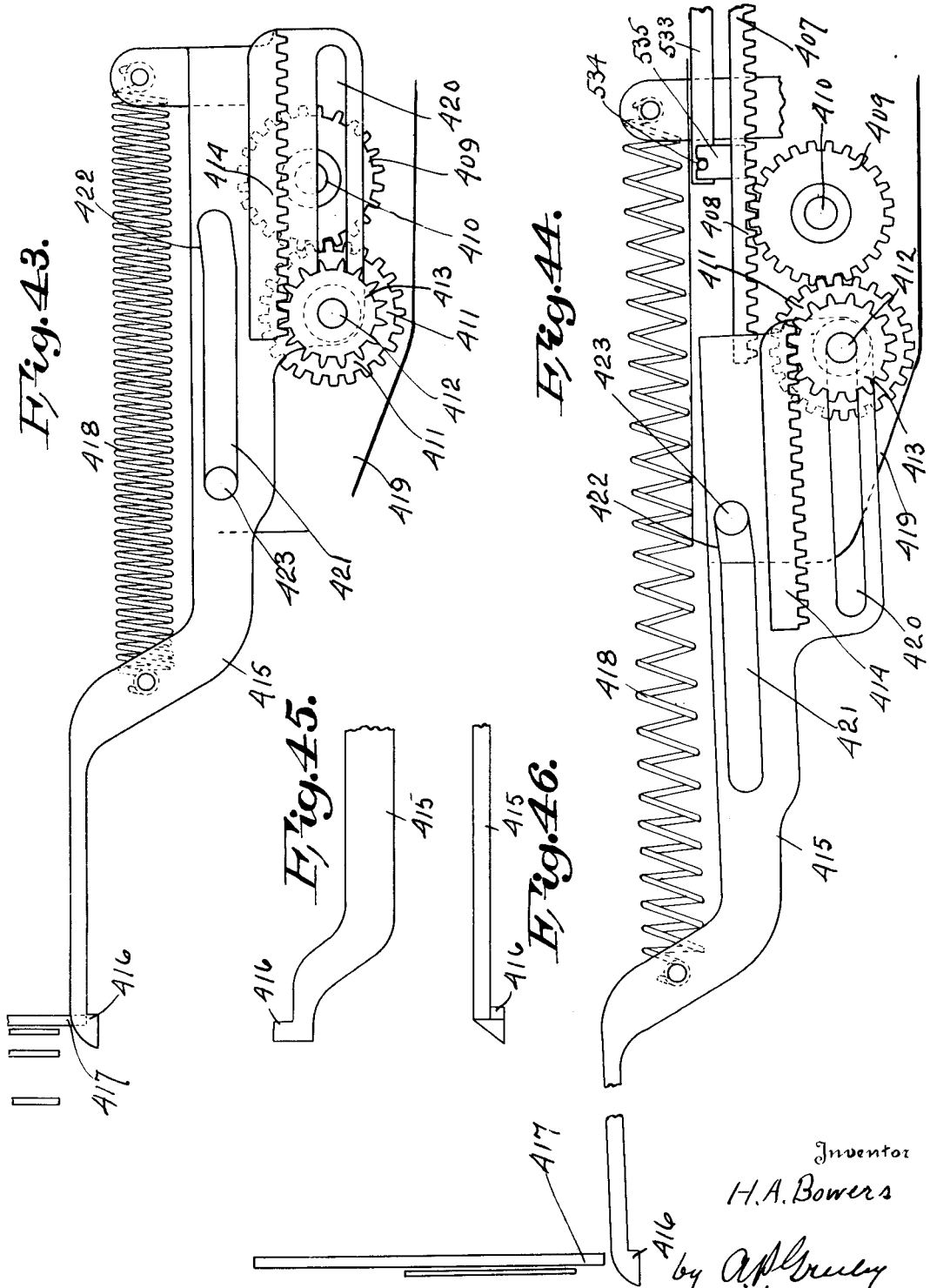

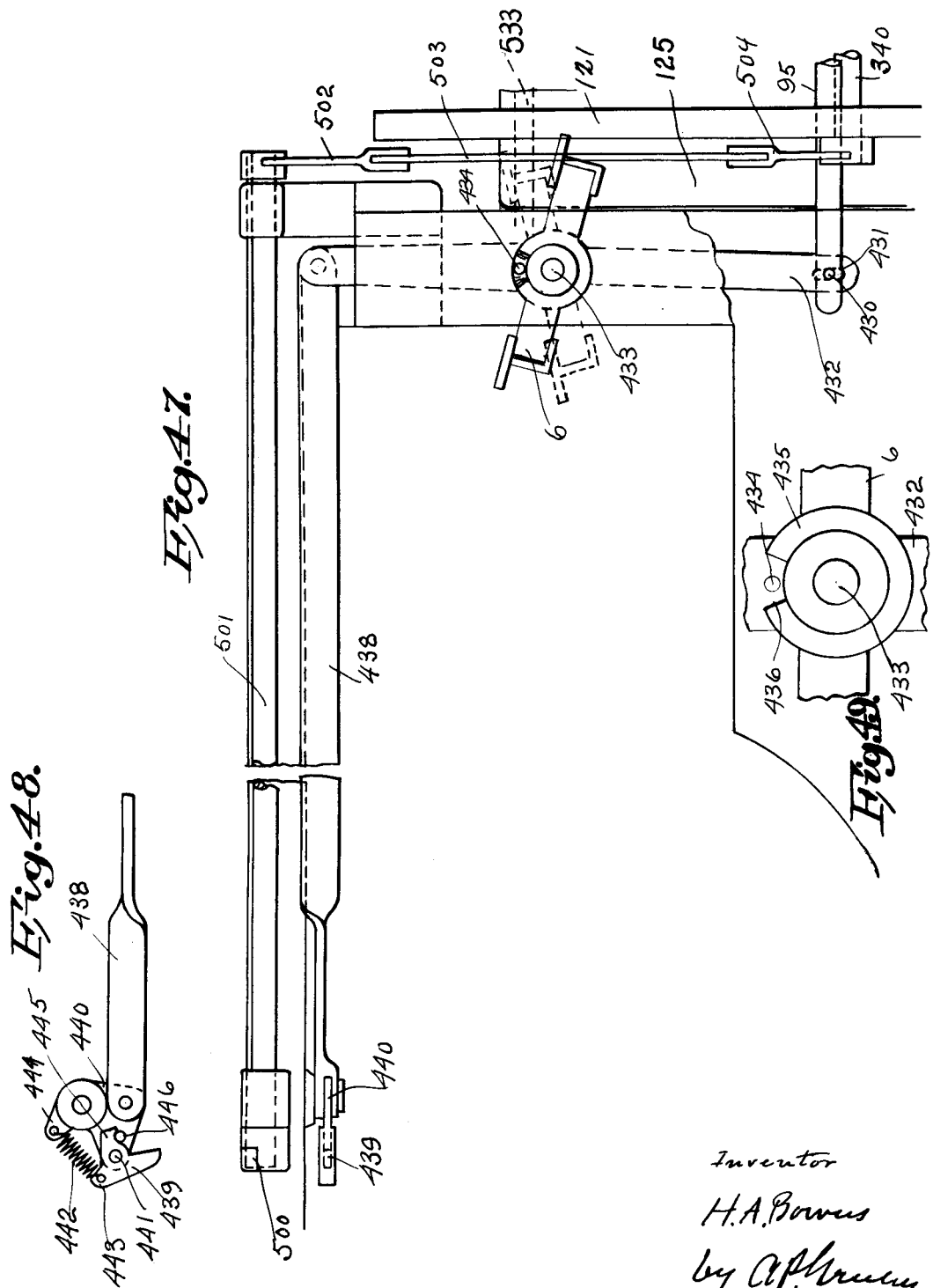

July 5, 1927.
H. A. BOWERS
1,634,485
CALCULATING MACHINE
Original Filed Aug. 26, 1921  26 Sheets-Sheet 16
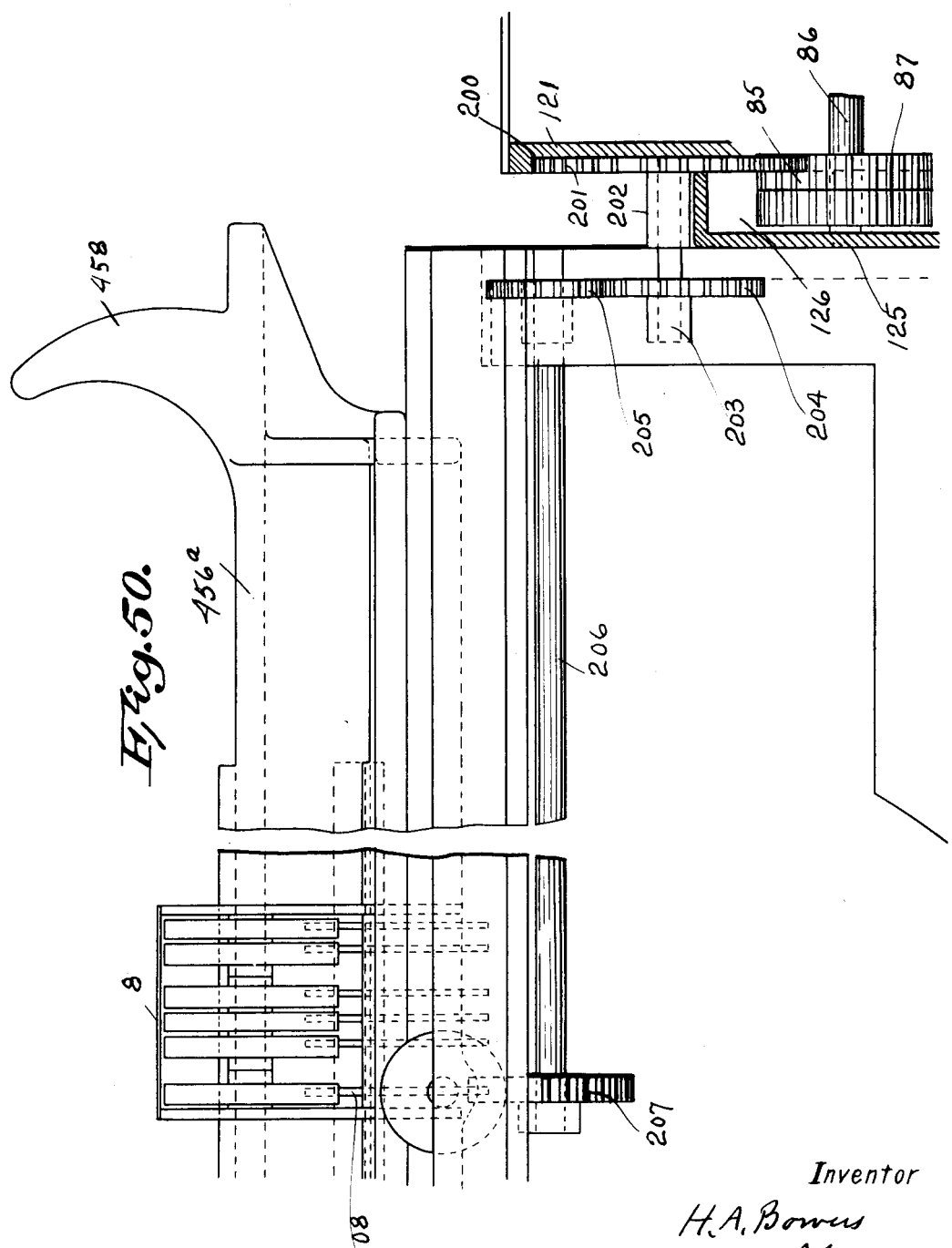
Inventor
H. A. Bowers
by A. P. Greely
Attorney

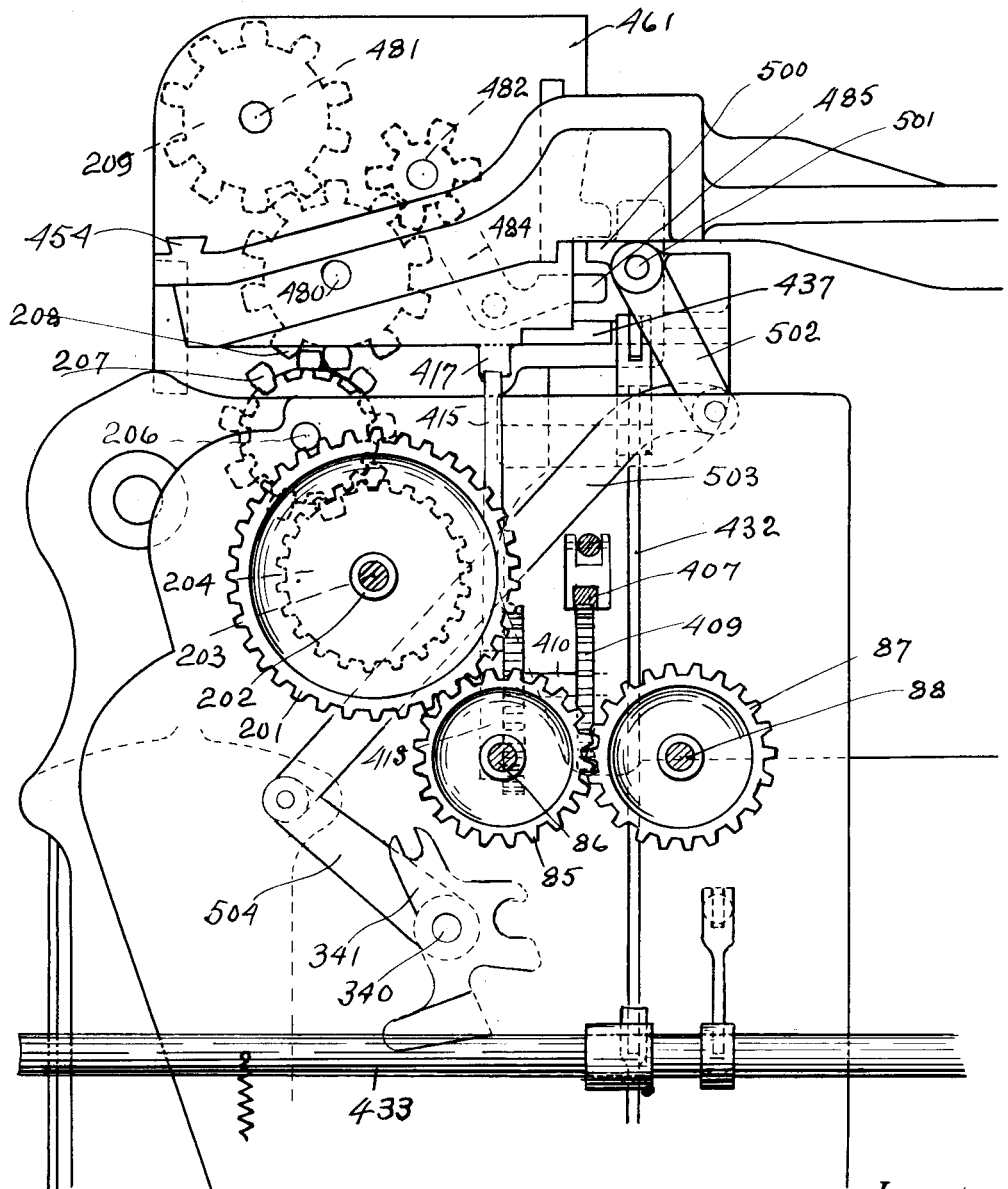

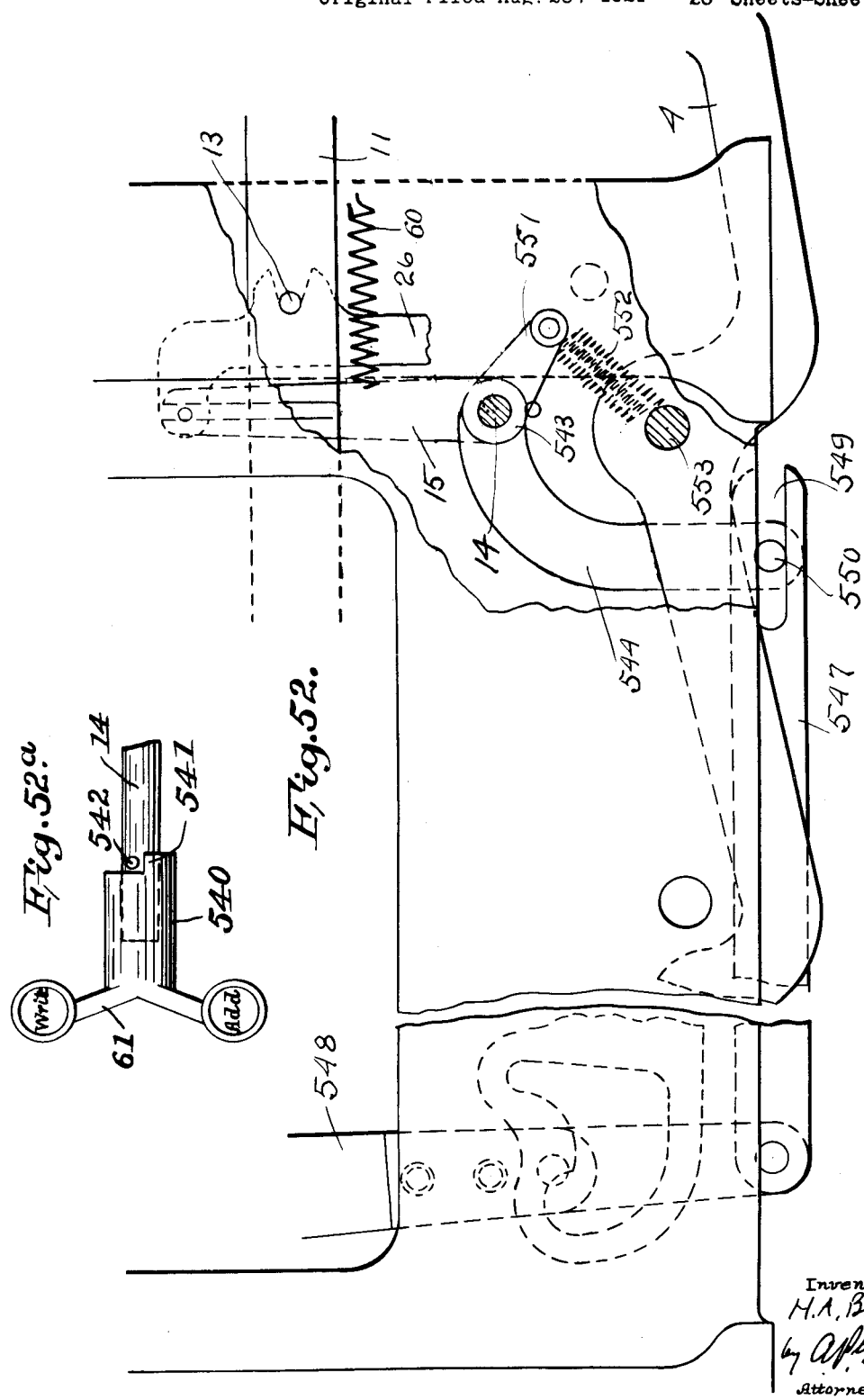

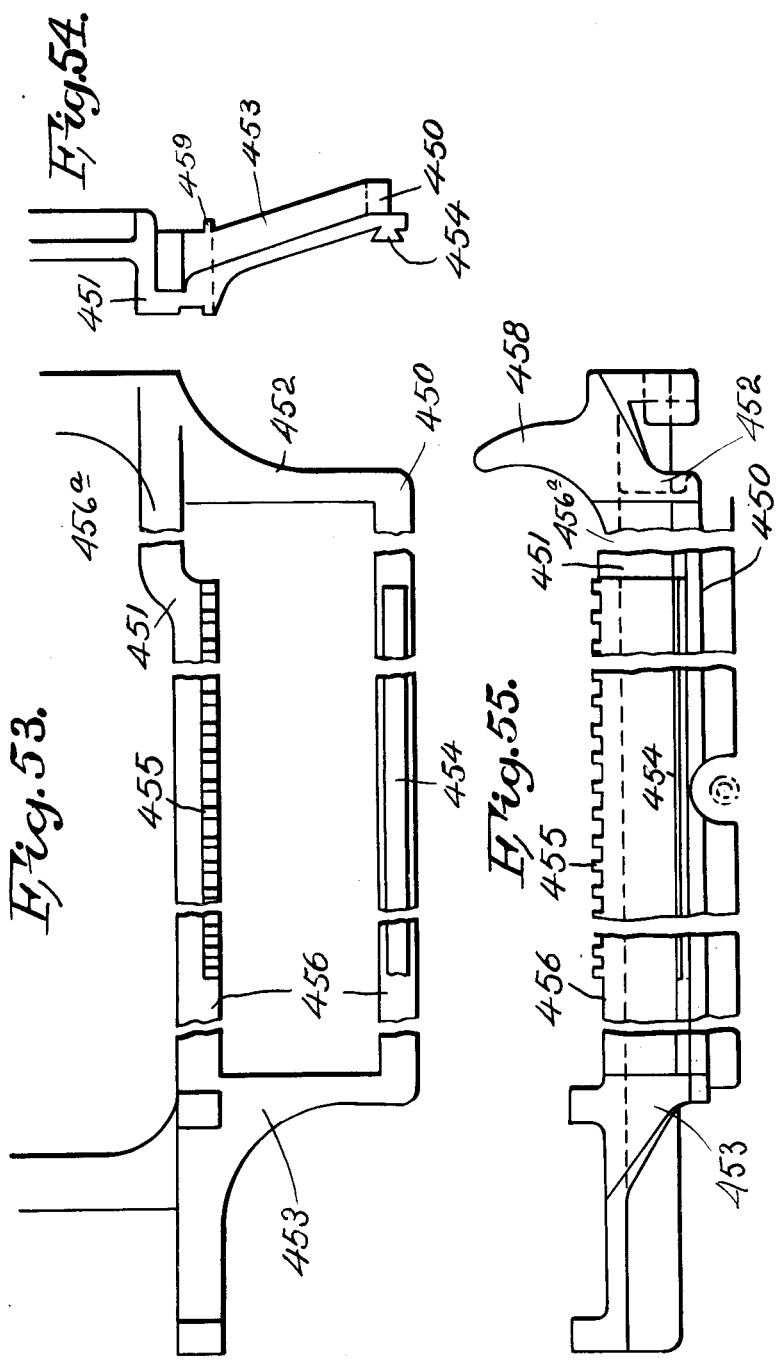

July 5, 1927.

H. A. BOWERS

CALCULATING MACHINE

Original Filed Aug. 26. 1921   26 Sheets-Sheet 20

1,634,485

July 5, 1927.
H. A. BOWERS
1,634,485
CALCULATING MACHINE
Original Filed Aug. 26, 1921  26 Sheets-Sheet 21
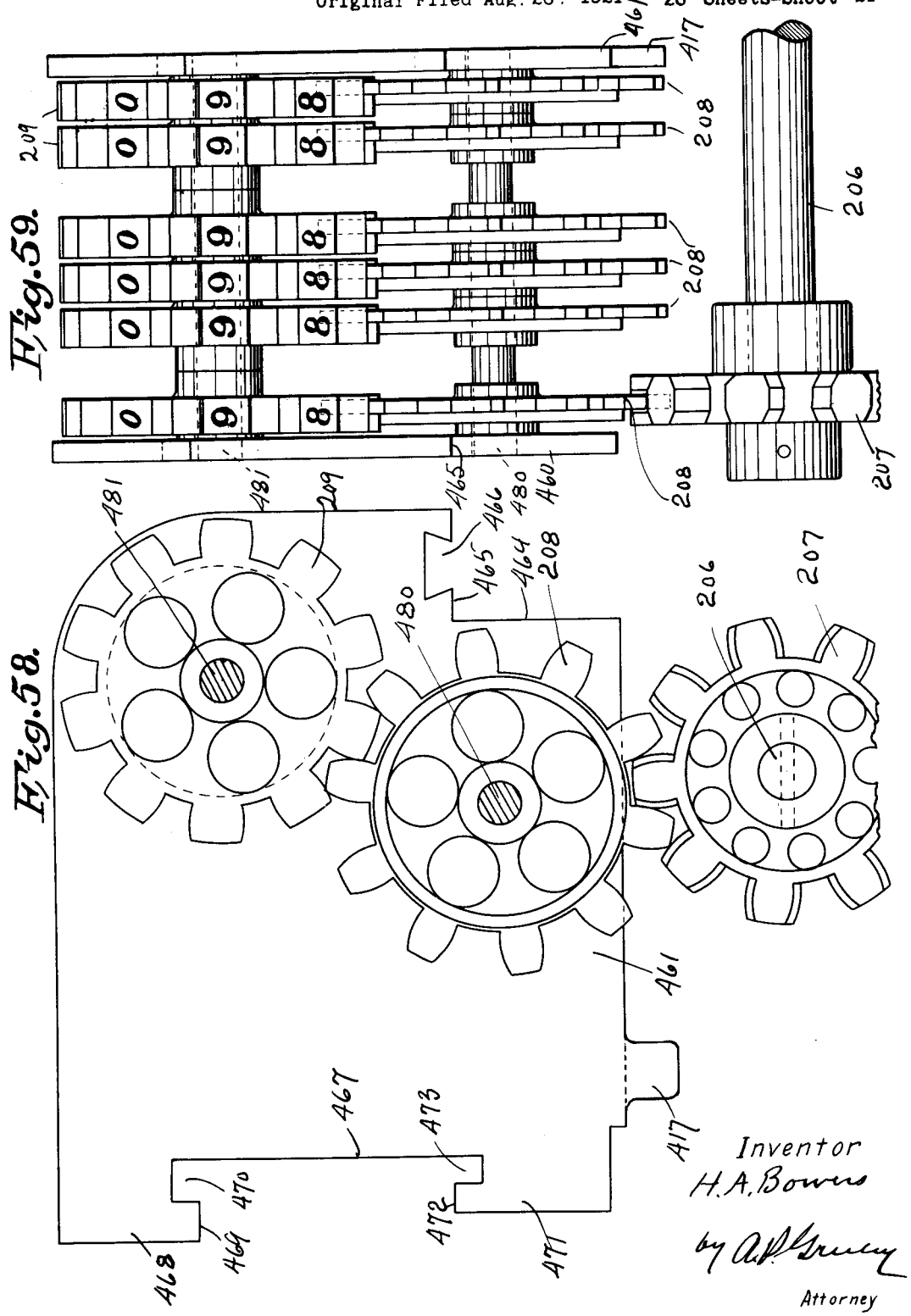
Inventor
H. A. Bowers
by A. P. Greely
Attorney July 5, 1927.

H. A. BOWERS

CALCULATING MACHINE

Original Filed Aug. 26, 1921   26 Sheets-Sheet 22

Inventor
H. A. Bowers
by A. P. Greeley
Attorney

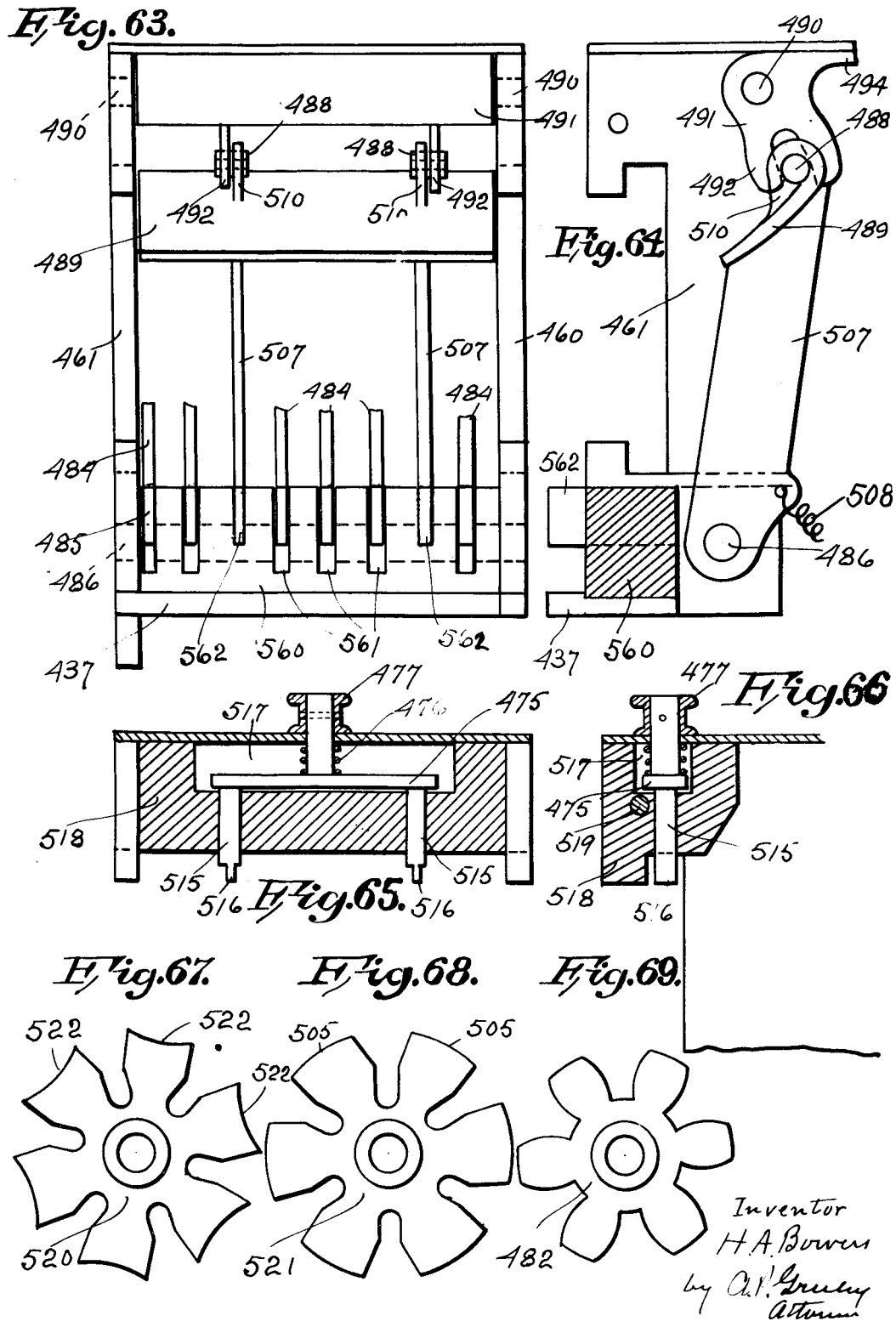

July 5, 1927.
H. A. BOWERS
1,634,485
CALCULATING MACHINE
Original Filed Aug. 26, 1921   26 Sheets-Sheet 24
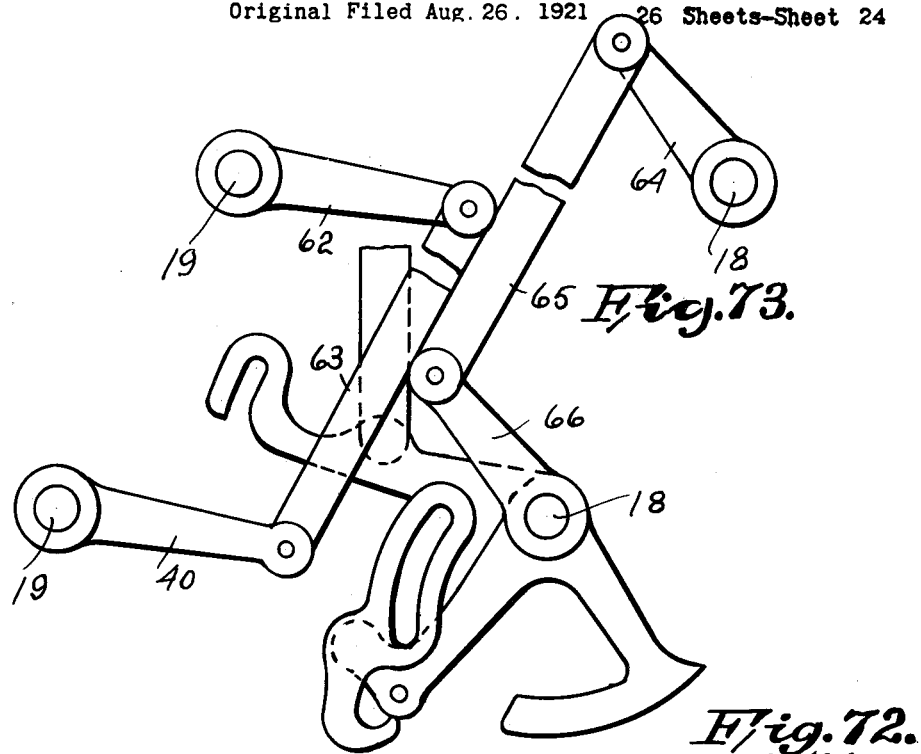
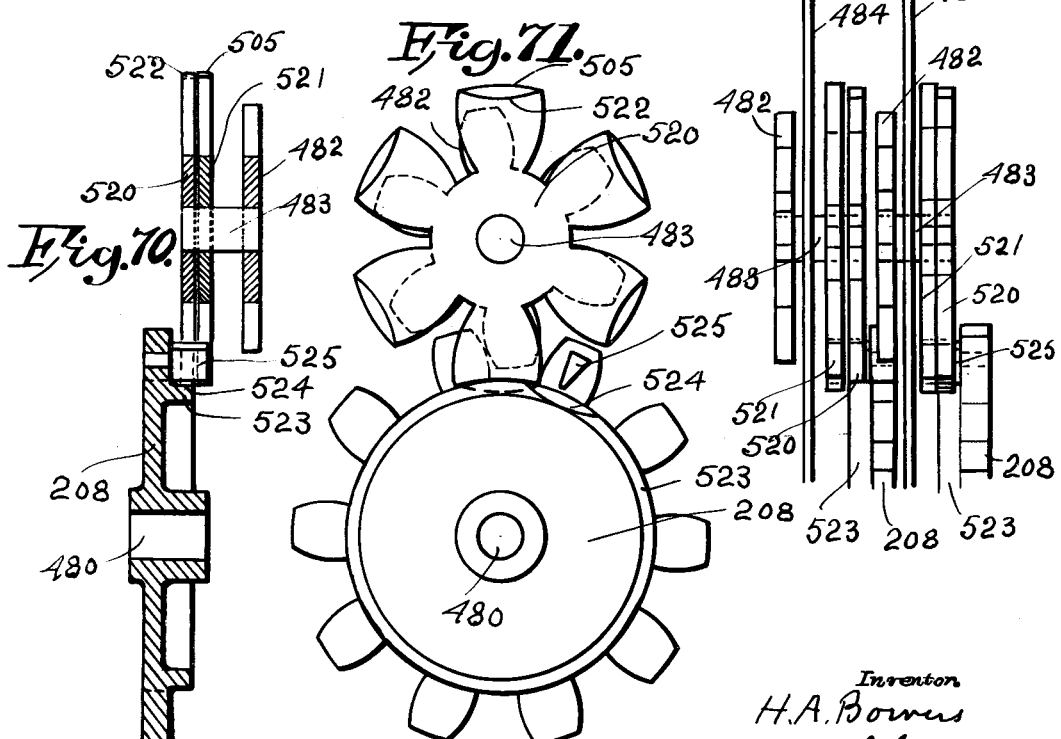
Inventor
H.A. Bowers
by A.P. Greely
Attorney.

July 5, 1927.
H. A. BOWERS
1,634,485
CALCULATING MACHINE
Original Filed Aug. 26, 1921      26 Sheets-Sheet 25
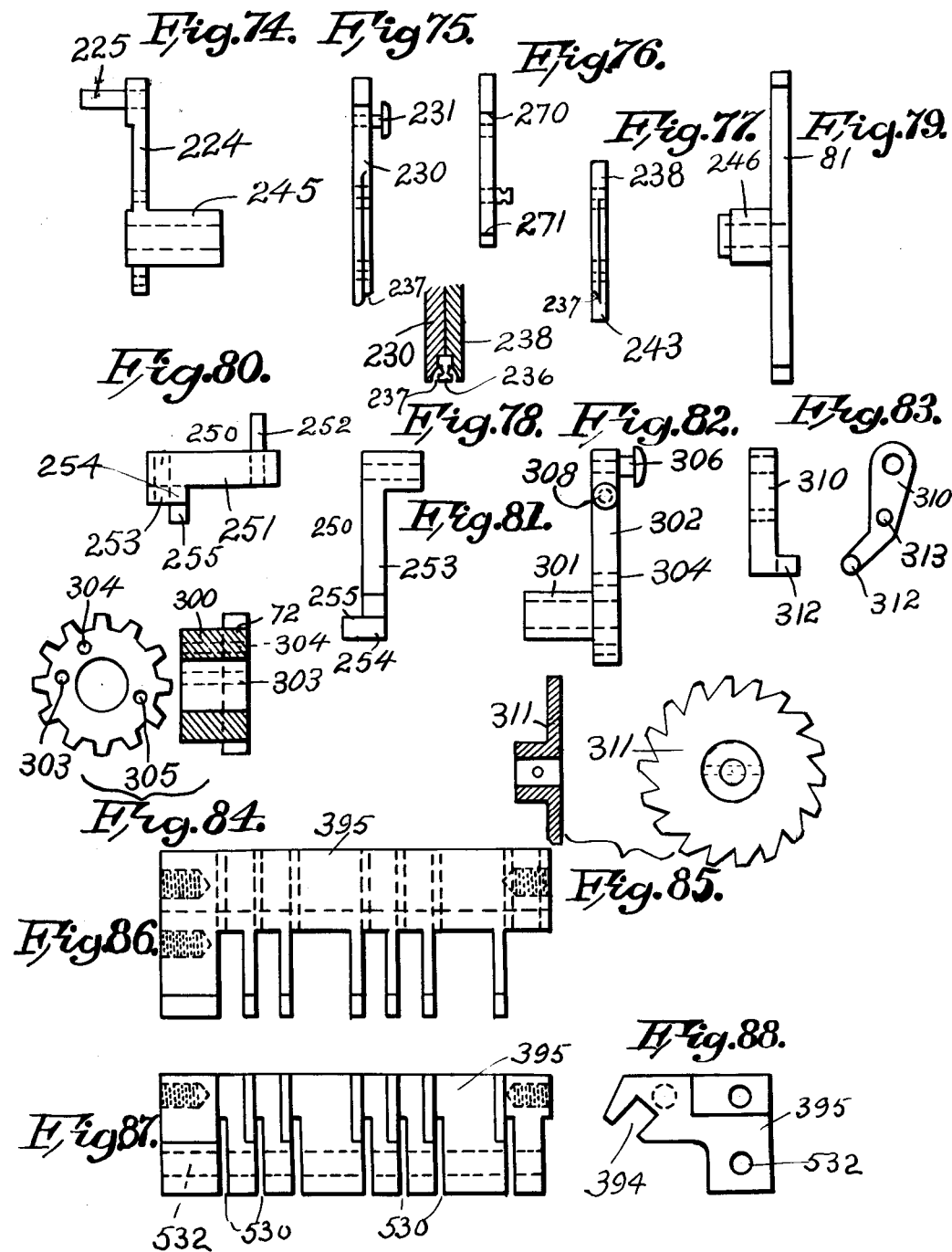

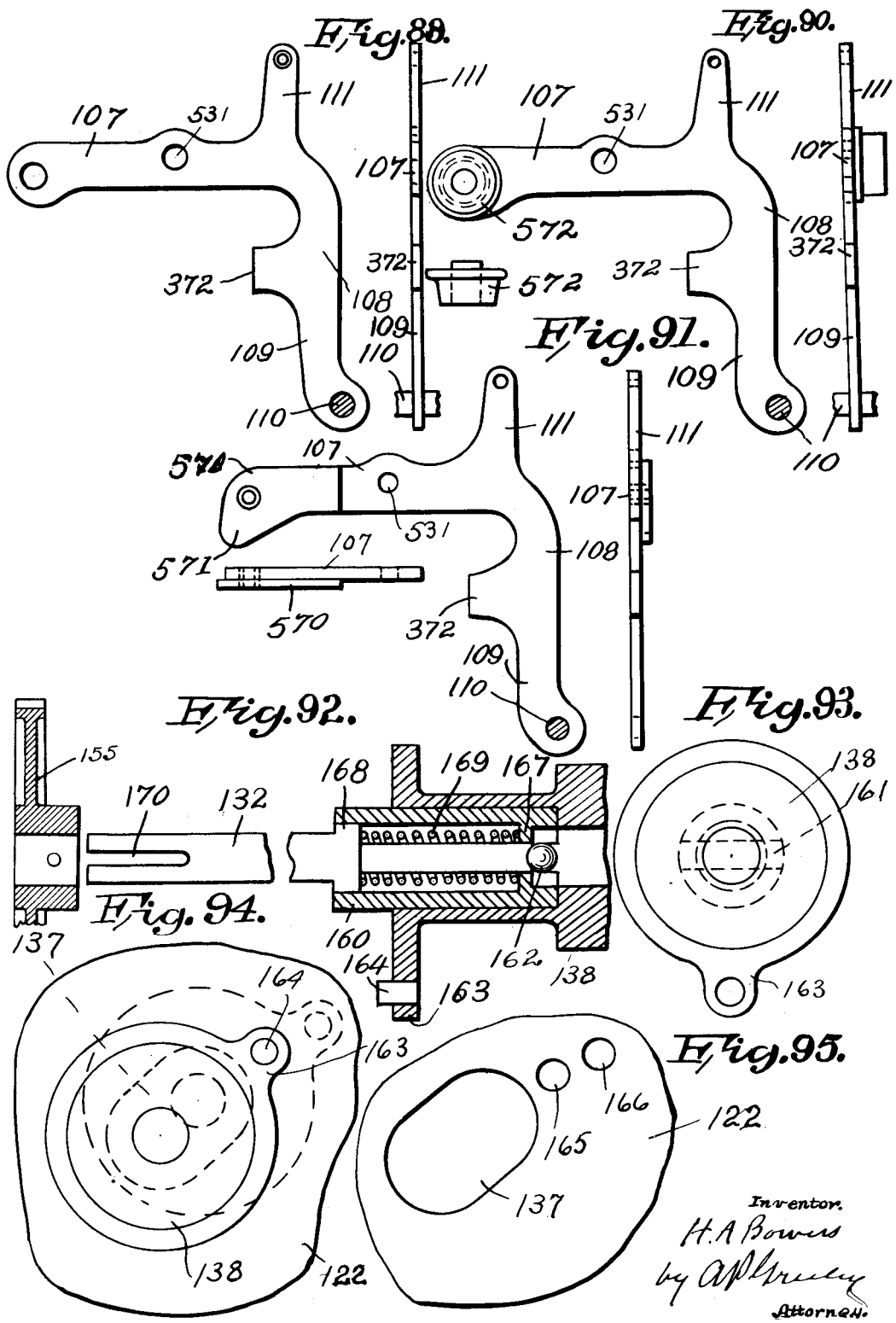

Patented July 5, 1927.

1,634,485

UNITED STATES PATENT OFFICE.

HIESTER AZARUS BOWERS, OF READING, PENNSYLVANIA.

CALCULATING MACHINE.

Application filed August 26, 1921, Serial No. 495,458. Renewed March 15, 1927.

My invention relates to calculating machines and particularly to that class of machines which are adapted for use in connection with typewriting machines to be operated by the numeral keys of the typewriter machine to add or subtract the numbers as they are written.

My invention is of the same general type as that of United States Patent No. 1,347,245, issued to me July 20, 1920, and has for its object to further improve and simplify the machine shown in that patent and provide a machine which will be even more efficient and capable of being used to effect results which the machine as described in that patent is not capable of producing. A particular object of my invention is to provide means by which the means for operating the mechanism of the calculating device may be readily disconnected from the numeral keys either to permit the numeral keys to be continuously operated without actuating the calculating mechanism, or to permit a single numeral key to be operated to print the diacritical mark which is adapted to be printed by it, without actuating the calculating mechanism. A further object of the invention is to provide, in addition to the main calculating device at the side of the typewriting machine, a registering device carried by the carriage of the typewriting machine also operated by the numeral keys, and means by which this registering device carried by the carriage may be operated simultaneously with the main calculating machine or the one may be operated without operating the other. A further object of the invention is to provide means for holding the index wheels of the registering mechanism normally locked against operation and means operated by the numeral keys for unlocking said registering mechanism to permit the index wheels to be rotated and to relock them on the completion of the rotation given to them by the numeral key operated. A further object of the invention is to provide means by which transfer gears for carrying from an index wheel of lower denomination to an index wheel of higher denomination other than the one for carrying from an index wheel of lower denomination to the index wheel actuated by the numeral key operated, will be positively locked in position to operate the index wheels of higher denomination than the one actuated by the numeral key operated. A further object of the invention is to provide transfer mechanism for carrying from an index wheel of lower denomination to one of higher denomination which will be simple, efficient and positive in its operation. A further object of the invention is to provide a storage or subtotal registering device by which he numbers registered on the index wheels of the main calculating mechanism may be registered as they are registered in the initial operation or as the numeral keys are operated to return the index wheels to zero. A further object of the invention is to provide means for controlling the movement of the master wheel by which the index wheels are successively brought into operative relation with the numeral keys as the carriage of the typewriting machine moves to the left which will be disconnected when the register carried by the carriage moves beyond the line at which the units registered are to be printed. A further object of the invention is to provide means carried by the carriage of the typewriting machine by which its movement will effect reversal of the direction of rotation of the index wheels. Further objects of the invention will be explained in the description which follows.

With the above described objects and the other objects hereinafter explained in view, my invention consists in the construction and combination of elements hereinafter described and claimed.

Referring to the drawings:

Fig. 2 (Sheet 2) is a top view of the same.

Fig. 5, (Sheet 2) is a top plan view of a portion of the numeral keys.

Figure 6:
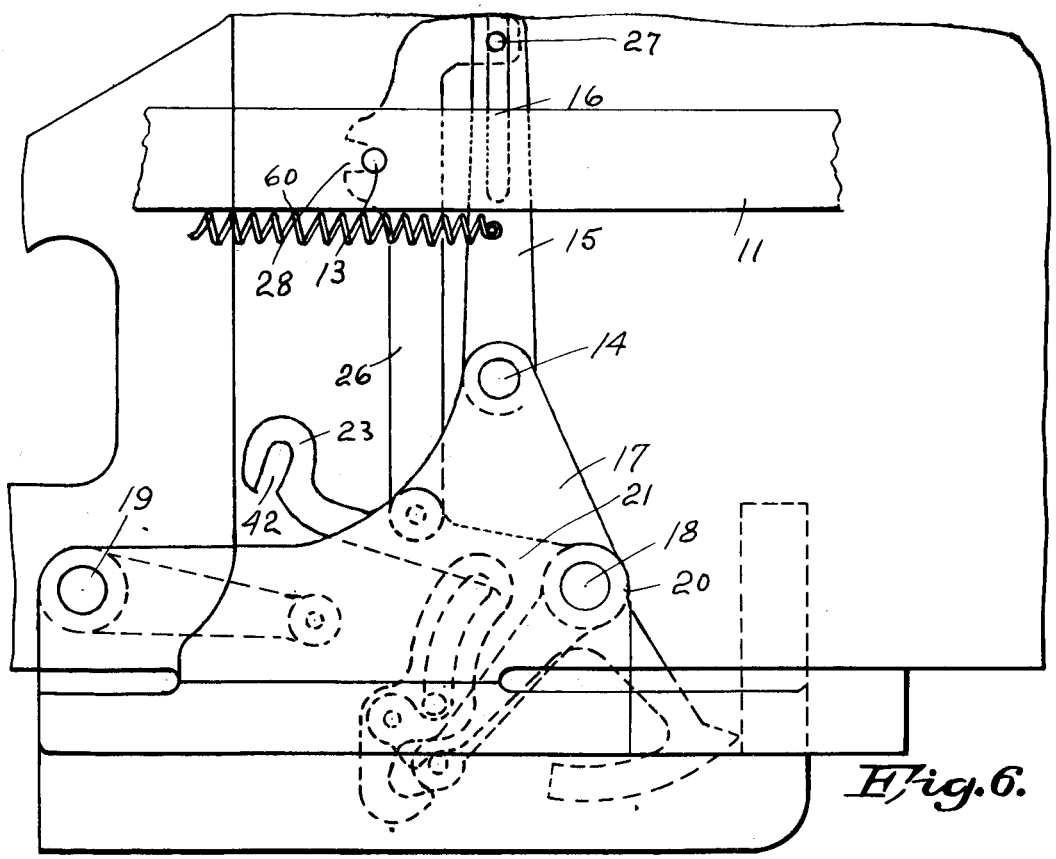

Fig. 6 (Sheet 3) is a side view partly broken away of the mechanism for operating the unlocking shaft and the adding shaft.

Figs. 7 and 8 (Sheet 4) are side views showing the mechanism for operating the unlocking shaft and adding shaft, Fig. 7 showing the mechanism in normal position and Fig. 8 showing the same in operated position.

Figs. 9, 10 and 11 (Sheet 5) are respectively a plan view, front view and end view of the foundation frame.

Figures 12, 13:
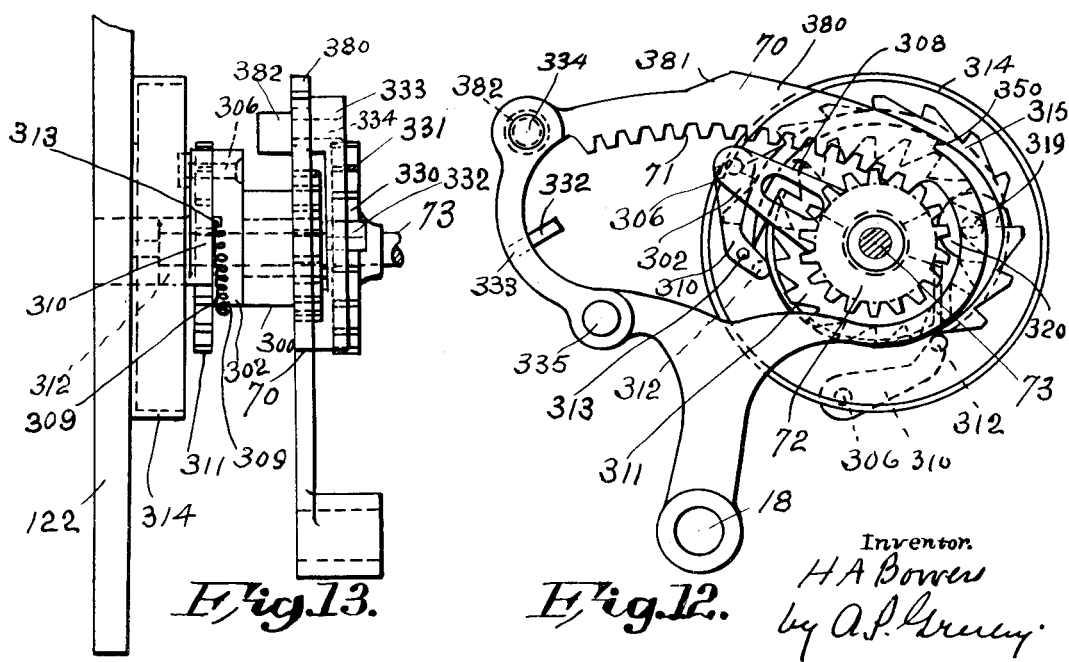

Fig. 12 (Sheet 3), is an end view of the unlocking mechanism within the main adding device.

Fig. 13 (Sheet 3) is a rear view of the mechanism shown in Fig. 12.

Fig. 14 (Sheet 4) is an end view of the means within the main adding device for operating the unlocking mechanism.

Fig. 15 (Sheet 4) is a detail view of the unlocking ratchet and means for operating it.

Fig. 16 (Sheet 4) is a side view of the ratchet guide.

Fig. 17 is a detail view of the ratchet switch.

Figs. 18 and 19 (Sheet 6) are respectively an end and rear view of the adding mechanism within the main adding device.

Fig. 20 (Sheet 6) is a detail view of the adding segments and pinion operated by it.

Fig. 21 (Sheet 6) is a detail view of the driving arm and driving pawl.

Fig. 22 (Sheet 6) is a detail view of the driving pawl support.

Fig. 23 (Sheet 6) is a detail view of the forward check pawl lift-plate.

Fig. 24 (Sheet 6) is a detail view of the driving pawl support lock.

Fig. 25 (Sheet 6) is a detail view of the adding ratchet.

Fig. 26 (Sheet 6) is a detail view of the forward check pawl.

Fig. 27 (Sheet 6) is a detail view of the backward check pawl.

Fig. 28 (Sheet 7) is a side view of the mechanism within the main adding device.

Fig. 29 (Sheet 8) is a rear view, partly in section, of the mechanism shown in Fig. 28.

Figure 30:
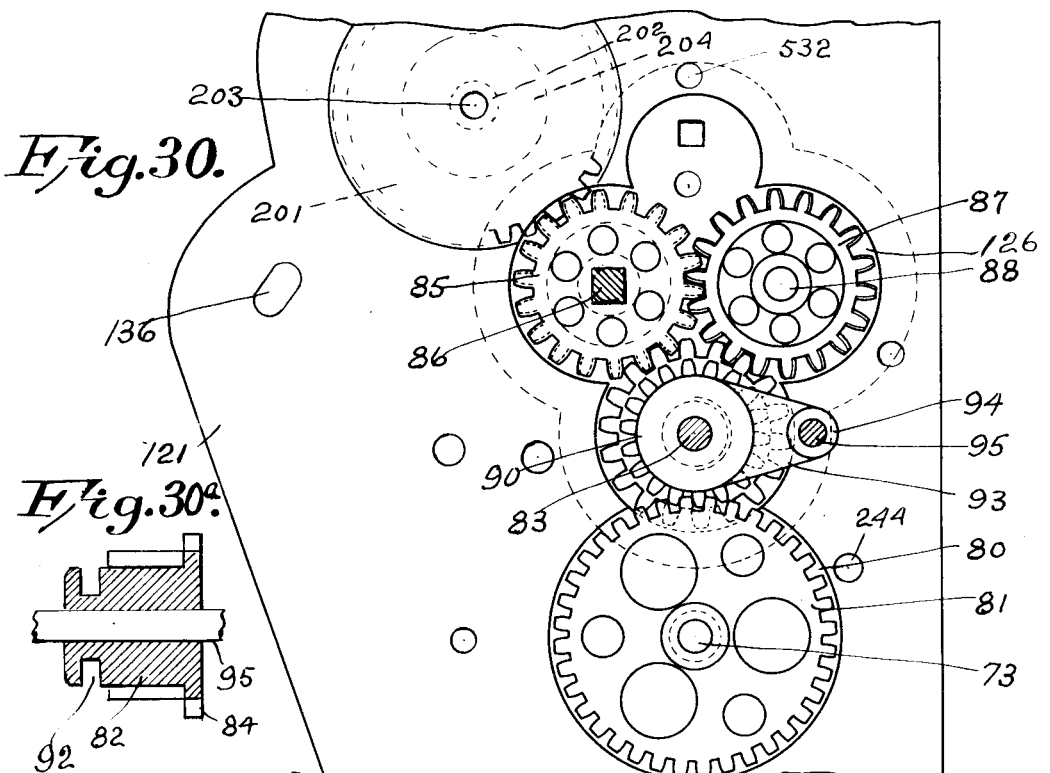

Fig. 30 (Sheet 9) is a detail view of the reversing mechanism.

Fig. 30ª (Sheet 9) is a detail view of the pinion-reversing mechanism.

Figure 31:
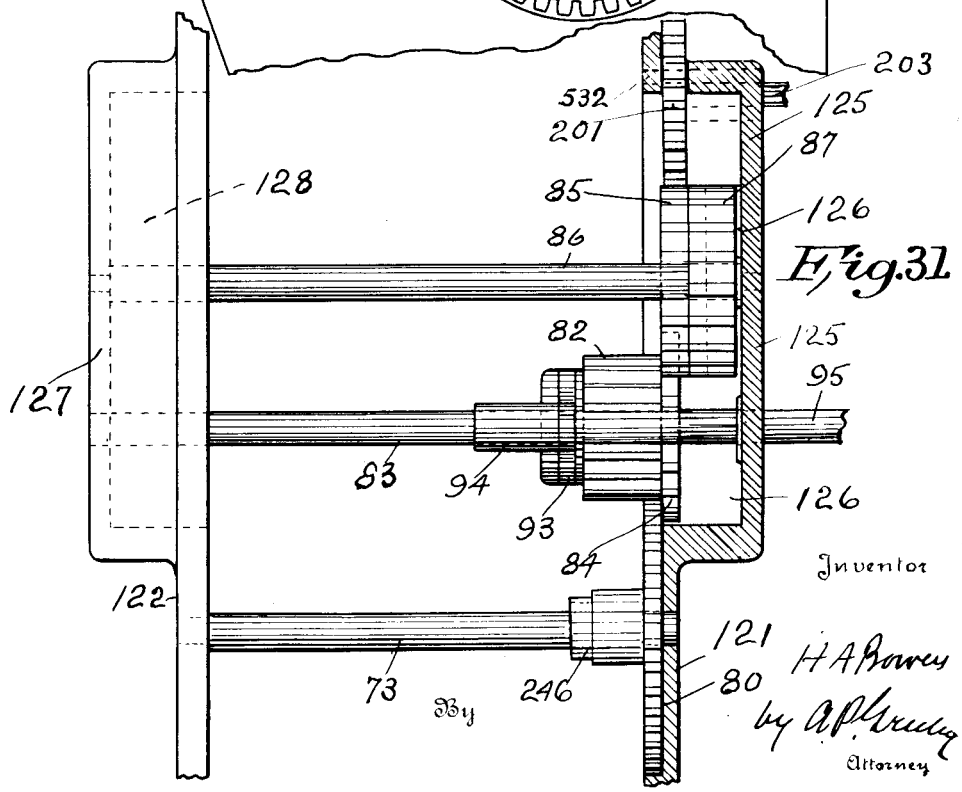

Fig. 31 (Sheet 9) is a rear view of the mechanism shown in Fig. 30.

Fig. 32 (Sheet 10) is a detail view of the master-controlled gear and means for shifting it.

Fig. 33 (Sheet 10) is a rear view of the mechanism shown in Fig. 32.

Fig. 33ª (Sheet 10) is a detail plan view of the cross-heads for shifting the master gear.

Fig. 34 (Sheet 11) is a side view of the sub-total or storage device.

Figure 35:
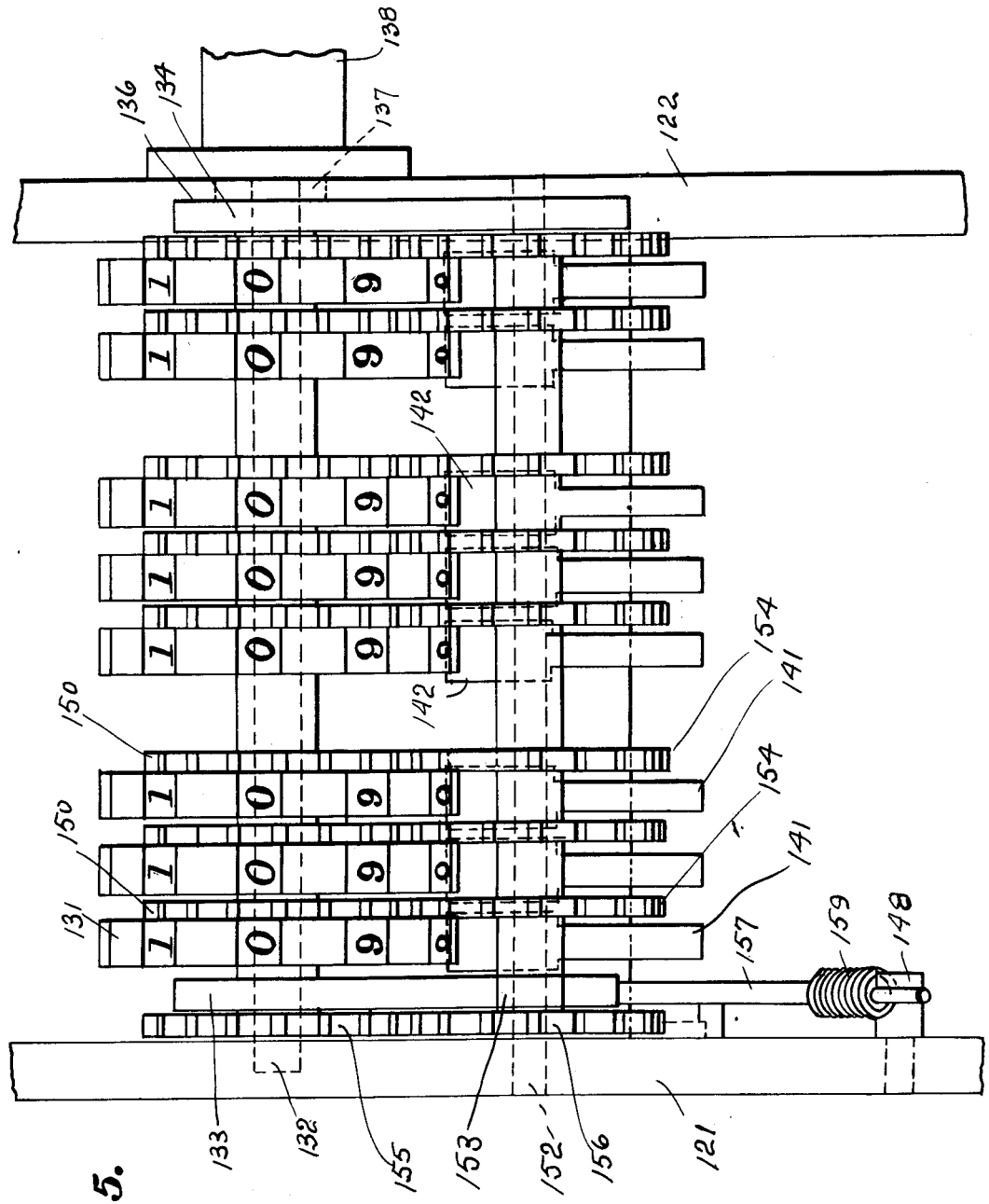

Fig. 35 (Sheet 12) is a front view of the sub-total or storage device.

Fig. 36 (Sheet 13) shows in side and front view the motion rocker.

Fig. 37 (Sheet 13) shows in side and front view the motion rocker pawl.

Fig. 38 (Sheet 13) shows in end and rear view the unlocking rocker.

Fig. 39 (Sheet 13) shows in side and rear view the knock-out rocker.

Fig. 40 shows in side and rear view the cross-head rocker.

Fig. 41 (Sheet 13) is a detail view on an enlarged scale of the cross-head rocker.

Fig. 42 (Sheet 13) shows in end and front view the terminal locking frame.

Figs. 43 and 44 (Sheet 14) are side views of the master-controlled device, Fig. 43 showing the device in normal position and Fig. 44 showing it in operated position.

Figs. 45 and 46 (Sheet 14) are respectively a top plan and side view of the end of the master-controlled arm.

Fig. 47 (Sheet 15) is a detail view showing the mechanism for operating and unlocking the lever of the multiple register and also showing the reversing mechanism.

Fig. 48 (Sheet 15) is a detail plan view of the end of the rod of the reversing mechanism.

Fig. 49 (Sheet 15) is a detail view showing the connection between the ribbon shift lever and the reversing mechanism.

Fig. 50 (Sheet 16) is a detail view showing the mechanism for operating index wheels of the master gear from the main adding device.

Fig. 51 (Sheet 17) is a detail end view of a multiple register and the connections by which the unlocking lever is operated and the index wheels rotated from the mechanism of the main adding device; also showing the reversing mechanism, the master-controlled mechanism and the transfer wheel locking mechanism operated by the movements of the multiple register with the typewriter carriage.

Fig. 52 (Sheet 18) is a detail view of the means for operating the coupling guides to connect and disconnect the unlocking and adding mechanisms from the numeral keys.

Figure 52ª is a detail view of the hand lever for operating the coupling guides.

Figs. 53, 54 and 55 (Sheet 19) are respectively a plan view, end view and front view of the cradle for the multiple registers.

Figure 56:
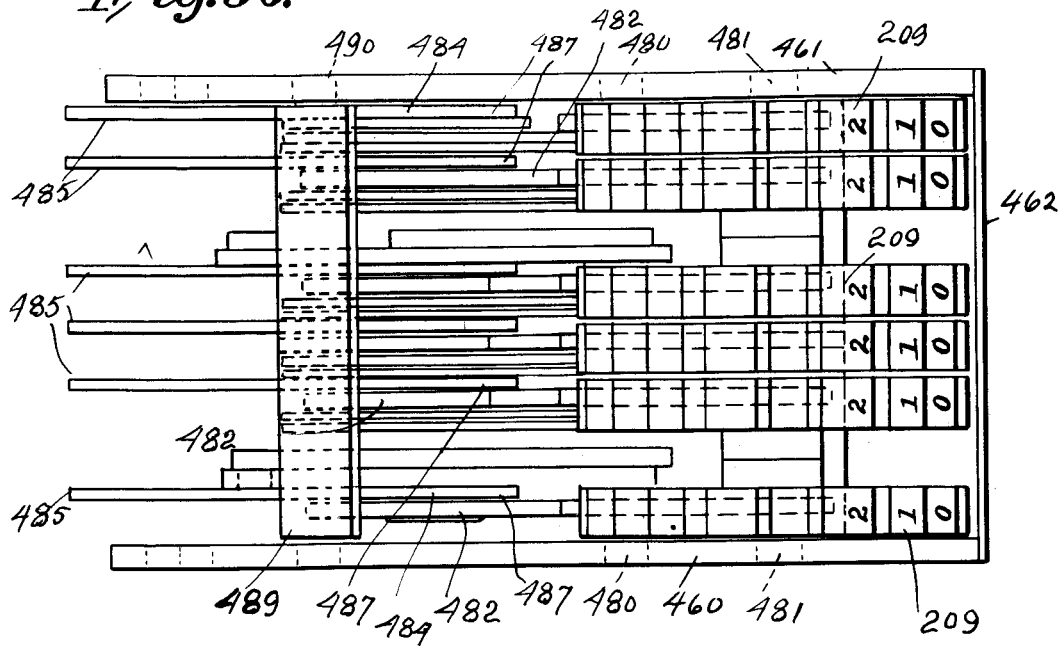
Figure 57:
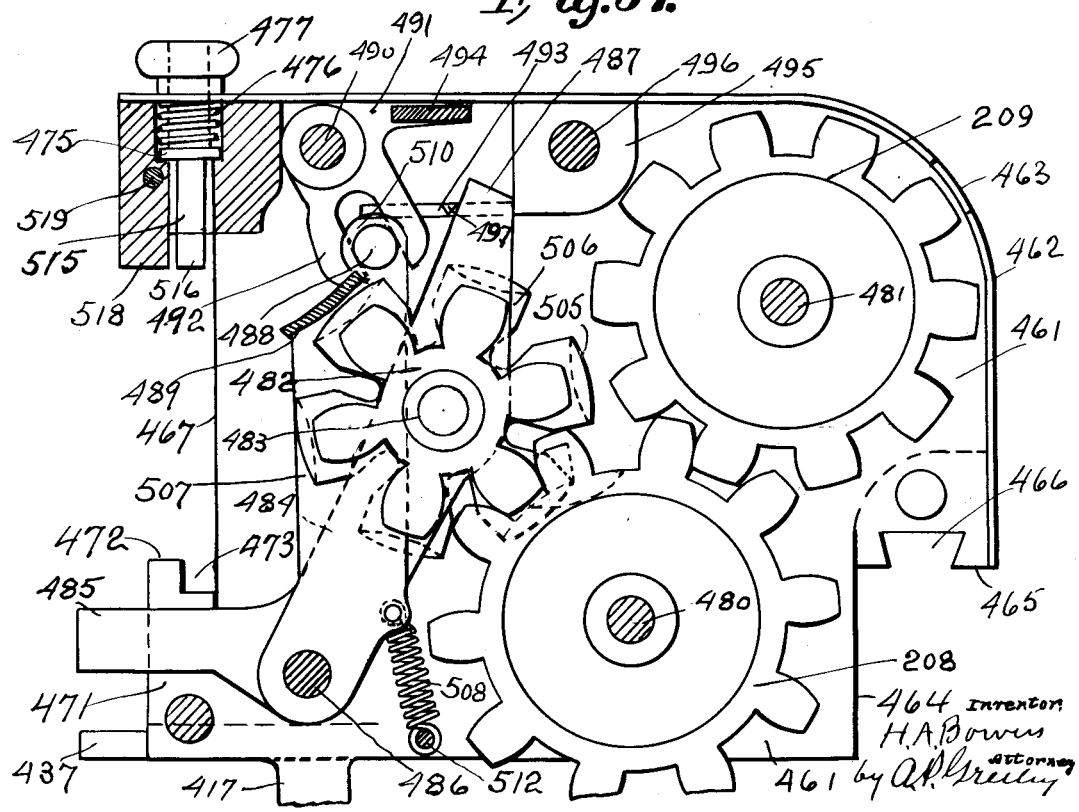

Figs. 56 and 57 (Sheet 20) are respectively a top plan view and side view of the mechanism of a multiple register.

Figs. 58 and 59 (Sheet 21) show detail views showing the driving mechanism of the index wheels of multiple registers in side front view.

Figure 60:
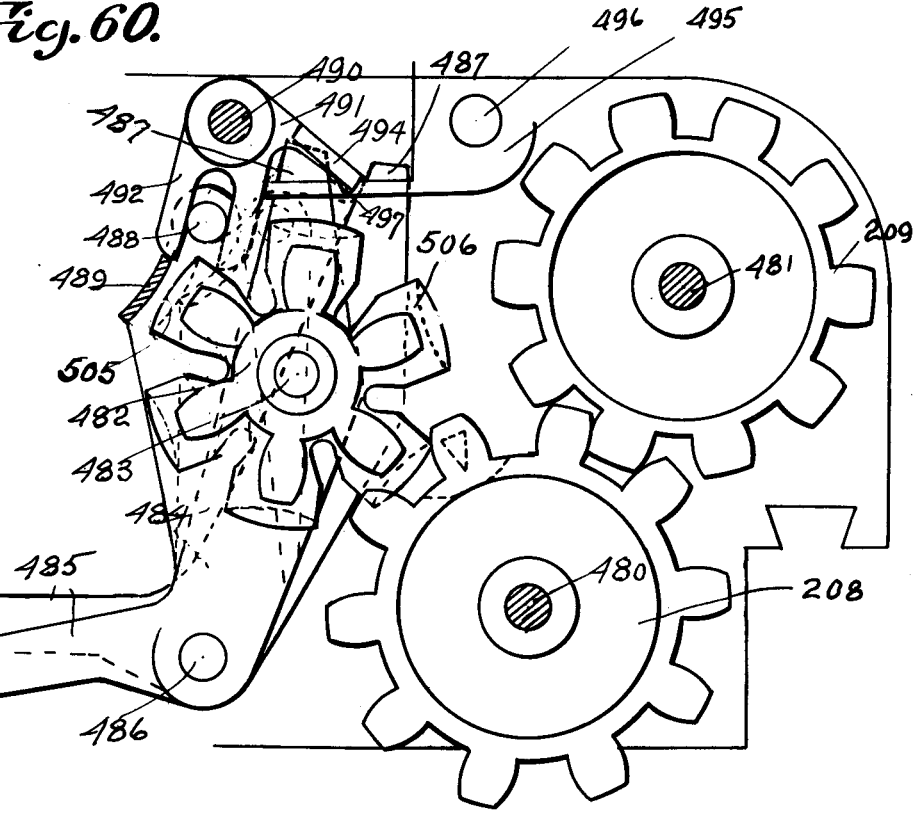

Fig. 60 (Sheet 22) is a detail view showing the operation of the unlocking lever of the multiple register and the locking plate.

Figures 61, 62:
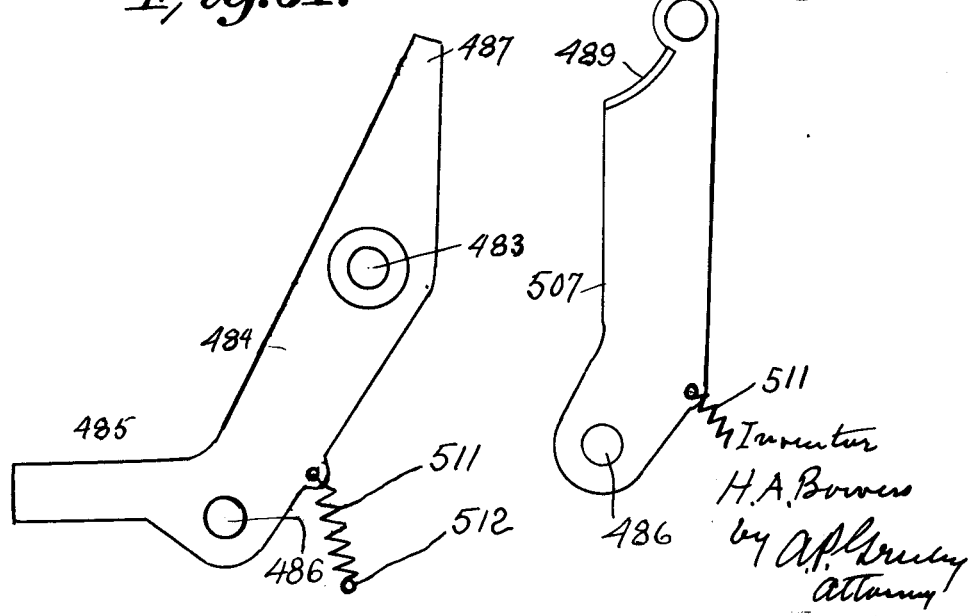

Fig. 61 (Sheet 22) is a detail view of the unlocking lever.

Fig. 62 (Sheet 22) is a detail view of the arms carrying the plate for locking the transfer wheels.

Figs. 63 and 64 (Sheet 23) are respectively a rear view and side view of the plates for locking the transfer wheels.

Figs. 65 and 66 (Sheet 23) are respectively a longitudinal and cross-sectional view of the means for locking the multiple register on the toothed rail of the cradle.

Figs. 67, 68 and 69 (Sheet 23) are side views, respectively of the start wheel, the guide wheel and the transfer gear of the transfer mechanism.

Fig. 70 (Sheet 24) is a detail sectional view of the intermediate gear and the transfer gearing operated by it.

Fig. 71 is a side view of the mechanism shown in Fig. 70.

Fig. 72 (Sheet 24) is a detail front view of the transfer gearing.

Fig. 73 (Sheet 24) is a detail view showing the mechanism for operating the unlocking shaft and adding shaft of the main adding device when these shafts are out of line with the portions of the shafts which are beneath the frame of the typewriting machine.

Fig. 74 (Sheet 25) is a side view of the driving arm of the adding mechanism within the main adding device.

Fig. 75 (Sheet 25) is an edge view of the driving pawl support.

Fig. 76 (Sheet 25) is an edge view of the driving pawl.

Fig. 77 is an edge view of the driving pawl support lock.

Fig. 78 (Sheet 25) is a detail view of the pin carried by the driving pawl support and the driving pawl support lock for the spring for the driving pawl.

Fig. 79 (Sheet 25) is an edge view of the adding gear.

Fig. 80 (Sheet 25) is a plan view of the forward check pawl.

Fig. 81 (Sheet 25) is a front view of the forward check pawl.

Fig. 82 is an edge view of the unlocking pawl support.

Fig. 83 (Sheet 25) shows, in edge and side view, the unlocking pawl.

Fig. 84 (Sheet 25) shows in end view, and longitudinal section, the unlocking ratchet.

Fig. 85 (Sheet 25) shows in section a side view of the unlocking ratchet.

Figs. 86, 87 and 88 (Sheet 25) show in plan view, front view and end view, respectively, the fixed guide for the levers carrying the transfer gears.

Fig. 89 (Sheet 26) shows, in side and edge view, one of the levers of the main adding device for carrying a transfer gear.

Fig. 90 (Sheet 26) shows in side and edge view the lever of Fig. 89 as modified to provide for the spaces for inserting commas or the decimal point.

Fig. 91, (Sheet 26) shows in side, edge and plan view the lever of Fig. 89 as used in connection with the units index wheel.

Fig. 92 (Sheet 26) is a longitudinal sectional view of the knob for shifting the sub-total or storage device into and out of operative position.

Fig. 93 (Sheet 26) is an end view of the knob shown in Fig. 92.

Figs. 94 and 95 are detail views showing the means for locking the sub-total or storage device into and out of operative position.

Figure 1:
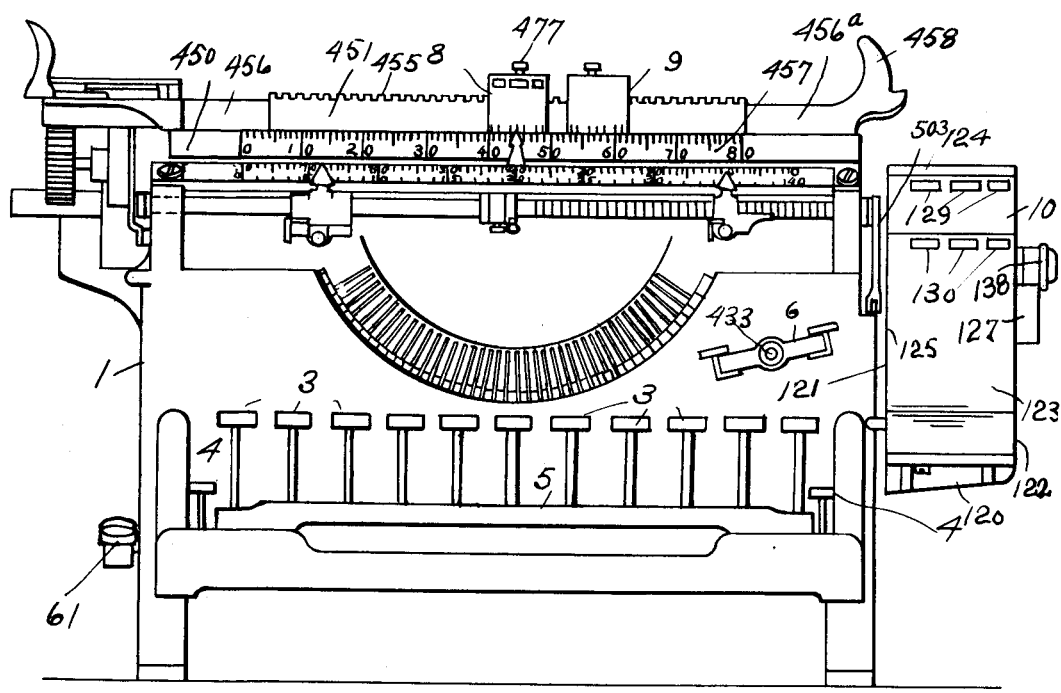
Figure 1 (Sheet 1) is a front view of a typewriting machine provided with a calculating device embodying my invention.

In the drawings 1, Figs. 1 and 2, indicate the frame of a typewriting machine here shown as that commonly known as the Underwood machine, having carriage 2, and the usual keyboard of which only the numeral keys 3 and shift keys 4 and spacing bar 5 are shown, and also having the usual ribbon shift lever 6.

The front portion of the frame of the carriage 2 is cut away to receive a frame or cradle 7, Figs. 2 Sheet 2 and 53 to 55 Sheet 19, hereinafter described in detail, on which are carried multiple registers 8 and 9, hereinafter described in detail, here shown as two in number, though only one, or more than two may be used, arranged to be operated by the numeral keys 3, as hereinafter described.

On the side of the frame 1, to the right of the keyboard is located the main adding device 10, arranged to be operated by the numeral keys, as hereinafter described, to add simultaneously with addition on one of the multiple registers at a time, to subtract simultaneously with addition on one of the multiple registers, to add simultaneously with subtraction on one of the multiple registers at a time, to add or subtract the amounts added or subtracted on two or more of the multiple registers, or to be operated to add or subtract independently of any operation of any of the multiple registers.

The casing of the main adding device 10 is supported by bracket 120 secured to the side of the typewriting machine and comprises side plates 121 and 122 and front plate 123 and top plate 124 and is also closed at the back. The side plate 121 has in its upper portion preferably integral with it, an outwardly extending box 125 forming a recess 126 within the casing and the side plate 122 has a corresponding box 127 on its outer face forming a recess 128 within the casing, the recess 126 and 128 being in line, Fig. 29, Sheet 8. The front plate is provided near its upper edge with a series of openings 129 through which the numerals on the outer ends of the registering wheels are visible, Figs. 1 and 2, and below these openings are openings 120 through which the numerals on the indicating wheels of a storage or sub-total register may be seen.

Figure 3:
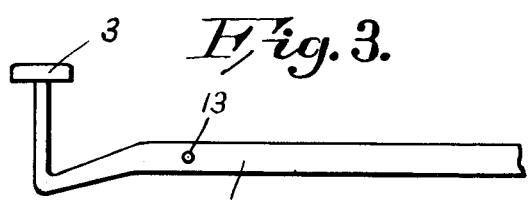
Figs. 3 and 4 (Sheet 1) are respectively a side view and top plan view of one of the numeral keys.
Figure 4:
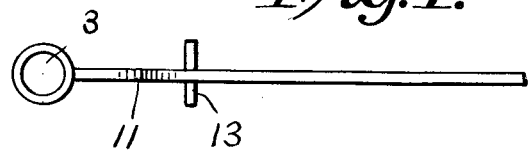

11 indicates a key lever of one of the numeral keys. Back of the frame bar 12 immediately in rear of the numeral keys the key levers of the numeral keys are each provided with a pin 13 extending laterally from one or preferably both sides, Figs. 3, 4 and 6. In rear of and below these pins 13 is arranged a rod 14, Figs. 6, 7 and 8, extending across the typewriting machine and mounted to rock in suitable bearings in the sides of a lower or foundation frame 17, Figs. 9 to 11, Sheet 5, which is secured to the frame of the typewriting machine. On this rocking rod 14 are arranged a series of coupling guides or arms 15 extending upward and having slots 16 open at their upper ends and extending downward about half the length of the arms. Below and to the rear of rocking rod 14 a rock shaft 18 extends across the typewriting machine and is journaled at its ends in foundation frame 17, and in front of and below the rocking rod 14 and preferably in the same plane as the rock shaft 18 is a rock shaft 19 also extending across the typewriting machine and journalled at its ends in the foundation frame 17. The rock shaft 18 is hereinafter referred to as the "interlocking shaft" and by its operation the registering and other mechanism in both the main adding device 10 and in the multiple registers are caused to be unlocked, and the rock shaft 19 is referred to as the "adding shaft", and by its operation the register wheels are caused to be rotated through the proper arcs while they are held unlocked.

On the rock shaft 18 are mounted by means of sleeves 20, differential levers 21 each, except the one for zero hereinafter referred to, having an upper arm 22, Figs. 7 and 8, Sheet 4, extending forward and having a goose neck 23 at its forward end, a downwardly extending arm 24 and a rearwardly extending arm 25. About midway of its length an upwardly extending swinging connecting arm 26 is pivoted on the arm 22 of the differential lever 21. The upper end of this connecting arm is curved rearward and carries a pin 27 which extends into the slot 16 of the connecting arm 15 and on its front edge this connecting arm is provided with a notch 28 to engage the pin 13 of a numeral key lever 11.

By rocking the arms 15 the notch 28 will be caused to engage or be disengaged from the pin 13. When this connecting arm is in its forward position with the notch engaging the pin 13, depression of the numeral key will cause the connecting arm to move downward and to rock the differential lever 21 on the interlocking shaft 18. Fast on the interlocking shaft 18 and extending forward and downward therefrom is the interlocking arm 30 having near its outer end a laterally extending pin 31 in the path of movement of the end of the arm 24 of the differential lever 21 so that as the differential lever is swung downward, its end will strike this pin 31, and as the differential lever continues its movement will carry this interlocking arm with it and cause the interlocking shaft 18 to be rocked. The arm 24 of the differential lever has at its end a forward extension or lug 32 on which, by means of pin 33, is pivoted an interlocking latch 34 having at its lower end a hook 35 adapted to engage the pin 31 of the interlocking arm 30. In the portion of this interlocking latch 34 above the pivot pin 33 is formed a curved slot 36 through which extends a fixed rod 37 supported at its ends in the foundation frame 17, the slot 36 being so formed that as the differential lever 21 is swung downward the interlocking hook will be caused to swing on the pivot 33 so that its hook 35 will engage the pin 31 of the interlocking arm 30 to hold the arm 24 of the differential lever locked to the interlocking arm 30, until the differential lever has completed its full movement.

On the adding shaft 19 and extending rearward therefrom is an adding arm 40 carrying at its end a laterally extending pin 41 in the path of movement of the forwardly extending arm 22 of the differential lever 21 and adapted to be received in the notch 42 of the goose neck 23. On the downward swing of the differential lever this arm 22 will engage the pin 41 in the notch 42 and carry it downward, swinging the arm 40, and with it the adding shaft 19, through a definite arc.

The arc through which the adding shaft 19 will be rocked will depend on the point in its movement at which the goose neck end of the arm 22 comes into engagement with the pin 41 of the particular adding arm 40. There are nine of these adding arms on the adding shaft, each secured on the shaft at a different angle, the arm corresponding to the "nine" numeral key extending rearward in about a horizontal plane, and the arm corresponding to the "one" numeral key extending rearward at a considerable angle to the horizontal, the arms corresponding to the numeral keys from two of eight extending rearward at increasing angles to the horizontal between that of the arm corresponding to the "nine" key to that of the arm corresponding to the "one" key, the arrangement being that commonly employed as in the patent issued to me July 20, 1920, No. 1,347,245.

The foundation frame 17, Figs. 9, 10 and 11, Sheet 4, is secured beneath the frame of the typewriting machine and comprises end portions 50 and a back plate 51, which is provided with a series of slots 52, each adapted to receive the rearwardly extending arm 25 of one of the differential levers 21, there being ten of those slots, one for each of the nine differential levers corresponding to the several numeral keys and one for the zero key. Pivoted on the front face of the back plate 51, at points above and between each two adjacent slots 52 and between each outer slot of the series and the ends of the frame, is a key lock 53. These key locks are substantially triangular in shape being each pivoted at 54 near its apex. Near its base each key lock has on each side a vertical face 55, for contact with the corresponding face of the adjacent lock, or in case of the key locks at each end of the series, with a fixed stop pin 56, and below this vertical face 55 each key lock is cut away at an angle as shown at 57.

The rearwardly extending arm 25 of the differential lever 21 has at its end an arc-shaped extension 58, which, as this arm 25 swings upwardly, enters the notch between two adjacent keylocks formed by the cut-away portions 57 and pushes the two keylocks apart and enters a slot 52. The key locks are so proportioned and arranged that, when two of them are thus pushed apart, the outer vertical faces 55 of the end keylocks of the series will be in contact with the fixed stops 56 so that until the arm 25 is withdrawn by the return of the differential lever to the initial position the arm 25 of no other differential lever can enter between any two key locks. All the differential levers and with them the numeral keys, except the one operated are thus locked against operation until the one operated returns to initial position.

A spring 60 connected at its rear end to an arm 15 and at its forward end to the frame of the machine serves to draw the coupling guides or arms 15 forward and hold the notches 28 of the connecting arm 26 in engagement with the pins 13 of the numeral key levers. The rock shaft 14 is rocked rearward to cause the notches 28 to be disengaged from the pins 13 by a lever 61, Figs. 1 and 2, on the left hand side of the typewriter machine, as hereinafter described, when it is desired to have the registering mechanism out of position to be operated by the numeral keys for a continued period, and is also arranged to be rocked by depression of the shift key 4, Fig. 52, Sheet 18, when during the operation of adding or subtracting, it is desired to write in the dollar mark or one or more of the other diacritical marks intended to be printed by the numeral keys. On pressing down the shift key 4 at either side of the key board the coupling guides 15 will, by the mechanism hereinafter described, be swung back to disengage the connecting arm 26 from the key levers and will be held disengaged while the shift key is held down, permitting one or more of the numeral keys to be operated to print the diacritical mark carried on its type bar, without operating the registering mechanism and, in releasing the shift key, the connecting arms will resume their engagement with the key levers.

The interlocking shaft 18 and the adding shaft 19, being, as above stated, journalled in the foundation frame 17, are necessarily below the level of the key board and if the main adding device 10 is arranged with its upper end a substantial distance below the level of the top of the main frame of the typewriting machine, these shafts 18 and 19 may extend directly into the main adding device, and, for convenience, in describing the operation of the mechanism, they will be considered as extending directly into the main adding machine. For reasons hereinafter explained, it is, however, found advisable to arrange the main adding device in the position in which it is shown in Figure 1, that is, with its upper end somewhat above the plane of the top of the main frame of the typewriting machine and as this brings the portion of the interlocking and adding shafts which are within the main adding device above and somewhat to the rear of the portions of these shafts which are below the key board, the two portions of these shafts must be so connected as to operate together. This may be done in any convenient manner as for instance by providing the portion of the adding shaft which extends into the main adding device with a rearwardly extending arm 62, Fig. 73, Sheet 24, corresponding to the arm 40 on the portion of shaft 19 which extends beneath the keyboard and connecting arms 40 and 62, by a link 63 and by providing the portion of the interlocking shaft 18 which extends into the main adding device with an arm 64 and connecting it by a link 65 to a corresponding arm 66 on the portion of the interlocking shaft which extends beneath the key board. It will be understood that whether the portions of these adding and interlocking shafts which are within the main adding device are or not in line with the portions of the corresponding shafts which extend beneath the key board, the two portions of each shaft move together in the rocking movement given to them by the depression of a numeral key through the differential lever as above described.

On the interlocking shaft 18 within the casing of the main adding device is secured the interlocking segment 70, Figs. 12 and 13 Sheet 3, Fig. 28, Sheet 7, and Fig. 29, Sheet 8, which, when the interlocking shaft is rocked by the depression of a numeral key and the downward swing of the differential lever 21 engages, by its internal teeth 71, the interlocking pinion 72, which rotates on shaft 73, and, through mechanism hereinafter described, unlocks the registering wheels, the master gear, by which, through intermediate gears, the registering wheels are rotated, and the transfer wheels, all of which are locked against rotation until a numeral key has been depressed to the point at which the adding shaft 19 is about to be rocked.

The adding shaft 19 carries secured on it within the casing of the main adding device, the adding segment 74, Fig. 14, Sheet 4, Figs. 18, 19 and 20 Sheet 6, Fig. 29, Sheet 8, the teeth 75 of which engage the teeth 76 of the adding pinion 77 which is mounted to rotate on the cylindrical rod 73 and, through mechanism hereinafter described, effects rotation of the master gear which, through the intermediate gears, rotates the registering wheels. The angular position of the arm 40 on the adding shaft 19 determines the extent to which the adding segment 74 is rocked and thus gives to the registering wheel actuated the amount of rotation corresponding to the numeral key depressed. The downward swing of the differential lever 21 being the same for all the numeral keys the rocking movement of the interlocking shaft 18 and the interlocking segment 70 carried by it will be always the same whatever one of the numeral keys is depressed.

Fast on the shaft 73 is a recess 80 in the inner face of the side plate 121 of the main adding device which is adjacent the frame of the typewriting machine, is the adding gear 81, Fig. 19 Sheet 6, Figs. 30 and 31 Sheet 9, which, through intermediate mechanism carried on the shaft 73 between the adding pinion 77 and the adding gear, is caused to rotate through a predetermined arc by the movement of the adding segment 74. This adding gear 81 is in mesh with a long pinion 82 Fig. 31 which rotates on and slides on a cylindrical rod 83. Secured to this long pinion is a gear 84, the teeth of which are adapted to mesh with the teeth of two gears 85, fast on the shaft 86, and 87 mounted to rotate on cylindrical rod 88 Fig. 30. The teeth of gears 85 and 87 are in mesh. These gears 85 and 87 are arranged in a recess 126 in the side plate 121 of the casing of the main adding device. These gears 85 and 87 are of greater width than the gear 84 and are so arranged that they are not directly in line but overlap for a portion of their width, the gear 87 being arranged with its face adjacent the wall of the recess 126 while the corresponding face of gear 85 is at a distance from said wall of the recess equal to about twice the thickness of the gear 84.

The sliding pinion 82 is provided, at the end opposite to that on which the gear 84 is secured, with a hub 90 having an annular groove 92, Fig. 30ª, Sheet 9, to receive a fork 93, carried by a sleeve 94 on a rod 95. When the sleeve 94 and the fork 93 is in the position shown in Fig. 31, Sheet 9, the teeth of gear 84 are in mesh with the teeth of gear 85 and rotation imparted to the adding gear 81 is transmitted through pinion 82 and gear 84 to gear 85 rotating shaft 86 in one direction, and when through movement of the sleeve 94 and fork 93 the pinion 82 is shifted to move gear 84 out of mesh with gear 85 and into mesh with gear 87, the rotation of gear 80 is transmitted through the pinion 82 and gear 84 to gear 87 and by gear 87 to gear 85, causing shaft 86 to rotate in the opposite direction.

Shaft 86 is square, or other than circular in cross-section. On it is carried the master gear 100, which is adapted to be moved along the shaft but rotates with it, Fig. 28 Sheet 7, Figs. 32 and 33 Sheet 10. 101 indicates a series of intermediate gears, corresponding in number to the number of register wheels used, mounted to rotate on a fixed rod 102 and having teeth adapted to mesh with the master gear 100. The teeth of each one of the intermediate gears 101 are in mesh with the teeth of one of the index wheels 103 which are mounted to rotate on fixed rod 104 and have on the outer faces of their teeth numerals adapted to be seen through suitable openings in the front plate of the main adding device. Between each two adjacent intermediate gears 101 is a transfer gear 106, Fig. 28, Sheet 7, carried on the forwardly extending arm 107 of a lever 108 of inverted L-shape, Figs. 89 to 91 Sheet 26, the lower arm 109 of which is pivoted on a fixed rod 110. From the rear portion of arm 107 an arm 111 extends upward and to this is secured the rear end of a spring 112, Fig. 28, Sheet 7, the forward end of which is secured to a rod 113 carried by the side plate of the casing and extending across the main adding device. This spring acts to swing the lever 108 so that the forward end of arm 107 will be depressed and will hold the transfer gear carried by it down in position to engage the intermediate gears.

The shifting of the sleeve 94 carrying the fork 93 to cause the shifting of gear 84 from gear 85 to gear 87, or the reverse, in order to effect a reversal of the direction of rotation of the registering wheels is effected, through mechanism hereinafter described, by operation of the ribbon shift lever 6 and is also arranged to be effected automatically, if desired, by the operation of the typewriter carriage, as hereinafter described.

The master gear 100 is moved along the shaft 86 by the movement of the typewriter carriage, as hereinafter described, the master gear being moved step-by-step from position in line with a registering wheel of higher denomination to position in line with the registering wheel of next lower denomination, as the carriage is advanced in the operation of printing, the movement of the master gear being, of course, in reverse direction to the movement of the typewriter carriage.

Within the casing of the main adding device forward of the intermediate gears 101, is a series of index wheels 131, Fig. 28 Sheet 7, Fig. 34, Sheet 11, and Fig. 35, Sheet 12, mounted to rotate on a shaft 132, carried on arms 133 and 134 of a rocking frame adapted to swing on fixed rod 135 carried by the side plates 121 and 122. One end of rod 132 extends into a recess 136 in side plate 121 and the other end extends through the slot 137 which extends through side plate 122, the recess 136 and slot 137 permitting a limited rocking movement of the rocking frame. The end of the rod in the slot 137 in side plate 122 is provided outside the side plate with a knob 138 by which the rocking frame may be rocked.

The rocking frame is so arranged that when swung rearward by means of the knob 138 Figs. 93, 94, and 95 the teeth of the index wheels 131 carried by it will be in mesh with the teeth of the intermediate gears 101 and when swung forward will be out of mesh. Pivoted on a rod 140 carried by the arms 133 and 134 of the rocking frame near the fixed rod 135 are braking arms 141, Figs. 34 Sheet 11 and 35 Sheet 12, having their free ends 142 adapted to bear against the teeth of the index wheel to check their rotation. These curved ends 142 of these braking arms are pressed against the teeth of the index wheels by springs 143 connected at one end to a tail piece 144 of the braking arm and at the other end to a rod 145, the movement of these braking arms being limited by a rod 146 extending through a slot 147 in the arm.

On the side of each of these index wheels 131 is a gear 150, the teeth of which are cut away at 151. Below the rod 132 is a fixed rod 152 on which is mounted a sleeve 153 carrying a series of gears 154, one for each gear 150, adapted to have their teeth mesh with the teeth of gear 150 when the rocking frame is moved forward to disengage the index wheels 131 from the intermediate gears 101.

At one end, the shaft 132, Fig. 35, Sheet 12, is provided with a gear 155, the teeth of which mesh with the teeth of a gear 156 on the end of the sleeve 153. By rotating the shaft 132 by means of the knob 138, the gear 155 rotates the gear 156 and with it the sleeve 153 and the gears 154 carried by it. When the rocking frame is in forward position, the gears 154 will be in mesh with the gears 150 of the index wheels 131 and will rotate them until the cut away portions 151 are opposite the teeth of gears 154. These cut away portions are so arranged with reference to the numerals on the ends of the teeth of index wheels 131 that when the cut away portions are opposite the teeth of gears 154, the zero will be presented at the sight opening 130. Further rotation of the gears 154 will not rotate any of the gears 150 which have been rotated to the point indicated. The storage or subtotal index wheels will thus be reset to zero.

Below the plane of the rod 152 on side plate 121 is a stud 149, on which is mounted a bell crank lever 157, the forwardly extending arm of which carries a roller 158 in line with the teeth of gear 154. To the downwardly extending arm of this bell crank lever is attached one end of a spring 159, the other end of which is secured to a stud 148 on the side plate 121, this spring serving to press the roller 158 against the teeth of gear 154 and thus yieldingly lock it against rotation except when positively rotated by rotating the knob 138.

The arm 141 by reason of its curved end 142 permits rotation of the index wheels 131 in either direction and yieldingly locks them against rotation except when positively rotated.

The arm 134 of the rocking frame is provided on its outer face with an extended bearing sleeve 160, Fig. 92, Sheet 26 extending through the slot in side plate 122 of the casing, and this bearing sleeve is provided at its outer end with oppositely arranged open ended recesses 161. The knob 138 fits over the extended bearing sleeve 160 and is provided with a cross pin 162 adapted when the base of the knob is in contact with the outer face of the side plate 122 to enter the recesses 161 and lock the knob against rotation on the bearing sleeve. The base of the knob is provided with a laterally extending arm 163, Figs. 92 and 93, Sheet 26, provided with an inwardly extending pin 164, adapted to enter either one of recesses 165 and 166 in the outer faces of the side plate to hold the rocking frame in either of its two positions, that is with its index wheels 131 in engagement or out of engagement with the intermediate gears 101. The cross pin 162 secures the knob on the shaft 132. The portion of the shaft 132 extending through the extended bearing sleeve 160 is reduced in diameter to extend through the opening in an inwardly extending annular lug 167 within the bearing sleeve 160, this reduced portion extending to a flange 168 on the shaft 132. Between the annular lug 167 and the flange 168 is a coiled spring 169 surrounding the reduced portions of the shaft and tending to press the shaft inward in reference to the bearing sleeve. In order to permit of this longitudinal movement of the shaft 132, it has a sliding connection with the gear 155 being provided with an open ended slot 170 at its end which engages cross pin 171 in the hub of the gear 155.

In order to swing the rocking frame into or out of position to bring the index wheels 131 into mesh with the intermediate gears 101, the knob 138 is drawn outward to disengage the pin 164 from the recess 165 or 166 in which it may be, and by moving the knob up or down, as the case may be, the rocking frame is swung on the rod 135. As soon as it reaches the limit of its movement the spring 169 forces the knob inward carrying the pin 164 into the recess 166 or 165, Fig. 94, Sheet 26, locking the rocking frame against movement. When the rocking frame is in the position in which the index wheels 131 are out of engagement with the intermediate gears 101, the index wheels may be reset to zero by drawing the knob 138 outward until the cross pin 162 is out of the recess 161 of the bearing sleeve and rotating the knob. Rotation of the knob rotates shaft 132 and through gear 155 rotates gear 156 and gear 154 which, being in mesh with gears 150, rotate the index wheels until the teeth of gears 154 enter the cut away portion 151. The index wheels will then be set to zero. Each index wheel stops when the cut away portion 151 of its gear 150 is opposite the teeth of a gear 154, and further rotation of the gear 154 will not affect it. The knob should be rotated until all of the index wheels are thus reset to zero, namely one full rotation.

Gear 85 on shaft 86 meshes with and drives gear 201 on sleeve 202 on shaft 203 which extends within the line of the frame of the typewriting machine and carries gear 204 which meshes with gear 205 on a shaft 206 which extends part way across the frame of the typewriting machine and carries on its end a gear 207, Fig. 2, Sheet 2, Fig. 50, Sheet 16, Fig. 51, Sheet 17, Figs. 58 and 59, Sheet 21, which is adapted to mesh with and drive gears 208 which mesh with and rotate index wheels 209 of the multiple register 8, Figs. 56 and 57, Sheet 20, Figs. 58 and 59, Sheet 21. Rotation of the gear 81 will thus effect, through the gearing described, the rotation of the index wheels 103 of the main adding device and the index wheels 209 of the multiple register or registers carried on the frame or cradle 7 on the front of the carriage 2. The gear 201 is arranged in a recess 200 in the outer face of the side plate 121 and extends through one side of the box 125 with the recess 126.

The gear 81 is rotated, always in the same direction, through an arc depending on which one of the numeral keys is depressed. Adding pinion 76, Figs. 18 to 20, Sheet 6, Fig. 84, Sheet 25, is free to rotate with reference to the shaft 73 as before stated when actuated by the adding segment 74. To the adding pinion 76, on the side towards the side plate 121, is secured by pins 220, 221 and 222 a driving arm 224, Fig. 21, Sheet 6, Fig. 74, Sheet 25 on the hub 245 of which the adding pinion is mounted, and this driving arm carries near its outer end a pin 225 extending towards the side plate 121. On the side of this driving arm 224 towards the side plate 121 is also secured by means of the pins 220, 221 and 222 forward check pawl lift plate 226 Fig. 23, Sheet 6, having formed therein near its outer edge a cam slot 227 which serves to lift the forward check pawl 250. Fast on the hub 246 of the adding gear 81, at a slight distance from the forward check pawl lift 226, is the adding ratchet 229, Fig. 25, Sheet 6. Loose on the hub 246 of the adding gear next to this adding ratchet 229 on the side towards the side plate 121 is carried the driving pawl support 230, Fig. 22, Sheet 6, Fig. 74, Sheet 25, having near its outer end, in the side away from the side plate 121 a pin 231 on which is pivoted the driving pawl 232, Fig. 21, Sheet 6, the point 233 of which engages the teeth of the ratchet 229. Near the point 233 this driving pawl 232 is provided with a pin 234, Figs. 74, 77, 78, Sheet 25, to which is secured one end of a coil spring 235, the other end of which is secured to a pin 236 on the driving pawl support 230, the spring lying in a groove 237 formed partly in this driving pawl support and partly in the driving pawl support lock 238 which is secured to the driving pawl support 230 by pins 240, 241 and 242 and is provided with the single tooth 243.

Pivoted on a stud 244 on the side plate 121 is a double arm pawl 250, Fig. 26, Sheet 6, Figs. 80 and 81, Sheet 26, termed the forward check pawl, the upper arm 251 of which is provided with a pin 252 extending in a direction away from the side plate 121 and into the cam slot 227 of the plate 226. The lower arm 253 of the forward check pawl is provided with a tooth 254 in the path of movement of the single tooth 243 of the driving pawl support lock and having a lateral extension 255 on the side towards the side plate 121 adapted to engage a tooth of the check ratchet 256, Fig. 19, Sheet 6, which is carried on the hub 246 on the adding gear 81 and is secured to the adding gear.

Also pivoted on the stud 244 is a pawl 260 termed the backward check pawl. This extends forward from the stud 244 over the check ratchet 256, the teeth of which it is adapted to engage. This backward check pawl is provided with a tail piece 261 to which is secured one end of a spring 262, the other end of which is secured to the side plate 121 above the plane of the stud 244, this spring serving to keep the point of this backward check pawl in contact with the teeth of the check ratchet 256.

The driving pawl 232, Fig. 21, Sheet 6. is recessed on its outer edge to leave a shoulder 270 near its pivot end and a shoulder 271 near its point end and in rear of its pivot it is provided with a shoulder 272.

The parts of the adding mechanism carried on shaft 73 being in the position shown in Figure 18, Sheet 6, as the adding segment 74 begins its movement it will rotate the adding pinion 77 which will rock the driving arm 224 carrying with it the forward check pawl lift plate 226. In the initial movement of the adding pinion 77 the pin 225 of the adding arm 224, which, when the parts are at rest is against the shoulder 270 of the driving pawl 232, will move forward along the outer edge of this driving pawl. The pin 252 of the forward check pawl 250 which, when the parts are at rest, is in the portion 227' of the slot 227 of the forward check pawl lift plate 226, Fig. 23, Sheet 6, and the lateral extension 255 is thereby held in engagement with a tooth of the check ratchet 256 locking this ratchet and the adding gear 81 against rotation, and the tooth 254 is against the single tooth 243 of the driving pawl support lock 238. During the initial movement of the driving pinion the pin 252 remains in this portion of the slot 227. As the pin 225 reaches the shoulder 271 of the driving pawl, the pin 252 of the forward check pawl is engaged by the main portion of the slot 227 of the forward check pawl lift plate and the forward check pawl 250 is rocked to swing its tooth 254 out of the path of the tooth 243 of the driving pawl support lock 238 and to swing its lateral extension 255 out of engagement with the teeth of check ratchet 256, leaving the check ratchet and adding gear 81 free to rotate and also leaving the driving pawl support free to rotate. As the pin 225 comes in contact with shoulder 271 of the driving pawl it forces the point 233 of this pawl into engagement with the teeth of driving ratchet 229 so that in the further movement of the driving pinion and the parts carried by it the ratchet 229 will be rotated and, being fast on the hub of the adding gear 81, will rotate the adding wheel with it and, as the adding gear 81 is fast on shaft 73, will rotate shaft 73.

On the completion of the rocking movement of adding segment 74, through the arc determined by the numeral key operated, the backward check pawl 260 will engage the teeth of check ratchet 256, and prevent any backward rotation of the adding gear 81.

As the segment 74 returns to initial position it will rotate the driving pinion 77 backward and the driving arm 224 will carry its pin 225 away from the shoulder 271 of the driving pawl 232 and, as it strikes the shoulder 270 of this pawl, will swing the pawl on its pivot 231 to lift its point 233 out of positive engagement with the teeth of driving ratchet 229, the spring permitting the point 233 to pass over the teeth of the ratchet.

On the shaft 73 towards the outer side plate 122 of the casing of the main adding device is carried the interlocking mechanism actuated by the interlocking segment 70, Figs. 12 and 13, Sheet 3, Figs. 14, 15, 16, 17, Sheet 4, Figs. 82, 83, 84 and 85, Sheet 25. The interlocking pinion 72, the teeth of which are in mesh with the teeth of segment 70, is provided with a long sleeve 300 which extends towards the side plate 122 and fits over the hub 301 of the interlocking pawl support 302, the interlocking pinion and the interlocking pawl support being secured together by pins 303, 304 and 305.

Near its end the interlocking pawl support 302 is provided with a pin 306 on which is pivoted the interlocking ratchet pawl 310 and is also provided on one edge with a stud 308 on which is secured one end of a spring 309. The interlocking pawl 310 at its free end is adapted to engage the teeth of the interlocking ratchet 311 which is fast on the shaft 73, and is also provided at its free end with a laterally extending pin 312 on the side towards the side plate 122. On the interlocking pawl 310 is also a pin 308 on which is secured one end of spring 309, the other end of which is secured to stud 313 on the interlocking pawl support 302, the intermediate portion of this spring lying against the sleeve 300 of the interlocking pinion 72. Against the inner face of side plate 122 is secured a casing 314 into which the pin 312 of the interlocking pawl 310 extends. Within this casing is arranged a ratchet guide 315, Fig. 16, Sheet 4, for the pin 312 of the interlocking pawl 310 by which this pawl is held in engagement with the teeth of the interlocking ratchet 311 until the interlocking mechanism has completed its full stroke and is then moved out of engagement and held against reengagement with the teeth of the ratchet and prevented from any forward movement until it has returned to initial position. This guide 315 consists of a curved strip in the upper part of the casing having its inner face concentric with the shaft 73 and about a half circle in extent. The outer face of this guide plate is provided with ratchet teeth 316 adapted to permit the pin 312 to pass over them only in the return movement.

Below the ratchet guide 315 is a plate 317 having at its edge a flange 318. This flange is concentric with the shaft 73 and at its upper end overlaps the forward end of the ratchet guide 315 and is of a diameter sufficiently less than that of the inner face of this ratchet guide 315 to permit the pin 312 to pass between its outer face and the inner face of the ratchet guide. Within the rear portion of the ratchet guide 315, on a pin 319, is pivoted to the casing 314 a ratchet switch 320, Fig. 17, Sheet 4. This ratchet switch is provided on its outer face with one or more teeth corresponding to the teeth 316 on the outer face of the ratchet guide 315 and within the bases of these teeth it is provided with a guide rib 321 extending from near the pivot 319 to the point 322 at which the switch terminates, the inner face of this guide rib being so formed that as the pin 312 moves along it in its forward movement the point of the switch will be pressed outward against the force of a spring 323. The point 322 of the switch rests against the flange 318 of the guide plate 317 near its inner end, the flange extending from this point inward as shown at 324.

As the pin 312 is carried forward by the swing of the interlocking pawl support 302, it will enter the space between the ends of the ratchet guide 315 and the flange 318 and will be prevented from outward movement, holding the pawl 310 close to the teeth of ratchet 311, until it reaches the inwardly turned portion 324 of the flange 318. In this movement the pin 312 comes in contact with the guide rib 321 causing the switch 320 to swing outward. As the pin reaches the end of its movement it rides out onto the flange 318 and as it passes beyond the point 322 of the switch the switch is returned to normal position by the spring 323. As the pin begins its return movement it rides outward on the outer face of the switch and raises the end of the pawl 310 out of engagement with the teeth of the ratchet 311. As it continues its return movement it engages the teeth 316 on the outer face of ratchet guide 315 and is prevented from moving otherwise than in continuation of its return movement.

The forward swing of the interlocking pawl support 302 is effected by the rotation of the interlocking pinion 72 which is rotated by the teeth of the segment 70. Until the shaft 73 begins to rotate, rotating the interlocking ratchet wheel 311, the end of the interlocking pawl 310 passes freely over the teeth of this ratchet wheel in its forward movement but, as it is pressed against these teeth by the spring 309, it cannot move rearward in reference to the ratchet wheel being thus locked against rearward movement after it has begun to move forward and necessarily locking the interlocking pawl support and the interlocking pinion against rearward movement. As soon as the shaft 73 begins to be rotated by the adding mechanism, the interlocking ratchet wheel 311, which is fast on this shaft, rotates in a forward direction with the pawl 310, until it has completed its movement of rotation, the pawl 310 with its pin 312 preventing any rotation of the ratchet wheel 311, which is rotated by the adding mechanism, relative to the rotation of the interlocking pawl support 302, which is rotated by the interlocking mechanism.

When, for instance, the 4 numeral key is depressed, the interlocking shaft begins to rock, rocking the segment 70 rotating the interlocking pinion 72 and with it the interlocking pawl support 302, and carrying pin 312 into the space between end of the ratchet guide 315 and the flange 318, the pin passing over the teeth of the interlocking pinion 311. As the gooseneck 23 of the differential lever 21 reaches the pin 41 of the adding arm 40, the adding shaft is rocked and, through the segment 74 rotates adding pinion 77. This swings the driving arm 224 forward and causes its pin 225 to move forward on pawl 232 until it reaches shoulder 271, when it forces the tooth 233 into engagement with the teeth of adding ratchet 229 and causes the ratchet to rotate, rotating with it the adding gear 81 and the shaft 73. The rotation of the shaft 73 causes the interlocking ratchet wheel 311 to rotate with the rotation of the interlocking pawl support 302. Backward rotation of the adding gear 81 is prevented by the backward check pawl 260, which also prevents any backward rotation of the interlocking ratchet wheel 311, and through engagement of the pawl 310 with the teeth of ratchet 311, prevents any backward movement of the interlocking pawl support 302 and the interlocking pinion 72. On the completion of the rotation of the adding gear 81, the pin 312 reaches and lifts the switch 320 and passes it to the outside of the guide 315 and is freed from engagement with the interlocking ratchet wheel 311 and the interlocking pawl support is free to return to its initial position, together with the interlocking pinion 72.

When the 9 numeral key is depressed the rocking of the adding shaft begins practically simultaneously with the rocking of the interlocking shaft, and the adding gear 81, the shaft 73 and the interlocking ratchet wheel 311 begin to rotate as soon as the pin 225 of the driving arm 224 reaches the shoulder 271.

When the 0 key is depressed its differential lever not being provided with the gooseneck 23, the adding shaft is not rocked. The rotation of the interlocking shaft effects the rotation of the interlocking pinion 72, and the interlocking pawl 310 passes over the teeth of the interlocking ratchet wheel 311, which remains stationary, serving to prevent any backward movement of the interlocking mechanism until the pin 312, having completed its full stroke, lifts the switch 320 and is free to return on the outside of ratchet guide 315.

Between the adding mechanism carried on the shaft 73 and the interlocking mechanism just above described is secured on the shaft, the forward check ratchet wheel 330, Fig. 13, Sheet 3, Fig. 28, Sheet 7, provided with long teeth 331. As the interlocking segment nears the end of its forward movement the single tooth 332 carried on a bar 333 secured by pins 334 and 335 on the side of the segment 70 at its rear end, is caused to enter between two of the teeth 331 and to thereby lock the shaft 73, and with it the adding gear 81 against further rotation.

It will be noted that while the segments 70 and 74 are carried on shafts on opposite sides of the shaft 73 and are both rocked inward, the pinions 72 and 77 rotated by them are both rotated in the same direction, the teeth of segment 70, operated by the rear shaft 18, being internal teeth above the pinion 72 and the teeth of segment 74, operated from the forward shaft 19, being external teeth. It will also be noted that the shaft 73 is rotated only by the adding mechanism, the interlocking ratchet 311 being fast on it.

It should also be noted that the interlocking mechanism carried on shaft 73 begins effective operation before the adding mechanism carried on the same shaft begins to effect any rotation of the adding gear 81.

On a shaft 340 forward of shaft 83 is secured the motion rocker 341, Fig. 28, Sheet 7, Fig. 36, Sheet 13, having a pair of downwardly extending arms 342 and 343 having forwardly extending tail pieces between which, on pin 346 is pivoted a bell crank rocker pawl 347, Fig. 28, Sheet 7, Fig. 36, Sheet 13, the upper end of the upper arm 348 of which is adapted to bear against the forward edge of the motion rocker and the horizontal arm 349 of which extends rearward in the path of movement of a shoulder 350 on the upper edge of the interlocking segment 70. As this segment is rocked forward the shoulder 350 strikes the end of arm 349 of the motion rocker pawl Fig. 28, Sheet 7, and, as the upper end of this pawl bears against the front edge of the motion rocker 341, causes the motion rocker to rock and to rock the shaft 340. The upwardly extending arm 351 of this motion rocker is provided with an open ended slot 352 in which is received a pin 353 carried by the downwardly extending arms 354 and 355 of a terminal locking frame, Fig. 28, Sheet 7, Fig. 42 Sheet 13, which is pivoted on the shaft 102 carrying the intermediate gears 101, and carries on the upwardly extending arms 356 and 357 a rod 358 adapted to enter between two adjacent teeth of the index wheels 103 and hold them locked against rotation. The forward rocking of the arms 342 and 343 of the motion rocker causes the arm 351 to rock rearward which rocks the arms 354 and 355 of the terminal locking frame rearward rocking the upper arms 356 and 357 forward carrying the rod 358 out of engagement with the teeth of the index wheels unlocking them to permit them to be rotated by the adding mechanism.

Extending rearward from the motion rocker 341 is an arm 360 having an open ended slot 361 formed therein. The lower edge of this arm 360 as it swings downward strikes a shoulder 362 on the forwardly extending arm 363 of the unlocking rocker 364, Fig. 28, Sheet 7, Fig. 36, Sheet 13, which is carried on shaft 83. This unlocking rocker is provided with an arm 365 extending upward and rearward, in the form of a plate extending parallel with the shaft 83 nearly across the main adding device from side plate 121 to side plate 122. The upper edge of this arm 365 extends into a notch 366 in the end of the depending arm 367 of the cross head rocker 368, Fig. 28, Sheet 7, Figs. 32 and 34, Sheet 10, Figs. 40 and 41, Sheet 13, carried on fixed rod 369, on which it is arranged to slide, moving with the master gear 100. This cross head rocker is provided with a forwardly extending arm 370 which is adapted to enter between two adjacent teeth of the master gear and lock it against rotation. The forward rocking of the arm 342 of the motion rocker 341, causes its arm 360 to rock downward which in turn, depresses the end of arm 363 of the unlocking rocker which causes the arm 365 to swing forward and by engaging the arm 367 of the cross head rocker causes it to swing forward and to lift the end of arm 370 out of engagement with the master gear to permit it to be rotated by the adding mechanism. The cross head rocker 368 is also provided with an upwardly extending arm 371 which, as it is swung rearward strikes the projection 372 on one of the unlocking levers 108, Fig. 28, Sheet 7, Figs. 78 to 80, Sheet 24, causing it to swing on its pivot 110 against the force of spring 112 and lift the transfer wheel 106 carried by it out of engagement with the intermediate gears 101.

The shoulder 350, Fig. 12, Sheet 3, Fig. 28, Sheet 7, is formed by the forward end of a projection 380 extending along the upper edge of the segment 70 somewhat more than one-half its length and terminating at its rear end in an incline 381. On the pin 334 on the side of segment towards the outer side plate 122 is a head 382. As the segment 70 nears the end of its forward movement the projection 380 passes beyond the end of arm 349 of the motion rocker pawl 347 and the motion rocker 341 is left free to return to its initial position. As the segment completes its forward movement the head 382 strikes the depending arm 383 of the knock out rocker 384, Fig. 28, Sheet 7, Fig. 39, Sheet 13, which is carried on shaft 83, this depending arm extending downward through open ended slot 386 of this unlocking rocker 364 by which it is guided and held in the path of movement of the head 382. This knock out rocker is provided with a forwardly extending arm 385 which extends into the open ended slot 361 in arm 360 of the motion rocker 341. As the arm 383 is swung forward by the head 382 the arm 385 causes the arm 360 of the motion rocker to swing upward and causes the arm 351 to swing forward carrying with it the lower end of arm 354 and 355 of the terminal locking frame causing this terminal locking frame to be rocked to move the rod 358 into locking position between the teeth of the index wheels 103.

The upward swing of the arm 360 of the motion rocker 341 moves its lower end out of engagement with the shoulder 362 of the depending arm 363 of the unlocking rocker 364 leaving this unlocking rocker free to return to its initial position. As the segment 70 completes its forward movement the head 382 strikes the lower edge of the arm 363 of the unlocking rocker and forces it to swing upward. This swings the arm 365 rearward and causes the arm 367 of the cross head rocker 368 to swing rearward swinging the arm 370 downward to cause its edge to engage the teeth of the master gear 100 and also swings the arm 371 forward away from the projection 372 of the unlocking lever 108 permitting this unlocking lever to be swung forward on its pivot 110 by the spring 112 to cause the arm 107 to carry the transfer wheel 106 downward out of locking engagement with the notch 394 of the locking plate 395 and into engagement with the teeth of the intermediate gear 101. Stop 396 limits this downward swing of the unlocking lever. The forward movement of the segment 70 thus, through the mechanism described, effects the unlocking of the index wheels 103, the master gear 100, and the transfer wheels and, as it completes its forward movement, relocks these parts. In the locking movement the forward and downward swing of the arm 370 of the cross head rocker to carry its end into locking engagement with the teeth of the master gear 100 is aided by the pressure on arm 371 of this cross head rocker of the projection 372 of the locking lever 108 as it is swung forward by the spring 112.

The forward end of arm 370 is so shaped as to fit between the teeth of the master gear 100 when swung downward into locking position and to be clear of these teeth when swung upward into unlocking position. For this purpose the end of this arm 370 is formed with an upper face 387, Fig. 41, Sheet 13, an upper front face 388, a lower front face 389 and a face 390. When in locking position the faces 388 and 390 fit between two adjacent teeth of the master gear with a wedging action which ensures the correct positioning of the master gear and when in unlocking position the face 387 fits against the fixed rod 391 and the lower face 390 is just clear of the faces of the teeth of the master gears.

The master gear 100 is mounted on squared shaft 86 between the arms of a fork 400 which extends downward and forward from a cross head 401 having a sleeve 402 mounted to slide on fixed rod 391. From this cross head a fork 403 extends downward and rearward between the arms of which is carried the cross head rocker 368 which is mounted to slide on, and rock on, shaft 369. From the sleeve of the cross head arms 404 and 405 extend upward and between them is secured by pin 406, the master wheel shift rod 407, preferably square in cross section. This rod 407 extends through the side plate 121 of the main adding device and a short distance within the frame of the typewriting machine and is provided on its end with a rack 408, Figs. 43, 44, Sheet 14, the teeth of which mesh with the teeth of a gear 409 which is carried on a short shaft 410 journalled in a frame 419 immediately below the carriage 2 of the typewriting machine at the right of the typewriting machine. Gear 409 is in mesh with gear 411 on shaft 412 to the left of and slightly below the plane of shaft 410. On shaft 412 is a gear 413 slightly smaller in diameter than gear 411. With the teeth of gear 413 are engaged the teeth of a rack 414 carried by the master control arm 415 which extends forward beneath the frame or cradle 7 and has at its end a tooth 416 adapted to be engaged by a downwardly extending projection 417 carried by one of the multiple registers 8 or 9. When this projection 417 engages the tooth 416 the forward step by step movement of the carriage 2, carrying with it the multiple register, will draw the master control arm 415 with it against the force of spring 418, and through rack 414 will rotate gear 413 and gear 411. Gear 411 will rotate gear 409, and through the engagement of gear 409 with rack 408, will move the master shift rod 407, with a step by step movement, in a direction opposite to the direction of movement of the carriage 2 and, through the cross head 401, will shift the master gear from engagement with an intermediate gear 101 into engagement with the intermediate gear of next lower denomination.

When the master gear 100 has been shifted into line with the units index wheel and has effected the rotation of that wheel, the master control arm must not be operated further by the movement of the carriage 2. In order to disconnect the tooth 416 of the master control arm from the projection 417 on the multiple register, the master control arm is provided with a straight longitudinal slot 420, Figs. 43 and 44, Sheet 14, which embraces the shaft 412 and with a longitudinal slot 421 having an upwardly inclined rear portion 422, embracing a pin 423 carried by frame 419 forward of and above the shaft 412. As the master control arm nears the end of its forward movement, that is its movement to the left with the carriage 2, the pin 423 coming in contact with the upwardly inclined portion 422 of the slot 421 causes the master control arm to be tilted on the shaft 412 as a centre forcing the tooth 416 downward out of engagement with the projection 417. The spring 418 then acts to return the master control arm to its initial position and, through the gearing above described, returns the master gear to its initial position.

The tooth 416 is inclined on its forward end to permit it to readily pass the projection 417 when the typewriter carriage is returned to its initial position.

The rod 95 which carries the fork 93 by which the gear 84 is shifted to engage gears 85 and 87 to reverse the direction of rotation of the index wheels, Figs. 30, 30ª and 31, Sheet 9, extends through side plate 121 of the casing of the main adding device, Fig. 47, Sheet 15, and carries a pin 430 near its end which is received in a slot 431 in the lower end of a lever 432 pivoted at 433 in the frame of the typewriting machine which is also the pivot of the ribbon-shift lever 6 of the typewriting machine. Above its point this lever 432 is provided with a pin 434, Fig. 49, Sheet 15. On the lever 6 is a disc 435 having formed therein a notch 436 to receive this pin, the notch being of greater width than the diameter of the pin so as to permit movement of the lever 432 relative to the ribbon shift lever. When the ribbon shift lever 6 is rocked an end of the notch 436 will come in contact with the pin 434 and the lever 432 will be rocked to cause the rod 95 to move the gear 84 to move into engagement with either gear 85 or 87.

To the upper end of lever 432 is pivotally connected a rod 438 extending to the left beneath the frame or cradle 7. This rod 438 carries at its end in position to be struck by a projection 437, Figs. 56 and 57, Sheet 20, on the rear lower edge of a small plate fixed to the casing of the multiple register, a spring latch 439 pivoted at 441 on a pawl 440 which is pivoted to the end of rod 438. A spring 442 connects the tail piece 443 of the latch with a lug 444 in the pawl, the spring acting to hold the arm 445 of the latch against a stop 446 on the pawl. When, as the carriage 2 moves to the left, the projection 437 on the plate at rear lower edge of the casing of the multiple register casing strikes the latch 439 it will carry it forward with it, and by pulling the rod 438 to the left, will operate the lever 432 to shift the gear 84. On the return movement of the carriage 2, the projection striking the back of the latch 439 swings it on its pivot against the force of spring 442 and passes by it without moving the rod 438. The forward movement of the carriage thus automatically effects the reversing of the direction of rotation of the index wheels.

The frame or cradle 7 is of a generally rectangular form and is adapted to be secured on the front of the typewriter carriage 2 and to take the place of the front portion of the carriage, the front portion being cut away and the frame or cradle secured on the ends of the side bars of the carriage or may be formed in one piece with the carriage. The frame or cradle comprises a front bar 450, a back bar 451, and ends 452 and 453, Figs. 53 to 55, Sheet 19. The front bar 450 is provided on its upper edge with a dovetailed rail 454 and the back bar 451 is provided on its upper edge with a rail 455 provided with a series of teeth which are spaced apart to correspond with the distance through which the carriage is fed on the release of a key. The upper edge of the back bar 451 is substantially higher than the upper edge of the front bar 450. The dovetailed rail 454 on the front bar and the series of teeth 455 on the back bar both terminate at a distance from the left-hand and right-hand ends 452 of the frame or cradle slightly greater than the width of the multiple register 8, to leave spaces 456 and 456ª for the removal and insertion of the multiple register, as hereinafter explained. The front bar is provided on its front face with an index 457. The right-hand end 452 is provided with an upwardly extending horn 458 to serve as a hand hold in drawing back the carriage. On its under side, in line with the toothed rail 455, the back bar 451 is provided with a longitudinal rib 459, which terminates parallel with the rails 454 and 455.

The multiple register casing comprises side plates 460 and 461 and front and top plates 462, the latter having sight openings 463 through which to see the numerals on the index wheels 209. The side plates 460 and 461 are cut away in the lower front portion to leave a vertical edge 464, Fig. 57, Sheet 20, Fig. 58, Sheet 21, to fit against the inner face of the front bar 450 and a horizontal shoulder 465, to rest on the top of the front bar 450 in which shoulder is formed a dovetailed recess 466 to fit the dovetailed rail 454. At their rear ends the side plates have a vertical mid portion 467 adapted to fit against the inner or front face of the rear bar 451 and an upper projection 468 having its rear portion projecting downward to form a shoulder 469 adapted to rest on the top of the back bar in which is formed a recess 470 adapted to fit over the toothed rail 455. The rear edges of the side plates also have a lower projection 471 having a shoulder 472 adapted to fit the under side of the back bar 451, in which is formed a recess 473 adapted to embrace the longitudinal rib 459. The right hand side plate 461 is provided on its lower edge at a distance from its rear edge with a downwardly extending projection 417. Between the side plates at their rear ends is arranged a bar 475 pressed downward by spring 476 and carrying depending rods 515 each provided with a tooth 516 adapted to engage the teeth of the toothed rail 455, Fig. 57, Sheet 20, Figs. 65 and 66, Sheet 23. A knob 477 serves to draw the bar 475 upward against the force of the spring 476 to disengage the tooth 516 from the toothed rail 455. The bar 475 and spring 476 are carried in a recess 517 in a bar 518 which serves to space the side plates 460 and 461 and is held in place by fixed rod 519.

In order to place a multiple register in position on the frame or cradle it is placed over the space 456 or 456ª and the lower projections 471 of its rear edges are hooked under the back bar 451. The front edges of the multiple register may then be lowered until the shoulder 465 rests on the top of the front bar 450. The multiple register may then be pushed to the right to cause the recess 466 to engage the end of the dovetailed rail 454 and to cause the recess 470 to embrace the toothed rail 455, the toothed bar 475 being raised by means of the knob 477. The multiple register may then be pushed along the frame or cradle to the position desired. On releasing the knob 477 the tooth of the toothed bar 475 engages the teeth of the toothed rail 455 and the multiple register is securely locked in position.

The gears 208 of the multiple register correspond to the intermediate gears 101 of the main adding device. These gears 208 rotate on fixed rod 480 supported by the side plates 460 and 461, and are arranged to be rotated by the gear 207 on the end of shaft 206, Fig. 57, Sheet 20, Fig. 58, Sheet 21, and mesh with and drive the index wheels 209 which correspond to the index wheels 103 of the main adding device and are mounted to rotate on fixed rod 481. They carry on the outer faces of their teeth the numerals 0 to 9. As the carriage 2 of the typewriting machine is fed forward carrying with it the multiple register, the gears 208, beginning with the left, will be brought successively into engagement with gear 208 to be rotated, the gear 208 being rotated, by the depression of a numeral key through the mechansm above described.

The intermediate gears 208 are held normally locked by the transfer wheels 482 which correspond to the transfer wheels 106 of the main adding device, Fig. 57, Sheet 20, Fig. 60, Sheet 22. These transfer wheels 482 are each mounted on a stub shaft 483 carried by the upwardly extending arm 484 of an unlocking bell crank lever pivoted on fixed rod 486, and having rearwardly extending arm 485, and these transfer wheels are themselves held normally locked by contact of the outer faces 505 of their teeth 506 with a locking plate 489, Fig. 57, Sheet 20, Fig. 60, Sheet 22, Figs. 63 and 64, Sheet 23, which extends across the rear of the casing and is carried by arms 507 pivoted on fixed rod 486 and is held against the ends 505 of the teeth 506 of the transfer wheels by springs 508. The upwardly extending arm 484 of the bell crank lever has at its upper end a lug 487. Below this lug and extending rearward is a shoulder 509 which is adapted to bear against the under face of the locking plate 489. On its upper face the locking plate is provided with lugs 510 in which are carried pivot rods 488 which are arranged between the arms of forks 492 of bell crank levers 491 mounted to swing on a fixed rod 490 which carries on its forwardly extending arm a locking plate 494 which extends across the casing and, when swung downward, lies in front of the lugs 487 on the arms 484 of all of the transfer wheel carrying bell crank levers. The arms 484 are normally held in their forward position by springs 511 which are each connected at one end to an arm 484 and at the other end to a fixed rod 512 to which one end of the springs 508 for the arms 507 are connected.

When the arm 485 of one of the unlocking levers carrying the transfer wheels is depressed the arm 484 is swung rearward and the end 522 of a tooth of the star wheel 520 carried by it is forced against the forward face of the locking plate 489, swinging it rearward out of contact with the ends of all of the transfer wheels other than the one carried by the unlocking lever operated, and carrying its lug 487 forward beneath locking plate 494. As the locking plate 489 swings rearward the pivot rods 488 carried by its act on the forks 492 to swing the locking plate 494 downward, just after the lug 487 of the unlocking lever operated has passed beneath it, in front of the lugs 487 of all of the other unlocking levers, thus locking all of the transfer wheels in operative position and leaving them free to be operated.

The lugs 487 of the unlocking levers extend through slots in a plate 493 extending rearward from a bar 495 mounted on fixed rod 496, which is recessed at 497 to receive and form a stop for the forward edge of the locking plate 494.

The arm 485 of the unlocking lever is depressed, to effect the movements described, by an arm 500, Fig. 47, Sheet 15, Fig. 51, Sheet 17, carried on the end of a shaft 501 extending beneath the rear bar 451 of the frame or cradle 7. On the right hand end of this shaft 501 is a downwardly extending arm 502 which is connected by a link 503 with an arm 504 on the left hand end of shaft 340 on which is carried the motion rocker 341. When this motion rocker is rocked to effect the unlocking of the index wheels of the main adding device it swings the arm 504 downward, and through the link 503 and arm 502 rocks the shaft 501 and causes its arm 500 to depress the arm 485 of the unlocking lever of the multiple register thus unlocking the index wheels of the multiple register at the same time that the index wheels of the main adding device are unlocked.

The transfer wheels 482 are each fixed on a shaft 483 which is journalled in the arm 484 of an unlocking lever, on the side of the arm 484 towards the left in Fig. 59, that is so as to be in gear with the intermediate gear 208 which drives the index wheel 209 of higher denomination. On the opposite side of the arm 484 and fixed on the shaft 483, are two gears, a star wheel 520, Fig. 67, Sheet 23, and a guide wheel 521, Fig. 68, Sheet 23, the guide wheel 521 being nearer the arm 484 than the star wheel 520. The teeth of the star wheel 520 and those of the guide wheel 521 are alike except at their ends. The ends of the teeth of the star wheel are concave, as shown at 522 while the ends of the teeth of the guide wheel 521 are convex as shown at 505. The intermediate gear 208 which drives the index wheels 209 of lower denomination is provided on the side towards the index wheel of higher denomination, with an annular flange 523 against which the concave end 522 of the star wheel 520 fits. This flange 523 is cut away at 524 to permit a tooth of the star wheel to rotate when the intermediate gear is rotated to the point at which it is necessary to effect the transfer to the index wheel of higher denomination. In order to effect this rotation of the star wheel, and through it, the rotation of the transfer gear 482, the tooth of the intermediate gear 208 which is in line radially with the cut out 524 of the flange 523, is provided on its side toward the index wheel of higher denomination with a laterally extending pin 525 which, as the intermediate wheel is rotated, strikes the side of the teeth of the star wheel and guide wheel and causes them to rotate one space, the end of the tooth of the star wheel passing through the cut out portion 524 of the flange 523. The flange 523 does not extend into the path of movement of the teeth of the guide wheel 521 so that the teeth of this guide wheel are free to pass when acted on by the pin 525. Except when thus rotated by the pin 525 the concave end 522 of the tooth of the star wheel is in contact with the periphery of the flange 523 and the star wheel, together with the guide wheel and the transfer gear 482, is locked against rotation.

The transfer device above described is that used in the multiple register. The transfer device 106 of the main adding device is of the same construction so far as concerns the star wheel, the guide wheel and the transfer gear, but in the main adding device each group, consisting of star wheel, guide wheel and transfer gear, is carried by the forwardly extending arm 107 of lever 108. The arms 107 of the several levers 108 are guided in slots 530 formed in a guide block 395, Figs. 86, 87 and 88, Sheet 25, which extends from side plate 121 to side plate 122 and serves as a spacing block for these side plates.

I find it important to have the transfer gears by which transfer is made from the index wheel actuated to index wheels of higher denomination, positively held in mesh with the gears to which they impart any movement of rotation which may be imparted to them. In the multiple register the locking of these transfer gears as well as of all of the other transfer gears, except that which is swung rearward by the unlocking lever operated, is effected by the locking plate 494 which is swung down in rear of the lugs 487 of the unlocking levers. In order to lock the transfer gears by which transfer is made from the index wheel actuated to the index wheels of higher denomination, the forwardly extending arms 107 of levers 108 which carry the transfer gears are each provided with an opening 531 and the depending portion of the guide block 395 is provided with a passage 532 which, extends through the horizontal wall at the upper end of the box 125. Through this passage 532 extends a locking rod 533, Fig. 44, Sheet 14, the forward end of which is provided with a cross pin 534 which rests in a fork formed in a lug 535 carried by shift rod 407. When the arms 107 are in depressed position with their transfer gears each in mesh with one of the intermediate gears 101, the opening 531 is in line with the passage 532 and the locking rod 533 as it moves to the right with the shift rod 407 will enter the openings 531 of the successive levers holding them positively locked in depressed position. When the master control arm 415 is relieved from engagement with the projection 417 of the multiple register, and is returned to initial position by the spring 418, the locking rod 533 is withdrawn from engagement with the arms 107.

The coupling guides 15 are drawn forward, as above described, by springs 60 to bring the pins into the notches 28 of the swinging connecting arms 26 into engagement with the pin 13 of the key levers 11, and are swung rearward to disengage the notches 28 from the pins 13 by the lever 61, the connection between the lever 61 and the shaft 14 which carries the coupling guides 15 being such that when the forward arm of the lever is pressed down the coupling guides will be swung to their forward position by the springs 60, but will be free to be swung rearward, and when the rear arm of lever 61 is pressed down the coupling guides will be swung rearward and held in their rearward position.

A convenient construction for connecting the lever 61 to the shaft 14 is shown in Figure 52$^a$ in which the lever 61 is carried by a sleeve 540 fitting over the end of shaft 14 and having at its inner end a shoulder 541 which is adapted to engage a pin 542 on shaft 14 when the rear arm of lever 61 is pressed down and rock the shaft in a direction to swing the coupling guides 15 rearward. When the forward arm of the lever 61 is pressed down the shaft 14 is free to rock in a direction to swing the coupling guides rearwardly, the coupling guides being held in forward position by the springs 60.

On the shaft 14 is a sleeve 543 carried by an arm 544, the lower end of which is provided with a pin 550.

The arm 544 is arranged to be operated by the lever of the shift key 4. As the movement given to the lever of the shift key when the shift key is pressed down is greater than is necessary to effect this rocking of the shaft 14, the connection of arm 544 with the lever of the shift key is such as to reduce the movement given to the arm 544 and sleeve 543. The construction shown for this purpose consists of a lever 547, Fig. 52, Sheet 18, connected at its rear end to the upwardly extending lever 548 by which the carriage of the typewriting machine is shifted in a forward direction when this lever is operated by the shift key. At its forward end the lever 547 is provided with a slot 549 in which is received the pin 550 carried by the lower end of arm 544. When the shift key is pressed down the lever 548 is swung forward and the forward end of lever 547 is swung downward and rocks the arm 544 forward rocking with it the sleeve 543 and shaft 14 swinging the coupling guides rearward, the movement thus imparted to the rock shaft 14 being only such as is necessary to swing the coupling guides 15 rearward.

An arm 551 extends forward from the sleeve 543 and lever 544 and to the end of this arm are connected one end of springs 552, the other end of the springs being connected to the shaft 553 on which the shift key lever is pivoted.

The main adding device, as shown, is arranged for eight index wheels arranged in two groups of three each and a group of two, the groups being spaced apart to permit of writing in a comma between the two groups of three each and a period for the decimal point between the groups of three and the group of two. In the multiple register, as shown, six index wheels only are provided for, a single index wheel only of the higher group being retained, this single index wheel being spaced apart from the group of three to permit of writing in a comma, and the group of three being spaced apart from the group of two to permit of writing in a period for the decimal point. The main adding device is thus adapted to register up to 999,999.99 while the multiple register is adapted to register only up to 9,999.99. The number of the index wheels in the main adding device and in the multiple register may, of course be greater or less than the number shown.

In the multiple register the guide block 560, Figs. 63 and 64, Sheet 23, which is provided with slots 561 for the arms 485 of the interlocking levers, is provided, in line with the spaces between groups of the index wheels, with rearwardly extending fixed arms 562 in line with the rearwardly extending ends of arms 485. These fixed arms 562 being in the path of movement of the arm 500, Fig. 51, Sheet 17, prevent movement of this arm when either of them is in line with it, thus preventing operation of the multiple register should a numeral key be inadvertently depressed when the comma or period key should be depresed.

The arm 107 of the lever 108 corresponding to the units index wheel in the main adding device is not provided with a transfer gear to transfer from an index wheel of lower denomination to the units index wheel since there is no index wheel of lower denomination than the units index wheel, but in order to hold the units index wheel locked except when it is to be operated, the arm 107, Fig. 91, Sheet 26, is provided on one side with a plate 570 having at its forward end a depending tooth 571 adapted to extend into the space between adjacent teeth of the intermediate gear 101 and hold it locked while the arm 107 is held in its depressed position by the spring 112. The arm 107 of the lever 108 which is provided with the transfer gears for transferring from an index wheel to the right of a space for writing in a comma or period to the index wheel to the left of such space, is provided at its forward end with a hub 572 for the shaft of the transfer gear.

The projection 437 for operating the reversing mechanism consists of a plate secured against the underside of guide plate 560, Figs. 63 and 64, Sheet 23, and extending rearward so as to be in position to strike the spring latch 439 of the reversing rod 438. Figs. 47 and 48, Sheet 15 as the multiple register carrying the projection moves to the left with the typewriter carriage.

The shaft 206 carrying the gear 207 for operating the index wheels of the multiple register, Fig. 2, Sheet 2, Fig. 50, Sheet 16, is necessarily of fixed length extending, in the construction shown, about half way across the frame of the typewriting machine, and the master control arm 415 when in retracted position, Fig. 43, Sheet 14, extends less than half way across the frame of the typewriting machine and can be extended only the distance between the index wheel of highest denomination in the main adding device and the units index wheel, its end being disengaged, Fig. 44, Sheet 14, from the projection 417 of the multiple register when it has shifted the master gear into position to actuate the units index wheel and that index wheel has been actuated. If only one multiple register is used without other means for engaging the end of the master control arm than the projection 417 carried by this multiple register, the adding or subtracting, would take place only at a particular point in the travel of the carriage of the typewriting machine. In order to provide for having the adding, or subtracting, operation take place at any desired point in the travel of the carriage, a second device 9 having the same casing as the multiple register 8 and provided with projection 417, projection 437 and with the same means as is provided in multiple register 8 for locking it on the toothed rail 455, is provided which may be located, as found desirable with reference to the multiple register 8. This device 9 may be a complete multiple register or may be a mere dummy device having no other function than to carry the projections 417 and 437.

In case two or more multiple registers are used the tooth on the end of the master control arm 415 will, on being released from the projection 417 of the first multiple register, counting from the left, and the arm retracted by spring 418, be in position to be engaged by the projection 417 of the second multiple register. As many multiple registers may be used as can be placed on the cradle 7 between the spaces 456 and 456ª.

Of course when more than one multiple register is used, the index wheels of the main adding device will add or subtract the numbers shown on the index wheels of the several multiple registers and will show on its index wheels the totals of the amounts shown on all the multiple registers, or, if some of the multiple registers are operated to subtract, instead of add, the difference between the total amounts added and the total amounts subtracted, for a complete movement of the carriage of the typewriting machine.

The index wheels of the main adding device, as well as those of the multiple register or registers, are re-set to zero by operation lever 6 to set the mechanism for subtraction and operating the numeral keys corresponding to the numerals shown on the successive index wheels. If it is desired to preserve the total shown by the index wheels before they are re-set to zero, the knob 138 of the subtotal or storage register is operated to shift its index wheels into mesh with the intermediate gears 101. As the index wheels are then re-set to zero, the numbers shown on them will be transferred to the index wheels 150 of the subtotal or storage device.

It will of course be understood that the levers of the numeral keys of the typewriting machine, as in the usual construction, are arranged to be acted on by springs to return them to initial position after being depressed, and that in thus returning to initial position the key levers necessarily return the interlocking shaft and adding shaft to initial position, and that, while these springs which return the key levers to initial position will be effective for this purpose, additional springs may be used to aid in returning the interlocking shaft and the parts operated by it to initial position as in the construction shown in my patent above referred to, and additional springs other than those shown may be used to return to initial position any of the parts which are operated by the numeral keys or otherwise.

It will, of course, be understood that I do not desire to be limited to the particular construction or arrangement shown as it is obvious that many changes in construction and arrangement may be made from that shown, particularly in the adaptation of the invention to other types of typewriting machine than that in connection with which the invention is shown.

Having thus described my invention, what I claim is:

1. In a calculating machine for use in connection with a typewriting machine, the combination with a rock-shaft, of a numeral key and means connecting the numeral key with the rock-shaft comprising an arm on the rock-shaft, a connecting arm pivoted on the arm on the rock-shaft and provided with means for detachably connecting it with the numeral key and means for swinging the connecting arm into and out of operative connection with the numeral key comprising a rock-shaft provided with a guide arm having a slotted engagement with the connecting arm.

2. In a calculating machine for use in connection with a typewriting machine, the combination with a rockshaft, of a numeral key and means connecting the numeral key with the rock-shaft comprising an arm on the rock-shaft, a connecting arm pivoted on the arm of the rockshaft, and provided with means for detachably connecting it with the numeral key, and a shaft key and means operated by it for swinging the connecting arm into and out of engagement with the numeral key.

3. In a calculating machine for use in connection with a typewriting machine having a numeral key and a shift key, of a rock shaft, means connecting the numeral key with the rock-shaft comprising an arm on the rock-shaft, a connecting arm pivoted on the arm of the rock shaft and provided with means for detachably connecting it with the numeral key, means for swinging the connecting arm into connection with the numeral key and means operated by the shift key for swinging the connecting arm out of connection with the numeral key.

4. In a calculating machine for use in connection with a typewriting machine having a numeral key and a shift key, of a rock shaft, means connecting the numeral key with the rock-shaft comprising an arm on the rock shaft, a connecting arm pivoted on the arm of the rock shaft and provided with means for detachably connecting it with the numeral key, means for swinging the connecting arm into connection with the numeral key and means operated by the shift key for swinging the connecting arm out of connection with the numeral key, comprising a guide arm having a slotted connection with the connecting arm.

5. In a calculating machine the combination with an index wheel, an operating shaft, an adding gear on said shaft operatively connected with the index wheel, a pinion loose on the operating shaft, means for rotating the pinion, a ratchet wheel carried by the adding gear, a driving arm carried by the pinion, a pawl support loose on the shaft carrying a pawl adapted to engage the ratchet wheel, means carried by the driving arm for causing the pawl to engage said ratchet wheel to rotate it; the pawl being so constructed that the driving arm will move through a definite arc without causing the pawl to engage the ratchet wheel and, on the completion of such movement, force the pawl to engage and rotate the ratchet wheel.

6. In a calculating machine the combination with an index wheel, an operating shaft, an adding gear on said shaft operatively connected with the index wheel, a pinion loose on the operating shaft, means for rotating the pinion, a ratchet wheel carried by the adding gear, a driving arm carried by the pinion, a pawl support loose on the shaft carrying a pawl adapted to engage the ratchet wheel, means carried by the driving arm for causing the pawl to engage said ratchet wheel to rotate it, the pawl being so constructed that the driving arm will move through a definite arc without causing the pawl to engage the ratchet wheel and, on the completion of such movement, force the pawl to engage and rotate the ratchet wheel, means for locking the ratchet wheel against rotation prior to completion of said movement of the driving arm, and means operated by the driving arm for releasing said locking means on the completion of said movement.

7. In a calculating machine the combination with an index wheel, an operating shaft, an adding gear on said shaft operatively connected with the index wheel, a pinion loose on the operating shaft, means for rotating the pinion, a ratchet wheel carried by the adding gear, a driving arm carried by the pinion, a pawl support loose on the shaft carrying a pawl adapted to engage the ratchet wheel, means carried by the driving arm for causing the pawl to engage said ratchet wheel to rotate it, the pawl being so constructed that the driving arm will move through a definite arc without causing the pawl to engage the ratchet wheel and, on the completion of such movement, force the pawl to engage and rotate the ratchet wheel; means for locking the ratchet wheel against rotation prior to completion of said movement of the driving arm comprising a disk provided with a single tooth and a pawl having a stationary pivot and adapted to engage said tooth, and means operated by the driving arm for releasing said locking means on the completion of said movement.

8. In a calculating machine, the combination with a series of index wheels of different denomination arranged on a single axis, means for transferring from an index wheel of lower denomination to an index wheel of higher denomination comprising a transfer gear arranged to actuate the index wheel of higher denomination, a master gear adapted to operate the index wheels successively, means for effecting a relative shifting of the master gear and the index wheels, means for holding the index wheels normally locked against rotation, means for unlocking the index wheel to be operated and for disengaging from it the transfer gear for operating it from an index wheel of lower denomination, and means for locking in operative engagement with the index wheels operated by them, the transfer gears for operating the index wheels of higher denomination than the one to be operated, comprising a locking rod movable with the master gear.

9. In a calculating machine, the combination with a series of index wheels of different denomination arranged on a single axis, means for transferring from an index wheel of lower denomination to an index wheel of higher denomination comprising a transfer gear arranged to actuate the index wheel of higher denomination, a lever carrying said transfer gear, a master gear adapted to operate the index wheels successively, means for effecting a relative shifting of the master gear and the index wheels, means for holding the index wheels normally locked against rotation, means for unlocking the index wheel to be operated and for disengaging from it the transfer gear for operating it from an index wheel of lower denomination, and means for locking in operative engagement with the index wheels operated by them, the transfer gears for operating the index wheels of higher denomination than the one to be operated comprising a locking rod movable with the transfer gear and adapted to engage the levers carrying the transfer gears.

10. In a combined typewriter and calculating machine, a typewriting machine having a paper carriage and means for moving it across the machine, and having numeral keys, a cradle carried by the paper carriage comprising a front bar and a rear bar, a registering device comprising a casing having shoulders adapted to rest on said front and rear bars and adjustable thereon, a series of index wheels and actuating gears therefor carried by the casing extending downward between said front and rear bars, a gear in fixed position below said cradle with which said actuating gears are adapted to mesh successively, and means actuated by the numeral keys for rotating said gear in fixed position.

11. In a combined typewriter and calculating machine, a typewriting machine having a paper carriage and means for moving it across the machine, and having numeral keys, a cradle carried by the paper carriage comprising a front bar and a rear bar, a registering device comprising a casing having shoulders adapted to rest on said front and rear bars and adjustable thereon, a series of index wheels and actuating gears therefor carried by the casing extending downward between said front and rear bars, a gear in fixed position below said cradle with which said actuating gears are adapted to mesh successively, means actuated by the numeral keys for rotating said gear in fixed position, and means carried by the casing for locking the registering device in adjusted position.

12. In a combined typewriter and calculating machine, a typewriting machine having a paper carriage and means for moving it across the machine, and having numeral keys, a cradle carried by the paper carriage comprising a front bar and a rear bar, each provided with a guide rail, one of said guide rails being toothed, a registering device comprising a casing having shoulders fitting said guide rails and adapted to rest on said front and rear bars and adjustable thereon, a series of index wheels and actuating gears therefor carried by the casing extending downward between said front and rear bars, a gear in fixed position below said cradle with which said actuating gears are adapted to mesh successively, means actuated by the numeral keys for rotating said gear in fixed position, and a locking device carried by the casing adapted to engage the teeth of the toothed rail to hold the registering device in adjusted position.

13. In a combined typewriter and calculating machine, a typewriting machine having a paper carriage and means for moving it across the machine, and having numeral keys, a cradle carried by the paper carriage comprising a front bar and a rear bar, a registering device comprising a casing having shoulders adapted to rest on said front and rear bars and adjustable thereon, and a shoulder adapted to engage the under side of one of said bars, a series of index wheels and actuating gears therefor carried by the casing extending downward between said front and rear bars, a gear in fixed position below said cradle with which said actuating gears are adapted to mesh successively, and means actuated by the numeral keys for rotating said gear in fixed position, said front and rear bars being cut away at one end to provide recesses to permit the registering device to be placed in position thereon.

14. In a combined typewriter and calculating machine, a typewriting machine having a paper carriage and means for moving it across the machine, and having numeral keys, a cradle carried by the paper carriage comprising a front bar and a rear bar, a registering device comprising a casing having shoulders adapted to rest on said front and rear bars and adjustable thereon, and a shoulder adapted to engage the under side face of said bars, a series of index wheels and actuating gears therefor carried by the casing extending downward between said front and rear bars, a fixed gear in fixed position below said cradle with which said actuating gears are adapted to mesh successively, and means actuated by the numeral keys for rotating said gear in fixed position, said front and rear bars being cut away at both ends to provide recesses to permit registering devices to be placed in position thereon at either end.

15. In a calculating machine for use with a typewriting machine having numeral keys the combination with a numeral key of an interlocking shaft, a swinging arm mounted to swing on the interlocking shaft, a connecting arm carried by said swinging arm, a depending arm on the swinging arm, an arm fast on the interlocking shaft provided with a laterally extending pin in the path of movement of the depending arm of the swinging arm and means for preventing the return movement of the swinging arm until the key has been fully depressed, comprising a latch pivoted on the depending arm of the swinging arm and means for actuating said latch to cause it to engage said pin arranged to act upon contact of the depending arm with said pin.

16. In a calculating machine for use with a typewriting machine having numeral keys the combination with a numeral key of an interlocking shaft, a swinging arm mounted to swing on the interlocking shaft, a connecting arm carried by said swinging arm, a depending arm on the swinging arm, an arm fast on the interlocking shaft provided with a laterally extending pin in the path of movement of the depending arm of the swinging arm and means for preventing the return movement of the swinging arm until the key has been fully depressed, comprising a latch pivoted on the depending arm of the swinging arm having a hook adapted to embrace the laterally extending pin on said depending arm and means for actuating said latch to cause its hook to embrace said pin arranged to act upon contact of the depending arm with said pin.

17. In a calculating machine for use with a typewriting machine having numeral keys the combination with a numeral key of an interlocking shaft, a swinging arm mounted to swing on the interlocking shaft, a connecting arm carried by said swinging arm, a depending arm on the swinging arm, an arm fast on the interlocking shaft provided with a laterally extending pin in the path of movement of the depending arm of the swinging arm and means for preventing the return movement of the swinging arm until the key has been fully depressed, comprising a latch pivoted on the depending arm of the swinging arm having a hook adapted to embrace the laterally extending pin on said depending arm and means for actuating said latch to cause its hook to embrace said pin arranged to act upon contact of the depending arm with said pin, comprising a cam slot in said latch and a fixed rod extending through said slot.

18. In a calculating machine for use with a typewriting machine having numeral keys the combination with a numeral key of an interlocking shaft, a full stroke mechanism for locking the interlocking shaft against return until it has completed its full movement, a swinging arm mounted to swing on the interlocking shaft, a connecting arm carried by said swinging arm, a depending arm on the swinging arm, an arm fast on the interlocking shaft provided with a laterally extending pin in the path of movement of the depending arm of the swinging arm and means for preventing the return movement of the swinging arm until the key has been fully depressed, comprising a latch pivoted on the depending arm of the swinging arm and means for actuating said latch to cause it to engage said pin arranged to act upon contact of the depending arm with said pin.

19. In a calculating machine for use with a typewriting machine having numeral keys, the combination with a numeral key of an interlocking shaft, a full stroke mechanism for locking the interlocking shaft against return until it has completed its full movement, a swinging arm mounted to swing on the interlocking shaft, a connecting arm carried by said swinging arm, a depending arm on the swinging arm, an arm fast on the interlocking shaft provided with a laterally extending pin in the path of movement of the depending arm of the swinging arm, and means for preventing the return movement of the swinging arm until the key has been fully depressed, comprising a latch pivoted on the depending arm of the swinging arm having a hook adapted to embrace the laterally extending pin on said depending arm, and means for actuating said latch to cause its hook to embrace said pin arranged to act upon contact of the depending arm with said pin.

20. In a calculating machine for use with a typewriting machine having a series of numeral keys, the combination with the numeral keys of an interlocking shaft, a series of swinging arms mounted to swing on the interlocking shaft, each provided with means connecting it with a numeral key, a depending arm on the swinging arm, an arm fast on the interlocking shaft provided with a laterally extending pin in the path of movement of the depending arm of the swinging arm, a second depending arm on the swinging arm provided with an arc-shaped extension, and a series of key locks having limited lateral movement so arranged that the interval between any two of them is in the path of movement of said arc-shaped extension, the lateral movement of the key locks being so limited that the entrance between any two of them of one of the arc shaped extension will force the other key locks together so as to close the interval between them against any other arc shaped extension.

21. In a calculating machine for use with a typewriting machine having a series of numeral keys, the combination with the numeral keys of an interlocking shaft, a series of swinging arms mounted to swing on the interlocking shaft, each provided with means connecting it with a numeral key, a depending arm on the swinging arm, an arm fast on the interlocking shaft provided with a laterally extending pin in the path of movement of the depending arm of the swinging arm, means carried by said depending arm for locking the depending arm to the arm fast on the shaft, a second depending arm on the swinging arm provided with an arc shaped extension, and a series of key locks having limited lateral movement so arranged that the interval between any two of them is in the path of movement of said arc shaped extension, the lateral movement of the key locks being so limited that the entrance between any two of them of one of the arc shaped extension will force the other key locks together so as to close the interval between them against any other arc shaped extension.

22. In a calculating machine for use with a typewriting machine having a series of numeral keys, the combination with the numeral keys of an interlocking shaft, a series of swinging arms mounted to swing on the interlocking shaft, each provided with means detachably connecting it with a numeral key, a depending arm on the swinging arm, an arm fast on the interlocking shaft provided with a laterally extending pin in the path of movement of the depending arm of the swinging arm, means carried by said depending arm for locking the depending arm to the arm fast on the shaft, a second depending arm on the swinging arm provided with an arc shaped extension, and a series of key locks so arranged having limited lateral movement so arranged that the interval between any two of them is in the path of movemnt of said arc shaped extension, the lateral movement of the key locks being so limited that the entrance between any two of them of one of the arc shaped extension will force the other key locks together so as to close the interval between them against any other arc shaped extension.

23. In a calculating machine for use with a typewriting machine having a series of numeral keys, the combination with the numeral keys of an interlocking shaft, a series of swinging arms mounted to swing on the interlocking shaft, each provided with means connecting it with a numeral key, a depending arm on the swinging arm, an arm fast on the interlocking shaft provided with a laterally extending pin in the path of movement of the depending arm of the swinging arm, means carried by said depending arm for locking the depending arm to the arm fast on the shaft, a second depending arm on the swinging arm provided with an arc shaped extension, and a series of key locks having limited lateral movement so pivoted on a supporting plate that the interval between any two of them is in the path of movement of said arc shaped extension, the lateral movement of the key locks being so limited that the entrance between any two of them of one of the arc shaped extension will force the other key locks together so as to close the interval between them against any other arc shaped extension, the supporting plate being provided with slots each in line with the interval between the key locks and adapted to receive one of the arc shaped extensions.

24. In a calculating machine an index wheel, an operating shaft for rotating the index wheel, differential means for rotating the operating shaft through different movements of rotation comprising a sleeve free to rotate on the operating shaft, means for rotating the sleeve and connecting means between the sleeve and the operating shaft adapted to permit initial movement of the sleeve through a definite movement of rotation before effecting rotation of the operating shaft and means for holding the operating shaft locked against rotation until completion of the initial rotation of the sleeve.

25. In a calculating machine an index wheel, an operating shaft for rotating the index wheel, differential means for rotating the operating shaft through different movements of rotation comprising a sleeve free to rotate on the operating shaft, means for rotating the sleeve and connecting means between the sleeve and the operating shaft adapted to permit initial movement of the sleeve through a definite movement of rotation before effecting rotation of the operating shaft, means for holding the operating shaft locked against rotation until completion of the initial rotation of the sleeve, and means for preventing reverse movement of the operating shaft.

26. In a calculating machine, an index wheel, an operating shaft for rotating the index wheel, differential means for rotating the operating shaft through different movements of rotation comprising a sleeve free to rotate on the operating shaft, means for rotating the sleeve and connecting means between the sleeve and the operating shaft adapted to permit initial movement of the sleeve through a definite movement of rotation before effecting rotation of the operating shaft, means for holding the operating shaft locked against rotation until completion of the initial rotation of the sleeve, full stroke mechanism for preventing reverse movement of the sleeve until it has completed its predetermined movement of rotation.

27. In a calculating machine an index wheel, an operating shaft for rotating the index wheel, differential means for rotating the operating shaft through different movements of rotation comprising a sleeve free to rotate on the operating shaft, means for rotating the sleeve and connecting means between the sleeve and the operating shaft adapted to permit initial movement of the sleeve through a definite movement of rotation before effecting rotation of the operating shaft and means for holding the operating shaft locked against rotation until completion of the initial rotation of the sleeve, means for preventing reverse movement of the shaft and full stroke mechanism for preventing reverse movement of the sleeve before it has completed its predetermined movement of rotation.

28. In a calculating machine an index wheel, an operating shaft for rotating the index wheel, differential means for rotating the operating shaft through different movements of rotation comprising a sleeve free to rotate on the operating shaft, means for rotating the sleeve and connecting means between the sleeve and the operating shaft adapted to permit initial movement of the sleeve through a definite movement of rotation before effecting rotation of the operating shaft and means for holding the operating shaft locked against rotation until completion of the initial rotation of the sleeve, means for preventing reverse movement of the shaft, full stroke mechanism for preventing reverse movement of the sleeve before it has completed its predetermined movement of rotation, means for holding the index wheel normally locked, means for unlocking the index wheel before the operating shaft is rotated and for relocking it on completion of its rotation.

29. In a calculating machine an index wheel, an operating shaft for rotating the index wheel, differential means for rotating the operating shaft through different movements of rotation comprising a sleeve free to rotate on the operating shaft, means for rotating the sleeve and connecting means between the sleeve and the operating shaft adapted to permit initial movement of the sleeve through a definite movement of rotation before effecting rotation of the operating shaft and means for holding the operating shaft locked against rotation until completion of the initial rotation of the sleeve, means for preventing reverse movement of the shaft, full stroke mechanism for preventing reverse movement of the sleeve before it has completed its predetermined movement of rotation, means for holding the index wheel normally locked, means for unlocking the index wheel before the operating shaft is rotated and for relocking it on completion of its rotation, and means for locking the sleeve against reverse movement until the relocking is completed.

30. The combination of a shaft, a ratchet wheel fast on the shaft, a pawl support mounted to rotate on the shaft carrying a pawl adapted to engage said ratchet wheel, a sleeve mounted to rotate on the shaft, means carried by said sleeve for forcing the pawl into engagement with the ratchet wheel and rotating the pawl support to cause the pawl to rotate the ratchet wheel and means for rotating the sleeve 31. The combination of a shaft, a ratchet wheel fast on the shaft, a pawl support mounted to rotate on the shaft carrying a pawl adapted to engage said ratchet wheel but normally out of engagement therewith, a sleeve mounted to rotate on the shaft, means carried by said sleeve for forcing the pawl into engagement with the ratchet wheel, and rotating the pawl support to cause the pawl to rotate the ratchet wheel, and means for rotating the sleeve.

32. The combination of a shaft, a ratchet wheel fast on the shaft, a pawl support mounted to rotate on the shaft carrying a pawl adapted to engage said ratchet wheel but normally out of engagement therewith, means for normally holding the pawl support locked against rotation, a sleeve mounted to rotate on the shaft, means carried by said sleeve for forcing the pawl into engagement with the ratchet wheel, unlocking the pawl support and rotating it to rotate the ratchet wheel, and means for rotating the sleeve.

33. The combination of a shaft, a ratchet wheel fast on the shaft, a pawl support mounted to rotate on the shaft carrying a pawl adapted to engage said ratchet wheel, means for normally holding the pawl support locked against rotation, a sleeve mounted to rotate on the shaft, means carried by said sleeve normally holding the pawl out of engagement with the ratchet wheel and for forcing the pawl into engagement with the ratchet wheel, unlocking the pawl support and rotating it to rotate the ratchet wheel, and means for rotating the sleeve.

34. The combination of a shaft, a ratchet wheel fast on the shaft, a pawl support mounted to rotate on the shaft carrying a pawl adapted to engage said ratchet wheel, means for normally holding the pawl support locked against rotation comprising a pawl support lock provided with a tooth and a locking pawl normally engaging said tooth, a sleeve mounted to rotate on the shaft, means carried by said sleeve for forcing the pawl into engagement with the ratchet wheel, and rotating it to rotate the ratchet wheel, means also carried by the sleeve for swinging the locking pawl out of engagement with the tooth of the pawl support lock, and means for rotating the sleeve.

35. The combination of a shaft, a ratchet wheel fast on the shaft, a pawl support mounted to rotate on the shaft carrying a pawl adapted to engage said ratchet wheel, but normally out of engagement therewith, a sleeve mounted to rotate on the shaft, means carried by said sleeve adapted to force the pawl into engagement with the ratchet wheel, and to rotate it to rotate the ratchet wheel, full stroke mechanism for prevening return movement of the sleeve before the shaft has been rotated through a predetermined movement of rotation, and means for returning the sleeve to initial position.

36. The combination of a shaft, a ratchet wheel fast on the shaft, a pawl support mounted to rotate on the shaft carrying a pawl adapted to engage said ratchet wheel, but normally out of engagement therewith, means for normally holding the pawl support locked against rotation, a sleeve mounted to rotate on the shaft, means carried by said sleeve adapted to force the pawl into engagement with the ratchet wheel, to unlock the pawl support and to rotate it to rotate the ratchet wheel, full stroke mechanism for preventing return movement of the sleeve before the shaft has been rotated through a predetermined movement of rotation, and means for returning the sleeve to initial position.

37. The combination of a shaft, a ratchet wheel fast on the shaft, a pawl support mounted to rotate on the shaft carrying a pawl adapted to engage said ratchet wheel, but normally out of engagement therewith, means for normally holding the pawl support locked against rotation, a sleeve mounted to rotate on the shaft, means carried by said sleeve adapted to normally hold the pawl out of engagement with the ratchet wheel and to force the pawl into engagement with the ratchet wheel, to unlock the pawl support and to rotate it to rotate the ratchet wheel, full stroke mechanism for preventing return movement of the sleeve before the shaft has been rotated through a predetermined movement of rotation, and means for returning the sleeve to initial position.

38. The combination of a shaft, a ratchet wheel fast on the shaft, a pawl support mounted to rotate on the shaft carrying a pawl adapted to engage said ratchet wheel, but normally out of engagement therewith, means for normally holding the pawl support locked against rotation comprising a pawl support lock provided with a tooth and a locking pawl normally engaging said tooth, a sleeve mounted to rotate on the shaft, means carried by said sleeve adapted to normally hold the pawl out of engagement with the ratchet wheel and to force the pawl into engagement with the ratchet wheel, means carried by the sleeve to unlock the pawl support comprising means for swinging the locking pawl out of engagement with the tooth of the pawl support lock and to rotate the pawl support to rotate the ratchet wheel, full stroke mechanism for preventing return movement of the sleeve before the shaft has been rotated through a predetermined movement of rotation, and means for returning the sleeve to initial position.

39. The combination of a shaft, a ratchet wheel fast on the shaft, a pawl support mounted to rotate on the shaft, a pawl pivoted on the pawl support in position to engage the ratchet wheel and provided with a cam surface extending from near its pivot to near its free end and an abutment at each end of the cam surface, means for holding the pawl support normally locked against rotation, a sleeve mounted to rotate on the shaft, a driving arm carried by the sleeve provided with a pin in contact with the cam surface of the pawl and adapted to engage the abutment at the pivot end of the pawl, means for rotating the sleeve in one direction to cause the pin to move over the cam surface of the pawl into engagement with the abutment near its free end, full stroke mechanism for preventing return movement of the shaft before it has been rotated through a predetermined movement of rotation, and means for rotating the sleeve in reverse direction to move the pin into engagement with the abutment near the pivot end of the pawl.

40. The combination of a shaft, a ratchet wheel fast on the shaft, a pawl support mounted to rotate on the shaft, a pawl pivoted on the pawl support in position to engage the ratchet wheel and provided with a cam surface extending from near its pivot to near its free end and an abutment at each end of the cam surface, means for holding the pawl support normally locked against rotation, a sleeve mounted to rotate on the shaft, a driving arm carried by the sleeve provided with a pin in contact with the cam surface of the pawl and adapted to engage the abutments at the ends of said cam surface and means for rotating the sleeve to cause the pin to move over the cam surface of the pawl into engagement with the abutment near its free end.

41. The combination of a shaft, a ratchet wheel fast on the shaft, a pawl support mounted to rotate on the shaft, a pawl pivoted on the pawl support in position to engage the ratchet wheel and provided with a cam surface extending from near its pivot to near its free end and an abutment at each end of the cam surface, means for holding the pawl support normally locked against rotation, a sleeve mounted to rotate on the shaft, a driving arm carried by the sleeve provided with a pin in contact with the cam surface of the pawl and adapted to engage the abutments at the ends of said cam surface to hold the pawl out of engagement with the ratchet wheel when in engagement with the abutment near its pivot and to hold the pawl in engagement with the ratchet wheel and to cause it to rotate said ratchet wheel when in engagement with the abutment near its free end, means for rotating the sleeve to cause the pin to move over the cam surface of the pawl into engagement with the abutment near its free end, and full stroke mechanism for preventing the return of the sleeve to initial position before the shaft has been rotated through a predetermined arc.

42. The combination of a shaft, a ratchet wheel fast on the shaft, a pawl support mounted to rotate on the shaft, a pawl pivoted on the pawl support in position to engage the ratchet wheel and provided with a cam surface extending from near its pivot to near its free end and an abutment at each end of the cam surface, means for holding the pawl support normally locked against rotation, a sleeve mounted to rotate on the shaft, a driving arm carried by the sleeve provided with a pin in contact with the cam surface of the pawl and adapted to engage the abutments at the ends of said cam surface to hold the pawl out of engagement with the ratchet wheel when in engagement with the abutment near its pivot and to hold the pawl in engagement with the ratchet wheel and to cause it to rotate said ratchet wheel when in engagement with the abutment near its free end, means for rotating the sleeve in one direction to cause the pin to move over the cam surface of the pawl into engagement with the abutment near its free end to cause the pawl to engage and rotate the ratchet wheel, and to unlock the pawl support, and means for rotating the sleeve in the opposite direction to move the pin into engagement with the abutment near the pivot end of the pawl to free it from engagement with the ratchet wheel, to return the pawl support to initial position and to permit it to be relocked.

43. The combination of a shaft, a ratchet wheel fast on the shaft, a pawl support mounted to rotate on the shaft, a pawl pivoted on the pawl support in position to engage the ratchet wheel and provided with a cam surface extending from near its pivot to near its free end and an abutment at each end of the cam surface, means for holding the pawl support normally locked against rotation, a sleeve mounted to rotate on the shaft, a driving arm carried by the sleeve provided with a pin in contact with the cam surface of the pawl and adapted to engage the abutments at the ends of said cam surface to hold the pawl out of engagement with the ratchet wheel when in engagement with the abutment near its pivot and to hold the pawl in engagement with the ratchet wheel and to cause it to rotate said ratchet wheel when in engagement with the abutment near its free end, means for rotating the sleeve in one direction to cause the pin to move over the cam surface of the pawl into engagement with the abutment near its free end to cause the pawl to engage and rotate the ratchet wheel, and to unlock the pawl support, and means for rotating the sleeve in the opposite direction to move the pin into engagement with the abutment near the pivot end of the pawl to free it from engagement with the ratchet wheel, to return the pawl support to initial position and to permit it to be relocked and full stroke mechanism for preventing the return of the sleeve to initial position before the shaft has been rotated through a predetermined arc.

44. The combination of a shaft, a ratchet wheel fast on the shaft, a pawl support mounted to rotate on the shaft, a pawl pivoted on the pawl support in position to engage the ratchet wheel and provided with a cam surface extending from near its free end to near its pivot end and an abutment at each end of the cam surface, a sleeve mounted to rotate on the shaft, a driving arm carried by the sleeve provided with a pin in contact with the cam surface of the pawl and adapted to engage the abutment near the pivot end of the pawl to hold the pawl out of engagement with the ratchet wheel and to engage the abutment near the free end of the pawl and to hold the pawl into engagement with the ratchet wheel, and means for rotating the sleeve.

45. The combination of a shaft, a ratchet wheel fast on the shaft, a pawl support mounted to rotate on the shaft, a pawl pivoted on the pawl support in position to engage the ratchet wheel and provided with a cam surface extending from near its free end to near its pivot end and an abutment at each end of the cam surface, means for holding the cam support normally locked against rotation, a sleeve mounted to rotate on the shaft, a driving arm carried by the sleeve provided with a pin in contact with the cam surface of the pawl and adapted to engage the abutment near the pivot end of the pawl to hold the pawl out of engagement with the ratchet wheel and to engage the abutment near the free end of the pawl to hold the pawl into engagement with the ratchet wheel and to cause it to rotate said ratchet wheel, means also carried by the sleeve for unlocking the pawl support, and means for rotating the sleeve.

46. The combination of a shaft, a ratchet wheel fast on the shaft, a pawl support mounted to rotate on the shaft, a pawl pivoted on the pawl support in position to engage the rachet wheel and provided with a cam surface extending from near its pivot to near its free end and an abutment at each end of the cam surface, a sleeve mounted to rotate on the shaft, a driving arm carried by the sleeve provided with a pin in contact with the cam surface of the pawl and adapted to engage the abutment at the pivot end of the pawl to hold he pawl out of engagement with the ratchet wheel and to engage the abutment at the free end of the pawl to cause the pawl to engage the ratchet wheel and rotate it, means for rotating the sleeve in one direction to cause the pin to move over the cam surface of the pawl into engagement with the abutment near its free end to cause the pawl to engage the ratchet wheel, full stroke mechanism for preventing return movement of the shaft before it has been rotated through a predetermined movement of rotation, and means for rotating the sleeve in reverse direction to move the pin into engagement with the abutment near the pivot end of the pawl to free it from engagement with the ratchet wheel and to return the pawl support to initial position.

47. The combination with a shaft, means for rotating it in one direction through different arcs, and means for locking the shaft against rotation in reverse direction, of an interlocking ratchet wheel fast on the shaft, a sleeve mounted to rotate on the shaft and means for rotating it simultaneously with the rotation of the shaft but always through the same arc, an arm carried by said sleeve, a pawl pivoted on said arm in position to engage the interlocking ratchet and provided near its free end with a laterally extending pin, a casing into which said pin extends having a fixed arc shaped ratchet guide therein for the laterally extending pin having its inner surface concentric with the axis of the shaft and adapted to engage the laterally extending pin to hold the pawl in engagement with the interlocking ratchet wheel, and having its outer surface provided with ratchet teeth having a direction opposite to that of the teeth of the interlocking ratchet wheel, and a second guide plate within the casing provided with a flange on its outer edge concentric with the axis of the shaft, having one end extending within one end of the ratchet guide to form, between it and the inner surface of said ratchet guide, a passage for the laterally extending pin of the pawl, and its other end opposite the terminal end of the ratchet guide and extending inward into the path of movement of the laterally extending pin to deflect said pin outward to free the pawl from engagement with the ratchet wheel.

48. The combination with a shaft, means for rotating it in one direction through different arcs and means for locking the shaft against rotation in reverse direction, of an interlocking ratchet wheel fast on the shaft, a sleeve mounted to rotate on the shaft and means for rotating it simultaneously with the rotation of the shaft but always through the same arc, an arm carried by said sleeve, a pawl pivoted on said arm in position to engage the interlocking ratchet and provided near its free end with a laterally extending pin, a casing into which said pin extends having a fixed arc shaped ratchet guide therein for the laterally extending pin having its inner surface concentric with the axis of the shaft and adapted to engage the laterally extending pin to hold the pawl in engagement with the interlocking ratchet wheel, and having its outer surface provided with ratchet teeth having a direction opposite to that of the teeth of the interlocking ratchet wheel, a second guide plate within the casing provided with a flange on its outer edge concentric with the axis of the shaft, having one end extending within one end of the ratchet guide to form, between it and the inner surface of said ratchet guide, a passage for the laterally extending pin of the pawl, and its other end opposite the terminal end of the ratchet guide and extending inward into the path of movement of the laterally extending pin to deflect said pin outward to free the pawl from engagement with the ratchet wheel and a switch pivoted to the ratchet guide at its terminal end with its point resting on the flange of the second guide.

49. The combination with a shaft, means for rotating it in one direction through different arcs and means for locking the shaft against rotation in reversed direction, of an interlocking ratchet wheel fast on the shaft, a sleeve mounted to rotate on the shaft and means for rotating it simultaneously with the rotation of the shaft but always through the same arc, an arm carried by said sleeve, a pawl pivoted on said arm in position to engage the interlocking ratchet and provided near its free end with a laterally extending pin, a casing into which said pin extends having a fixed arc shaped ratchet guide therein for the laterally extending pin having its inner surface concentric with the axis of the shaft and adapted to engage the laterally extending pin to hold the pawl in engagement with the interlocking ratchet wheel, and having its outer surface provided with ratchet teeth having a direction opposite to that of the teeth of the interlocking ratchet wheel, a second guide plate within the casing provided with a flange on its outer edge concentric with the axis of the shaft, having one end extending within one end of the ratchet guide to form, between it and the inner surface of said ratchet guide, a passage for the laterally extending pin of the pawl, and its other end opposite the terminal end of the ratchet guide and extending inward into the path of movement of the laterally extending pin to deflect said pin outward to free the pawl from engagement with the ratchet wheel, and a switch pivoted to the ratchet guide at its terminal end with its point resting on the flange of the second guide and provided with a cam plate in the path of movement of the laterally extending pin.

50. The combination with a shaft, means for rotating it in one direction through different arcs and means for locking the shaft against rotation in reverse direction, of an interlocking ratchet wheel fast on the shaft, a sleeve mounted to rotate on the shaft and means for rotating it simultaneously with the rotation of the shaft but always through the same arc, an arm carried by said sleeve, a pawl pivoted on said arm and in position to engage the interlocking ratchet and provided near its free end with a laterally extending pin, a casing into which said pin extends having a fixed arc shaped ratchet guide therein for the laterally extending pin having its inner surface concentric with the axis of the shaft and adapted to engage the laterally extending pin to hold the pawl in engagement with the interlocking ratchet wheel, and having its outer surface provided with ratchet teeth having a direction opposite to that of the teeth of the interlocking ratchet wheel, a second guide plate within the casing provided with a flange on its outer edge concentric with the axis of the shaft, having one end extending within one end of the ratchet guide to form, between it and the inner surface of said ratchet guide, a passage for the laterally extending pin of the pawl, and its other end opposite the terminal end of the ratchet guide and extending inward into the path of movement of the laterally extending pin to deflect said pin outward to free the pawl from engagement with the ratchet wheel and a switch pivoted to the ratchet guide at its terminal and with its point resting on the flange of the second guide and provided on its exterior with a ratchet tooth corresponding to the ratchet teeth on the ratchet guide.

51. In a calculating machine for use with a typewriting machine, calculating mechanism having a fixed position relative to the typewriting machine and comprising a series of index wheels arranged on a single axis, a master gear for rotating the index wheels, means for shifting it into gear with the index wheels successively, a shaft carrying the master gear, and means for rotating it and means for locking the index wheels comprising a locking frame provided with a rod adapted to engage the teeth of the index wheels, a motion rocker provided with means for operating the locking frame, means operated by the motion rocker for locking and unlocking the master gear comprising a cross head locker provided with an arm adapted to engage the teeth of the master gear, an unlocking rocker having an arm engaging the motion rocker and an arm engaging the cross head locker, and a knock out rocker provided with an arm engaging the motion rocker, a shaft on which the motion rocker is fixed, and means for engaging the knock out rocker to cause it to rock the motion rocker in one direction to effect the unlocking of the index wheels and master gear, and for engaging the motion rocker to rock it in the opposite direction to effect the relocking of the index wheels and the master gear, registering mechanism comprising a series of index wheels, means for holding them normally locked, and means operated by the shaft of the motion rocker for unlocking the index wheels of the registering mechanism.

52. In a calculating machine for use with a typewriting machine, calculating mechanism having a fixed position relative to the typewriting machine and comprising a series of index wheels arranged on a single axis, a master gear for rotating the index wheels, means for shifting it into gear with the index wheels successively, a shaft carrying the master gear and means for rotating it, and means for locking the index wheels comprising a locking frame provided with a rod adapted to engage the teeth of the index wheels, a motion rocker provided with means for operating the locking frame, means operated by the motion rocker for locking and unlocking the master gear comprising a cross head locker provided with an arm adapted to engage the teeth of the master gear, an unlocking rocker having an arm engaging the motion rocker and an arm engaging the cross head locker, and a knock out rocker provided with an arm engaging the motion rocker, a shaft on which the motion rocker is fixed, and means for engaging the knock out rocker to cause it to rock the motion rocker in one direction to effect the unlocking of the index wheels and master gear, and for engaging the motion rocker to rock it in the opposite direction to effect the relocking of the index wheels and the master gear, registering mechanism comprising a series of index wheels, means for holding them normally locked, and means operated by the shaft of the motion rocker for unlocking the index wheels of the registering mechanism and means operated by the shaft of the master gear for operating the index wheel so unlocked.

53. In a calculating machine the combination with a series of index wheels arranged on a single axis, a master gear and means for shifting it into gear with the index wheels sucessively, means for rotating the master gear, and means for locking the index wheels comprising a locking frame provided with a rod adapted to engage the teeth of the index wheels, a motion rocker provided with means for operating the locking frame, means for locking the master gear comprising a cross head locker provided with an arm adapted to engage the teeth of the master gear, an unlocking rocker having an arm engaging the motion rocker and an arm engaging the cross head locker, means for operating the locking means comprising means for rocking the motion rocker in one direction to effect the unlocking of the index wheels and master gear, and means for rocking it in the opposite direction to effect the relocking of the index wheels and the master gear.

54. In a calculating machine the combination with a series of index wheels arranged on a single axis, transfer mechanism for each index wheel for transferring from it to an index wheel of higher denomination mounted on a swinging arm, a master gear and means for shifting it into gear with the index wheels successively, means for rotating the master gear, and means for locking the index wheels comprising a locking frame provided with a rod adapted to engage the teeth of the index wheels, a motion rocker provided with means for operating the locking frame, means for locking the master gear comprising a cross head locker mounted to shift with the master gear, provided with an arm adapted to engage the teeth of the master gear and provided with means for moving the swinging arm carrying the transfer mechanism, an unlocking rocker having an arm engaging the motion rocker and an arm engaging the cross head locker, means for operating the locking means comprising a knock out rocker provided with an arm engaging the motion rocker, and a swinging segment provided with means for engaging the knock out rocker to cause it to rock the motion rocker in one direction to effect the unlocking of the index wheels and master gear, and with means for engaging the motion rocker to rock it in the opposite direction to effect the relocking of the index wheels and the master gear.

55. In a calculating machine the combination with a series of index wheels arranged on a single axis, a master gear for rotating the index wheels, and means for shifting it into gear with the index wheels successively, means for rotating the master gear, and means for locking the index wheels comprising a locking frame provided with a rod adapted to engage the teeth of the index wheels, a motion rocker provided with means for operating the locking frame, means for locking the master gear comprising a cross head locker provided with an arm adapted to engage the teeth of the master gear, an unlocking rocker having an arm engaging the motion rocker and an arm engaging the cross head locker, means for operating the locking means comprising a knock out rocker provided with an arm engaging the motion rocker, and a swinging segment provided with means for engaging the knock out rocker to cause it to rock the motion rocker in one direction to effect the unlocking of the index wheels and master gear, and with means for engaging the motion rocker to rock it in the opposite direction to effect the relocking of the index wheels and the master gear.

56. In a calculating machine the combination with a series of index wheels arranged on a single axis, a master gear for rotating the index wheels, means for shifting it into gear with the index wheels successively, means for rotating the master gear, and means for locking the index wheels comprising a locking frame provided with a rod adapted to engage the teeth of the index wheels, a motion rocker provided with means for operating the locking frame, means for locking the master gear comprising a cross head locker mounted to shift the master gear and provided with an arm adapted to engage the teeth of the master gear, an unlocking rocker having an arm engaging the motion rocker and an arm engaging the cross head locker, means for operating the locking means comprising a knock out rocker provided with an arm engaging the motion rocker, and a swinging segment provided with means for engaging the knock out rocker to cause it to rock the motion rocker in one direction to effect the unlocking of the index wheels and master gear, and with means for engaging the motion rocker to rock it in the opposite direction to effect the relocking of the index wheels and the master gear.

57. In a calculating machine the combination with a series of index wheels arranged on a single axis, a master gear for rotating the index wheels, and means for shifting it into gear with the index wheels successively, means for rotating the master gear, and means for locking the index wheels comprising a locking frame provided with a rod adapted to engage the teeth of the index wheels, a motion rocker provided with means for operating the locking frame, means for locking the master gear comprising a cross head locker provided with an arm adapted to engage the teeth of the master gear, an unlocking rocker having an arm engaging the motion rocker and an arm engaging the cross head locker, means for operating the locking means comprising a knock out rocker provided with an arm engaging the motion rocker, a swinging segment provided with means for engaging the knock out rocker to cause it to rock the motion rocker in one direction to effect the unlocking of the index wheels and master gear, and means for engaging the motion rocker to rock it in the opposite direction to effect the relocking of the index wheels and the master gear, and means for locking the swinging segment against reverse movement until the relocking has been effected.

58. In a calculating machine for use in connection with a typewriting machine having a numeral key and a carriage movable across the typewriting machine, the combination with a series of index wheels arranged on a single axis and transfer mechanism for transferring from an index wheel of lower denomination to an index wheel of higher denomination adapted to hold the index wheel of higher denomination normally locked against rotation except by the action of the index wheel of lower denomination in transferring, a master gear adapted to drive the index wheels and means for shifting it into gear with the index wheels successively, an operating shaft and means operated by it for driving the master gear, means between said shaft and the master gear for reversing the direction of rotation of the master gear, full stroke mechanism arranged to prevent return movement of the adding shaft before it has completed a predetermined movement of rotation, means for rotating the operating shaft comprising an interlocking shaft, an arm fast thereon, a swinging arm operated by the numeral key of the typewriting machine for actuating the arm fast on the interlocking shaft, means for holding the swinging arm locked to the arm fast on the interlocking shaft until the numeral key has been fully depressed, means for holding the index wheels normally locked against rotation, means adapted to permit the shifting of the master gear for holding it normally locked against rotation and means operated by the depression of the numeral key for rocking the interlocking shaft.

59. In a calculating machine, the combination with a series of index wheels arranged on a single axis, an intermediate gear for each index wheel, the intermediate gears being arranged on a single axis, a master gear and means for shifting it into mesh with each of the intermediate gears successively, means for rotating the master gear, of a subtotal register comprising a shaft carrying a series of index wheels adapted to mesh with said intermediate gears, a swinging frame carrying said shaft adapted to be swung into position to carry the index wheels into or out of mesh with the intermediate gears.

60. In a calculating machine, the combination with a series of index wheels arranged on a single axis, an intermediate gear for each index wheel, the intermediate gears being arranged on a single axis, a master gear and means for shifting it into mesh with each of the intermediate gears successively, means for rotating the master gear including means for reversing the direction of rotation of the master gear, of a subtotal register comprising a shaft carrying a series of index wheels adapted to mesh with said intermediate gears, a swinging frame carrying said shaft adapted to be swung into position to carry the index wheels into or out of mesh with the intermediate gears.

61. In a calculating machine, the combination with a series of index wheels arranged on a single axis, an intermediate gear for each index wheel, the intermediate gears being arranged on a single axis, a master gear and means for shifting it into mesh with each of the intermediate gears successively, means for rotating the master gear, of a subtotal register comprising a shaft carrying a series of index wheels adapted to mesh with said intermediate gears, a swinging frame carrying said shaft adapted to be swung into position to carry the index wheels into or out of mesh with the intermediate gears, and means for locking the swinging frame in its two positions.

62. In a calculating machine, the combination with a series of index wheels arranged on a single axis, an intermediate gear for each index wheel, the intermediate gears being arranged on a single axis, a master gear and means for shifting it into mesh with each of the intermediate gears successively, means for rotating the master gear including means for reversing the direction of rotation of the master gear, of a subtotal register comprising a shaft carrying a series of index wheels adapted to mesh with said intermediate gears, a swinging frame carrying said shaft adapted to be swung into position to carry the index wheels into or out of mesh with the intermediate gears, and means for locking the swinging frame in its two positions.

63. In a calculating machine, the combination with a series of index wheels arranged on a single axis, an intermediate gear for each index wheel, the intermediate gears being arranged on a single axis, a master gear and means for shifting it into mesh with each of the intermediate gears successively, means for rotating the master gear including means for reversing the direction of rotation of the master gear, of a subtotal register comprising a shaft carrying a series of index wheels adapted to mesh with said intermediate gears, a swinging frame carrying said shaft adapted to be swung into position to carry the index wheels into or out of mesh with the intermediate gears, means for locking the swinging frame in its two positions, and means for returning the index wheels to zero comprising gears carried by the index wheels, a sleeve provided with gears adapted to mesh with the gears carried by the index wheels when they are out of mesh with the intermediate gears, and means for rotating said sleeve, the gears carried by the index wheels being each cut away at one point so that rotation of the gear in mesh with it will not rotate the index wheel beyond this point.

64. In a calculating machine for use in connection with a typewriting machine having numeral keys and a carriage movable across it, the combination with a main calculating device in fixed position at one side of the typewriting machine, comprising a series of index wheels on a single shaft and means for rotating them operated by the numeral keys, said operating means comprising a shaft having a portion thereof within the calculating device and a portion extending beneath the carriage of the typewriting machine carrying a gear fixed thereon, a master gear mounted to rotate with but to be slidable on the portion of the shaft within the main calculating device, means operated by the carriage for shifting the master gear into gear with the index wheels successively, and a registering device carried by the carriage of the typewriting machine comprising a series of index wheels arranged on a single shaft and adapted to be brought successively in gear with the gear fixed on the shaft beneath the carriage, and means for rotating the shaft to simultaneously rotate an index wheel of the main calculating device and an index wheel of the registering device.

65. In a calculating machine for use in connection with a typewriting machine having numeral keys and a carriage movable across it, the combination with a main calculating device in fixed position at one side of the typewriting machine, comprising a series of index wheels on a single shaft and means for rotating them operated by the numeral keys, said operating means comprising a shaft having a portion thereof within the calculating device and a portion extending beneath the carriage of the typewriting machine carrying a gear fixed thereon, a master gear mounted to rotate with but to be slidable on the portion of the shaft within the main calculating device, means operated by the carriage for shifting the master gear into gear with the index wheels successively, and a registering device carried by the carriage of the typewriting machine comprising a series of index wheels arranged to be on a single shaft and adapted to be brought successively in gear with the gear fixed on the shaft beneath the carriage, means for rotating the shaft to simultaneously rotate an index wheel of the main calculating device and an index wheel of the registering device, reversing mechanism for reversing the direction of rotation of the shaft carrying the master gear and means carried by the registering device carried by the carriage of the typewriting machine for operating said reversing mechanism.

66. In a calculating machine for use in connection with a typewriting machine having numeral keys and a carriage movable across it, the combination with a main calculating device in fixed position at one side of the typewriting machine comprising a series of index wheels on a single shaft and differential means for rotating them operated by the numeral keys, said operating means comprising a shaft having a portion thereof within the calculating device and a portion extending beneath the carriage of the typewriting machine carrying a gear at its end, a master gear mounted to rotate with but to be slidable on the portion of the shaft within the main calculating device, means operated by the carriage for shifting the master gear into gear with the index wheels successively, and a registering device carried by the carriage of the typewriting machine comprising a series of index wheels arranged to be on a single shaft and adapted to be brought successively in gear with the gear fixed on the shaft beneath the carriage, means for holding the index wheels of the main calculating device and the index wheels of said registering device normally locked against rotation, means operated by the numeral keys for simultaneously unlocking an index wheel of the main calculating device and an index wheel of the said registering device and rotating both of said index wheels, and means for positively relocking the shaft on the completion of its predetermined movement of rotation.

67. In a calculating machine for use in connection with a typewriting machine having numeral keys and a carriage movable across it, a registering device adapted to be carried on the carriage comprising a series of index wheels arranged on a single axis, transfer mechanism for transferring from an index wheel of lower denomination to the index wheel of the next higher denomination, each adapted to hold the index wheel of higher denomination locked against rotation except by rotation of the index wheel of lower denomination, swinging levers each carrying a transfer mechanism, means for holding the levers normally in locking position, a gear in such fixed position relative to the movement of the carriage that the index wheels will be brought successively into gear with it, unlocking means also in fixed relation to the movement of the carriage in such position that the levers carrying the transfer mechanism will be brought successively into position to be operated thereby, and means operated by the numeral keys for operating the unlocking means and rotating said gear.

68. In a calculating machine for use in connection with a typewriting machine having numeral keys and a carriage movable across it, a registering device adapted to be carried on the carriage comprising a series of index wheels arranged on a single axis, transfer mechanism for transferring from an index wheel of lower denomination to the index wheel of the next higher denomination, each adapted to hold the index wheel of higher denomination locked against rotation except by rotation of the index wheel of lower denomination, swinging levers each carrying a transfer mechanism, means for holding the levers normally in locking position, a gear in such fixed position relative to the movement of the carriage that the index wheels will be brought successively into gear with it, unlocking means also in fixed relation to the movement of the carriage in such position that the levers carrying the transfer mechanism will be brought successively into position to be operated thereby, means operated by the numeral keys for operating the unlocking means and rotating said gear, and means carried by the registering device arranged to be operated by the movement of the lever operated by the unlocking means for locking the other levers in position to hold the index wheels controlled by them against rotation.

69. In a calculating machine for use in connection with a typewriting machine having numeral keys and a carriage movable across it, a registering device adapted to be carried on the carriage comprising a series of index wheels arranged on a single axis, transfer mechanism for transferring from an index wheel of lower denomination to the index wheel of the next higher denomination, each adapted to hold the index wheel of higher denomination locked against rotation except by rotation of the index wheel of lower denomination, swinging levers each carrying a transfer mechanism, means for holding the levers normally in locking position, a gear in such fixed position relative to the movement of the carriage that the index wheels will be brought successively into gear with it, unlocking means also in fixed relation to the movement of the carriage in such position that the levers carrying the transfer mechanism will be brought succesively into position to be operated thereby, means operated by the numeral keys for operating the unlocking means and rotating said gear, and means carried by the registering device arranged to be operated by the movement of the lever operated by the unlocking means for locking the other levers in position to hold the index wheels controlled by them against rotation comprising a locking plate arranged to be moved by the lever operated into the path of movement of the other levers.

In testimony whereof I hereunto affix my signature.

HIESTER AZARUS BOWERS.